(12) United States Patent
Xiao et al.

(10) Patent No.: US 12,267,230 B2
(45) Date of Patent: Apr. 1, 2025

(54) PACKET PROCESSING METHOD AND APPARATUS, NETWORK DEVICE, AND STORAGE MEDIUM

(71) Applicant: HUAWEI TECHNOLOGIES CO., LTD., Shenzhen (CN)

(72) Inventors: Yaqun Xiao, Beijing (CN); Li Fan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 342 days.

(21) Appl. No.: 17/893,525

(22) Filed: Aug. 23, 2022

(65) Prior Publication Data

US 2022/0407802 A1  Dec. 22, 2022

Related U.S. Application Data

(63) Continuation of application No. PCT/CN2021/078184, filed on Feb. 26, 2021.

(30) Foreign Application Priority Data

Feb. 26, 2020 (CN) .......................... 202010119485.1

(51) Int. Cl.
*H04L 45/28* (2022.01)
*H04L 45/00* (2022.01)

(52) U.S. Cl.
CPC .............. *H04L 45/28* (2013.01); *H04L 45/22* (2013.01); *H04L 45/34* (2013.01)

(58) Field of Classification Search
None
See application file for complete search history.

(56) References Cited

U.S. PATENT DOCUMENTS 6,992,978 B1 * 1/2006 Humblet ................. H04L 45/28
370/227
7,093,027 B1 * 8/2006 Shabtay ............... H04L 43/0811
709/239

(Continued)

FOREIGN PATENT DOCUMENTS

CN 104158733 A 11/2014
CN 105681185 A 6/2016

(Continued)

OTHER PUBLICATIONS

Litkowski et al., "Topology Independent Fast Reroute using Segment Routing draft-ietf-rtgwg-segment-routing-ti-lfa-01", Network Working Group, IETF, Mar. 5, 2019, 28 pages.

(Continued)

*Primary Examiner* — Xavier S Wong
(74) *Attorney, Agent, or Firm* — Maier & Maier, PLLC

(57) ABSTRACT

An identifier can indicate whether local protection is allowed is added to a packet. In a process in which a packet that carries a protection flag is transmitted along a primary path, if a node along the path determines that the primary path is faulty, but the protection flag indicates that local switching to a protection path is not allowed, the node along the path does not perform local protection, so that the packet is not switched by the node along the path to the protection path. This prevents the packet from passing through a protection path with the node along the path as an ingress when the primary path is faulty, helps traffic on the primary path to be switched to an end-to-end protection path in time, and helps a packet sending side to switch the traffic on the primary path to the end-to-end protection path in time.

26 Claims, 18 Drawing Sheets

(56) References Cited

U.S. PATENT DOCUMENTS

| | | | |
|---|---|---|---|
| 7,345,991 | B1 | 3/2008 | Shabtay et al. |
| 9,049,142 | B1 | 6/2015 | Osborne et al. |
| 11,431,618 | B2* | 8/2022 | Dutta ................. H04L 45/22 |
| 2006/0126496 | A1 | 6/2006 | Filsfils et al. |
| 2007/0091796 | A1 | 4/2007 | Filsfils et al. |
| 2013/0259056 | A1* | 10/2013 | Kotrabasappa ......... H04L 45/28 370/389 |
| 2015/0109902 | A1 | 4/2015 | Kumar et al. |
| 2021/0092048 | A1* | 3/2021 | Dutta ................. H04L 45/34 |
| 2021/0111991 | A1* | 4/2021 | Vadera ................. H04L 45/50 |

FOREIGN PATENT DOCUMENTS

| | | |
|---|---|---|
| CN | 105681186 A | 6/2016 |
| CN | 105704019 A | 6/2016 |
| CN | 109327390 A | 2/2019 |
| CN | 110661700 A | 1/2020 |
| EP | 1528731 B1 | 2/2012 |
| JP | 2015159486 A | 9/2015 |
| JP | 2017034463 A | 2/2017 |
| WO | 2009054032 A1 | 4/2009 |

OTHER PUBLICATIONS

Litkowski et al., "Implementing non protected paths using SPRING draft-litkowski-spring-non-protected-paths-02", SPRING Working Group, IETF, Aug. 9, 2017, 16 pages.

Filsfils et al.,. "Segment Routing Architecture draft-ietf-spring-segment-routing-10", Network Working Group, IETF, Nov. 19, 2016, 33 pages.

Li et al., "Enhanced Topology Independent Loop-free Alternate Fast Re-route draft-li-rtgwg-enhanced-ti-lfa-00", RTGWG Working Group, IETF, Mar. 11, 2019, 11 pages.

Filsfils et al., "SRv6 Network Programming draft-ietf-spring-srv6-network-programming-07", SPRING Working Group, IETF, Dec. 19, 2019, 44 pages.

Yang et al., "A FRR Mechanism Based on RSVP-TE in MPLS Networks", 2009, Radio Engineering, vol. 39, No. 6, 4 pages (including English abstract).

Bryant et al., "Remote Loop-Free Alternate Fast Re-Route draft-ietf-rtgwg-rernote-lfa-10", IETF Trust, Jan. 6, 2015, 29 pages.

* cited by examiner

PACKET PROCESSING METHOD AND APPARATUS, NETWORK DEVICE, AND STORAGE MEDIUM

CROSS-REFERENCE TO RELATED APPLICATIONS

This is a continuation of International Patent Application No. PCT/CN2021/078184 filed on Feb. 26, 2021, which claims priority to Chinese Patent Application No. 202010119485.1, filed on Feb. 26, 2020. The disclosures of the aforementioned applications are hereby incorporated by reference in their entireties.

TECHNICAL FIELD

The embodiments relate to the field of communications technologies, a packet processing method and apparatus, a network device, and a storage medium.

BACKGROUND

To ensure reliability of a network, a protection mechanism is usually pre-deployed on the network. Therefore, after a node or a link on a current working path is faulty, traffic can be switched to another path that is not faulty. The protection mechanism includes an end-to-end protection mechanism and a local protection mechanism. The end-to-end protection mechanism is a global protection mechanism. An end-to-end primary path and an end-to-end protection path are pre-planned on the network. If a head node on the primary path detects that the primary path is faulty, the head node switches traffic on the primary path to the end-to-end protection path for transmission. The local protection mechanism is a locality protection mechanism. If a transit node on a primary path detects that the primary path is faulty, the transit node locally switches a packet to a protection path, so that the packet enters the protection path from the transit node.

Currently, the end-to-end protection mechanism and the local protection mechanism usually coexist on a network. Not only an end-to-end primary path and an end-to-end backup path are planned on the network, but also the local protection mechanism is enabled on each transit node on the primary path. In this scenario, if the transit node detects that the primary path is faulty, the transit node preferentially switches traffic on the primary path to a protection path locally based on the local protection mechanism for continuous transmission. Generally, the primary path and the end-to-end protection path meet a service level agreement (SLA) requirement, and the protection path to which the transit node performs switching can ensure only path connectivity but cannot meet the SLA requirement. However, by using the foregoing method, after the transit node switches a packet (for example, a bidirectional forwarding detection (BFD) packet) on the primary path to the local protection path for transmission, because the packet is normally transmitted to a destination end, the destination end can send a response to a head node based on the BFD packet. As a result, the head node receives the response for the BFD packet and accordingly considers that the primary path is connected. In this case, the head node cannot detect in time that the primary path is faulty. The head node performs switching from the primary path to the end-to-end protection path only under a trigger condition for detecting that the primary path is faulty. Because the head node cannot detect in time that the primary path is faulty, the head node cannot perform switching from the primary path to the end-to-end protection path in time. Consequently, traffic is transmitted for a long time on a protection path that cannot meet the SLA, and the SLA requirement cannot be met.

SUMMARY

The embodiments may provide a packet processing method and apparatus, a network device, and a storage medium, to prevent a packet transmitted on a primary path from being switched to a local protection path.

According to a first aspect, a packet processing method is provided. In the method, a first network device receives a packet. The packet includes a protection flag, the protection flag is used to indicate whether the first network device is allowed to switch the packet from a primary path to a first protection path, the first protection path is used to protect the primary path, and an ingress node on the first protection path is the first network device. The first network device determines that the primary path is faulty. If the protection flag indicates that the packet is not allowed to be switched from the primary path to the first protection path, the first network device discards the packet based on the determined fact that the primary path is faulty and the protection flag indicating that the packet is not allowed to be switched from the primary path to the first protection path.

In this method, an identifier that can indicate whether local protection is allowed is added to the packet. In a process in which the packet that carries the protection flag is transmitted along the primary path, if a node along the path determines that the primary path is faulty, but the protection flag indicates that local switching to a protection path is not allowed, the node along the path does not perform local protection, so that the packet is not switched by the node along the path to the protection path. This prevents the packet from passing through a protection path with the node along the path as an ingress when the primary path is faulty, and resolves a problem caused after the packet enters the protection path from the node along the path.

Additionally, in most cases, the node along the path can perform only local protection and cannot switch to an end-to-end protection path. Therefore, the protection path with the node along the path as the ingress is usually a local protection path instead of a pre-planned end-to-end protection path. In this case, if the packet is switched to the local protection path, traffic on the primary path is diverted to the local protection path for a long time. However, the protection flag is added to the packet, so that the packet is not transmitted to the local protection path. Therefore, the traffic on the primary path can be switched to the end-to-end protection path in time.

In addition, because the node along the path discards the packet, a packet sending side can detect a packet loss in the traffic on the primary path in time. In various scenarios in which a packet loss is detected to trigger protection switching, the packet sending side can switch the traffic on the primary path to the end-to-end protection path in time, so that the packet sending side can detect service impairment and a cause of a fault on the primary path in time.

Optionally, a trigger condition for switching from the primary path to a second protection path is that a packet loss is detected in traffic on the primary path.

Optionally, the second protection path is a backup path for protecting the primary path, and the second protection path has a same ingress node as the primary path.

Optionally, the second protection path meets the SLA.

In an SLA assurance scenario, when the packet does not carry the protection flag, in a process in which the packet is transmitted along the primary path, if the node along the path determines that the primary path is faulty, the node locally switches the packet to the protection path. Because the protection path to which the node along the path switches the packet usually does not meet the SLA, transmission performance of the protection path to which the node along the path switches the packet cannot be ensured in terms of a bandwidth, a delay, and the like. Consequently, the traffic on the primary path is diverted to a path that does not meet the SLA, and service SLA assurance cannot be achieved. However, in this optional manner, an identifier that can indicate whether local protection is allowed is added to the packet. In a process in which the packet that carries the protection flag is transmitted along the primary path, if the node along the path determines that the primary path is faulty, but the protection flag indicates that local switching to a protection path is not allowed, the node along the path does not perform local protection, so that the packet is not switched by the node along the path to the protection path. This avoids a problem, caused after the packet enters the protection path from the node along the path, that the traffic on the primary path is transmitted for a long time on the path that does not meet the SLA. In addition, because the node along the path discards the packet, a head node can detect a packet loss in the traffic on the primary path in time, so that the head node can switch the traffic on the primary path in time to a protection path that meets the SLA, and service SLA assurance can be achieved.

Optionally, the packet is a segment routing (SR) packet. The first network device determines, based on a segment identifier (SID) in the packet, an outbound interface or a next hop corresponding to the SID. If the outbound interface or the next hop is faulty, the first network device determines that the primary path is faulty.

In a process of transmitting a packet on a primary path in an SR tunnel, when the primary path is faulty, each hop node along the path can determine, based on an outbound interface or a next hop of the node, that the primary path is faulty. Therefore, each hop node along the path is likely to determine that the primary path is faulty. In this case, if the node along the path pre-deploys a local protection mechanism, when the packet on the primary path passes through the node, the node switches the packet to a local protection path. Therefore, it can be proved that, if the packet does not carry the protection flag, once any node or link on the primary path is faulty, any hop node along the path is likely to switch the packet to the local protection path. However, the protection flag is added to the packet, so that the packet received by each hop node along the primary path carries the protection flag. Therefore, regardless of a hop node along the path that receives the packet and then determines that the primary path is faulty, because the protection flag already indicates that switching to a protection path is not allowed, the hop node can discard the packet as indicated by the protection flag and does not switch the packet to the local protection path. Therefore, it can be understood that, in this method, the packet on the primary path is not switched to the local protection path, and the node along the path can determine, based on the protection flag carried in the packet, whether to perform local protection switching, so that implementation is relatively easy and service deployment complexity is reduced.

Optionally, the packet is a segment routing over internet protocol version 6 (SRv6) packet, the SRv6 packet includes a segment routing header (SRH), and the protection flag is in the SRH.

In this optional manner, an identifier that can indicate whether local protection is allowed is added to the SRH in the SRv6 packet. In a process in which the packet that carries the protection flag is transmitted along a primary label switched path (LSP) in an SR tunnel, if a transit node on the primary LSP determines that the primary path is faulty, but the protection flag indicates that local protection is not allowed, a node along the path does not perform local protection, so that the packet is not switched by the transit node to a backup LSP with the transit node as an ingress. This prevents the packet from passing through the backup LSP for local protection when the primary path is faulty, and resolves a problem caused after the packet enters the backup LSP for local protection from the node along the path.

Optionally, the protection flag is in a Flags field of the SRH.

In this optional manner, a new Flags field is extended for the packet, and the Flags field is used to carry the protection flag. When the primary path is faulty, because the packet includes the Flags field, after a receiving side identifies the protection flag in the Flags field, the packet does not pass through the first protection path. If the first protection path is a local protection path, the packet does not pass through the local protection path.

Optionally, that the protection flag is in the SRH includes: the protection flag is in a type-length-value (TLV) of the SRH.

In this optional manner, a new TLV is extended for the packet, and the TLV is used to carry the protection flag. When the primary path is faulty, after a receiving side identifies the TLV, the packet does not pass through the first protection path. If the first protection path is a local protection path, the packet does not pass through the local protection path.

Optionally, the method further includes: The first network device sends, if the protection flag indicates that the packet is allowed to be switched from the primary path to the first protection path, the packet through the first protection path based on the determined fact that the primary path is faulty and the protection flag indicating that the packet is allowed to be switched from the primary path to the first protection path.

In this optional manner, the protection flag is added to the packet, so that the protection flag can indicate whether the packet is allowed to be switched from the primary path to a protection path. When the primary path is faulty, if a network device serving as a node along the path receives the packet that carries the protection flag, because it is determined that the primary path is faulty and the protection flag indicates that the packet is allowed to be switched to the protection path, the packet is sent through the protection path, the node along the path is guided to switch the packet to a local protection path by using the protection flag carried in the packet, and the node along the path can be further guided to switch the packet to a protection path. This improves flexibility.

Optionally, if the protection flag indicates that the packet is allowed to be switched to a midpoint topology-independent loop-free alternate (Midpoint TI-LFA) path but is not allowed to be switched to a topology-independent loop-free alternate fast reroute (TI-LFA FRR) path, the first network device sends the packet through the Midpoint TI-LFA path based on the determined fact that the primary path is faulty and the protection flag indicating that the packet is allowed to be switched to the Midpoint TI-LFA path but is not allowed to be switched to the TI-LFA FRR path.

Optionally, if the protection flag indicates that the packet is allowed to be switched to a TI-LFA FRR path but is not allowed to be switched to a Midpoint TI-LFA path, the first network device sends the packet through the TI-LFA FRR path based on the determined fact that the primary path is faulty and the protection flag indicating that the packet is allowed to be switched to the TI-LFA FRR path but is not allowed to be switched to the Midpoint TI-LFA path.

Optionally, the protection flag occupies a first bit of the packet; and if the first bit is set, it indicates that the packet is not allowed to be switched from the primary path to the first protection path; or if the first bit is not set, it indicates that the packet is allowed to be switched from the primary path to the first protection path.

Optionally, the protection flag occupies a second bit and a third bit of the packet; and if both the second bit and the third bit are set, it indicates that the packet is not allowed to be switched from the primary path to the Midpoint TI-LFA path or the TI-LFA FRR path; if the second bit is set and the third bit is not set, it indicates that the packet is not allowed to be switched to the Midpoint TI-LFA path but is allowed to be switched to the TI-LFA FRR path; if the second bit is not set and the third bit is set, it indicates that the packet is allowed to be switched to the Midpoint TI-LFA path but is not allowed to be switched to the TI-LFA FRR path; or if neither the second bit nor the third bit is set, it indicates that the packet is allowed to be switched from the primary path to the Midpoint TI-LFA path or the TI-LFA FRR path.

Optionally, the packet includes a data packet, and the data packet is used to carry service data of the primary path; or the packet includes a detection packet, and the detection packet is used to detect at least one of connectivity or a transmission performance parameter of the primary path.

Optionally, when the packet includes a detection packet, the detection packet is a bidirectional forwarding detection BFD packet.

In a BFD scenario, a head node (for example, a second network device) transmits a BFD packet together with a protection flag and uses the protection flag to indicate that local switching to a protection path is not allowed. Therefore, in a process in which the BFD packet is transmitted along a primary path, if the primary path is faulty, because the protection flag indicates that local switching to the protection path is not allowed, when receiving the BFD packet, a node along the path (for example, the first network device) does not switch the BFD packet to a local protection path by using a local protection mechanism but discards the BFD packet. In this case, transmission of the BFD packet is interrupted on the node along the path, and the BFD packet is not transmitted to a destination node. Because the destination node does not receive the BFD packet, the destination node does not respond to the BFD packet, and the head node does not receive a response packet from the destination node. In this case, BFD detection performed by the head node is in a down state. Therefore, based on the fact that the BFD detection is in a down state, the head node can detect in time that the primary path is faulty, so that the head node can detect in time a cause of the fault on the primary path and detect service impairment in time. This helps rectify the fault on the primary path in time and avoid long-term service impairment.

Optionally, when the packet includes a detection packet, the detection packet is a packet internet groper PING detection packet.

Optionally, when the packet includes a detection packet, the detection packet is an operations, administration, and maintenance (OAM) detection packet.

Optionally, when the packet includes a detection packet, the detection packet is a two-way active measurement protocol (TWAMP) packet.

Optionally, when the packet includes a detection packet, the detection packet is an Internet Protocol data flow-based channel associated OAM performance measurement (in-situ Flow information Telemetry, IFIT) packet.

According to a second aspect, a packet processing method is provided. In the method, a second network device generates a packet. The packet includes a protection flag, the protection flag is used to indicate whether a first network device is allowed to switch the packet from a primary path to a first protection path, the first protection path is used to protect the primary path, and an ingress node on the first protection path is the first network device. The second network device sends the packet to the first network device.

In this method, an identifier that can indicate whether local protection is allowed is added to the packet. In a process in which the packet that carries the protection flag is transmitted along the primary path, if a node along the path determines that the primary path is faulty, but the protection flag indicates that local switching to a protection path is not allowed, the node along the path does not perform local protection, so that the packet is not switched by the node along the path to the protection path. This prevents the packet from passing through a protection path with the node along the path as an ingress when the primary path is faulty, and resolves a problem caused after the packet enters the protection path from the node along the path.

Additionally, in most cases, the node along the path can perform only local protection and cannot switch to an end-to-end protection path. Therefore, the protection path with the node along the path as the ingress is usually a local protection path instead of a pre-planned end-to-end protection path. In this case, if the packet is switched to the local protection path, traffic on the primary path is diverted to the local protection path for a long time. However, the protection flag is added to the packet, so that the packet is not transmitted to the local protection path. Therefore, the traffic on the primary path can be switched to the end-to-end protection path in time.

Optionally, after the second network device sends the packet to the first network device, the second network device determines that a packet loss occurs in traffic on the primary path; and the second network device switches the primary path to a second protection path based on the determined fact that the packet loss occurs in the traffic on the primary path.

Because the node along the path discards the packet, a packet sending side can detect a packet loss in the traffic on the primary path in time. In various scenarios in which a packet loss is detected to trigger protection switching, the packet sending side can switch the traffic on the primary path to the end-to-end protection path in time, so that the packet sending side can detect service impairment and a cause of a fault on the primary path in time.

Optionally, the second protection path is a backup path for protecting the primary path, and the second protection path has a same ingress node as the primary path.

Optionally, the second protection path meets the SLA.

Optionally, the packet is an SRv6 packet, the SRv6 packet includes a segment routing header SRH, and the protection flag is in the SRH.

Optionally, that the protection flag is in the SRH includes: the protection flag is in a Flags field of the SRH; or the protection flag is in a type-length-value TLV of the SRH.

Optionally, the protection flag occupies a first bit of the packet; and if the first bit is set, it indicates that the packet is not allowed to be switched from the primary path to the first protection path; or if the first bit is not set, it indicates that the packet is allowed to be switched from the primary path to the first protection path; or the protection flag occupies a second bit and a third bit of the packet; and if both the second bit and the third bit are set, it indicates that the packet is not allowed to be switched from the primary path to a Midpoint TI-LFA path and a TI-LFA FRR path; if the second bit is set and the third bit is not set, it indicates that the packet is not allowed to be switched to a Midpoint TI-LFA path but is allowed to be switched to a TI-LFA FRR path; if the second bit is not set and the third bit is set, it indicates that the packet is allowed to be switched to a Midpoint TI-LFA path but is not allowed to be switched to a TI-LFA FRR path; or if neither the second bit nor the third bit is set, it indicates that the packet is allowed to be switched from the primary path to a Midpoint TI-LFA path or a TI-LFA FRR path.

Optionally, the packet includes a data packet, and the data packet is used to carry service data of the primary path; or the packet includes a detection packet, and the detection packet is used to detect at least one of connectivity or a transmission performance parameter of the primary path.

Optionally, the detection packet is a BFD packet; or the detection packet is a PING detection packet; or the detection packet is an OAM detection packet; or the detection packet is a TWAMP detection packet; or the detection packet is an IFIT packet.

According to a third aspect, a packet processing apparatus is provided. The packet processing apparatus has functions of implementing packet processing in any one of the first aspect or the optional manners of the first aspect. The packet processing apparatus includes at least one module, and the at least one module is configured to implement the packet processing method according to any one of the first aspect or the optional manners of the first aspect. For details of the packet processing apparatus according to the third aspect, refer to any one of the first aspect or the optional manners of the first aspect. Details are not described herein again.

According to a fourth aspect, a packet processing apparatus is provided. The packet processing apparatus has functions of implementing packet processing in any one of the second aspect or the optional manners of the second aspect. The packet processing apparatus includes at least one module, and the at least one module is configured to implement the packet processing method according to any one of the second aspect or the optional manners of the second aspect. For details of the packet processing apparatus according to the fourth aspect, refer to any one of the second aspect or the optional manners of the second aspect. Details are not described herein again.

According to a fifth aspect, a network device is provided. The network device includes a processor, and the processor is configured to execute instructions, so that the network device performs the packet processing method according to any one of the first aspect or the optional manners of the first aspect. For details of the network device according to the fifth aspect, refer to any one of the first aspect or the optional manners of the first aspect. Details are not described herein again.

According to a sixth aspect, a network device is provided. The network device includes a processor, and the processor is configured to execute instructions, so that the network device performs the packet processing method according to any one of the second aspect or the optional manners of the second aspect. For details of the network device according to the sixth aspect, refer to any one of the second aspect or the optional manners of the second aspect. Details are not described herein again.

According to a seventh aspect, a non-transitory computer-readable storage medium is provided. The non-transitory storage medium stores at least one instruction, and when the instruction is read by a processor, a network device is enabled to perform the packet processing method according to any one of the first aspect or the optional manners of the first aspect.

According to an eighth aspect, a non-transitory computer-readable storage medium is provided. The non-transitory storage medium stores at least one instruction, and the instruction is read by a processor, so that a network device performs the packet processing method according to any one of the second aspect or the optional manners of the second aspect.

According to a ninth aspect, a computer program product is provided. When the computer program product runs on a network device, the network device is enabled to perform the packet processing method according to any one of the first aspect or the optional manners of the first aspect.

According to a tenth aspect, a computer program product is provided. When the computer program product runs on a network device, the network device is enabled to perform the packet processing method according to any one of the second aspect or the optional manners of the second aspect.

According to an eleventh aspect, a chip is provided. When the chip runs on a network device, the network device is enabled to perform the packet processing method according to any one of the first aspect or the optional manners of the first aspect.

According to a twelfth aspect, a chip is provided. When the chip runs on a network device, the network device is enabled to perform the packet processing method according to any one of the second aspect or the optional manners of the second aspect.

According to a thirteenth aspect, a packet processing system is provided. The packet processing system includes a first network device and a second network device. The first network device is configured to perform the method according to any one of the first aspect or the optional manners of the first aspect, and the second network device is configured to perform the method according to any one of the second aspect or the optional manners of the second aspect.

DETAILED DESCRIPTION OF THE EMBODIMENTS

Figure 1:
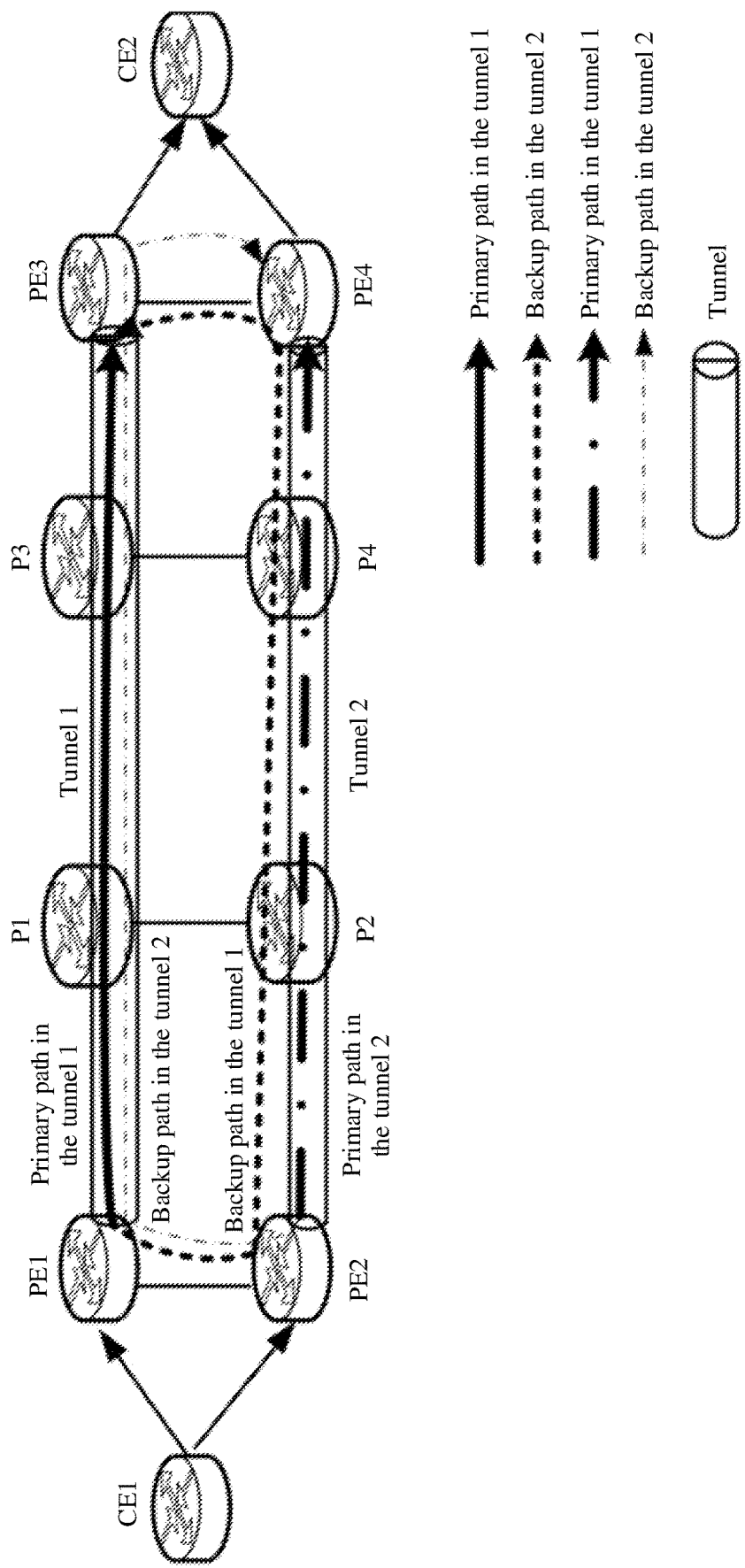
FIG. 1 is a diagram of an architecture of a packet processing system according to an embodiment.

To make the objectives, solutions, and advantages clearer, the following further describes the implementations in detail with reference to the accompanying drawings.

Terms such as "first" and "second" are used to distinguish between same items or similar items that have basically same functions. It should be understood that there is no logical or time sequence dependency between "first" and "second", and a quantity and an execution sequence are not limited. It should be further understood that although the terms such as "first" and "second" are used in the following descriptions to describe various elements, these elements should not be limited by the terms. These terms are merely used to distinguish one element from another element. For example, without departing from the scope of various examples, a first network device may be referred to as a second network device. Similarly, the second network device may be referred to as the first network device. Both the first network device and the second network device may be network devices, and in some cases, may be separate and different network devices. For example, without departing from the scope of various examples, a first protection path may be referred to as a second protection path. Similarly, the second protection path may be referred to as the first protection path. Both the first protection path and the second protection path may be protection paths, and in some cases, may be separate and different protection paths.

A term "at least one" means one or more, and a term "a plurality of" means two or more. For example, "a plurality of segment identifiers (SID)" means two or more SIDs.

It should be understood that terms used in the descriptions of various examples are merely intended to describe examples but are not intended to constitute a limitation. Terms "one" ("a" or "an") and "the" of singular forms used in the descriptions of the various examples are also intended to include plural forms, unless otherwise specified in the context clearly.

It should be further understood that sequence numbers of processes do not mean execution sequences in the various embodiments. The execution sequences of the processes should be determined based on functions and internal logic of the processes and should not be construed as any limitation on the implementation processes of the embodiments.

It should be understood that determining B based on A does not mean that B is determined based on only A, but B may alternatively be determined based on A and/or other information.

It should be further understood that a term "include" (also referred to as "includes", "including", "comprises", and/or "comprising") specifies presence of the stated features, integers, steps, operations, elements, and/or components, with presence or addition of one or more other features, integers, steps, operations, elements, components, and/or their components not excluded.

It should be further understood that terms "if" and "assuming that" may be interpreted as a meaning "when" ("when" or "upon"), "in response to determining", "in response to detecting", or "based on". Similarly, according to the context, a phrase "when it is determined that" or "if (a stated condition or event) is detected" may be interpreted as a meaning of "when it is determined that", "in response to determining", "when (a stated condition or event) is detected", "in response to detecting (a stated condition or event)", or "based on a determined (stated condition or event)".

It should be understood that "one embodiment", "an embodiment", and "a possible implementation" mean that particular features, structures, or characteristics related to the embodiment or the implementation are included in at least one embodiment. Therefore, "in one embodiment", "in an embodiment", or "in a possible implementation" does not necessarily mean a same embodiment. In addition, these particular features, structures, or characteristics may be combined in one or more embodiments by using any appropriate manner.

A packet processing method provided in the embodiments can be applied to a scenario in which SLA assurance is required, for example, a scenario in which a bandwidth, a delay, or another transmission performance parameter needs to be ensured. The packet processing method in the embodiments can be applied to a BFD detection scenario, a PING detection connectivity scenario, an OAM detection scenario, a TWAMP detection scenario, an IFIT scenario, or a data packet transmission scenario. The packet processing method in the embodiments can be applied to any scenario in which a packet is transmitted based on source routing, including but not limited to an SRv6 scenario, an SR-TE scenario, or another scenario.

The following briefly describes some terms separately.

Service level agreement (SLA): The service level agreement generally is an agreement signed between a service provider and a user or between different service providers and specifies a service level and quality provided by the service provider. In the field of telecommunications network technologies, an SLA parameter or performance indicator usually includes a delay, a bandwidth, a throughput, availability, a packet loss rate, and the like. In a scenario in which SLA assurance is required, an end-to-end service requires a stable bandwidth and delay. In view of this, separate active and backup paths are usually pre-planned for service paths. The pre-planned active and backup paths both meet an SLA requirement such as a bandwidth requirement or a delay requirement. However, a local protection path can ensure only maximum link connectivity but cannot ensure a bandwidth or a delay. When a local fault occurs on the primary path because a node along the primary path enables a local protection mechanism, traffic on the primary path is switched to the local protection path. However, in this case, the local protection path cannot meet an end-to-end SLA assurance requirement of a service, and the service needs to be quickly switched to an end-to-end backup path.

Bidirectional forwarding detection (BFD): BFD is used for fast detection to monitor a forwarding connectivity situation of a link or an IP route on a network. BFD is often used together with various interior gateway protocols (IGP) and border gateway protocols (BGP) to achieve fast convergence. A BFD session is established, and a BFD detection packet is sent at a preset interval (for example, 1 second) by default. A BFD implementation principle is that a source node sends a detection packet, a destination node receives the detection packet and then responds to the detection packet, and the head node receives a response packet and then considers that the detection succeeds. In a fault scenario, the detection packet sent by the head node is discarded by a faulty transit node and cannot be successfully sent to the destination node. Consequently, the destination node cannot send a corresponding response packet. Finally, the head node considers that a link fault occurs because the head node does not receive the response packet.

Packet internet groper (PING): PING is used to check network connectivity and host reachability. A source host sends a (Internet Control Message Protocol (ICMP) request packet to a destination host, and the destination host sends an ICMP response packet to the source host. A PING command is the most common debugging tool for checking accessibility of a network device. The tool uses ICMP echo information to determine whether a remote device is available, and detect a loss situation of a delay packet in a round-trip of communication of a remote device, for example, may use PING to detect connectivity of a label distribution protocol (LDP) tunnel that carries an IPv4 packet and connectivity of an LDP tunnel of a traffic engineering (TE) tunnel that carries an IPv6 packet and an IPv4 packet, or may use a tracert command to detect path information or a fault location of an LDP tunnel that carries an IPv4 packet and path information or a fault location of a TE tunnel that carries an IPv4 packet.

Operations, administration, and maintenance (OAM): OAM is used to monitor path connectivity and quickly detect a fault. SR OAM is used to monitor label switched path (LSP) connectivity and quickly detect a fault. Currently, SR OAM is implemented through PING and Tracert.

Two-way active measurement protocol (TWAMP): TWAMP is a performance measurement technology used for an internet protocol (IP) link, and may perform two-way performance measurement in a forward direction and a reverse direction. TWAMP uses a user datagram protocol (UDP) data packet as a measurement probe to perform two-way network delay and jitter measurement. In addition, the protocol is secure and can ensure separation of control and measurement functions. Through cooperation between network devices with TWAMP deployed, IP performance statistics data between the devices can be effectively obtained.

Internet Protocol data flow-based channel associated OAM performance measurement (IFIT): IFIT is an in-situ flow measurement technology based on a real service flow. IFIT performs feature marking (coloring) on an actual service flow, and performs in-situ flow detection of packet loss and delay measurement on a feature field. Compared with conventional active and passive measurement technologies, IFIT has higher measurement precision and simpler OAM. In addition, compared with in-situ flow measurement technologies such as iOAM/INT, IFIT has less overheads and implements more accurate demarcation. In addition, compared with IP flow performance measurement (IP FPM), IFIT is more compatible with an existing network, easier to deploy, and more flexible to expand. IP RAN IFIT provides a capability for measuring an IP service-flow level end-to-end and hop-by-hop SLA (including a packet loss rate, a delay, a jitter, and real-time traffic), can quickly detect a network fault and perform accurate demarcation and troubleshooting, and is an important method for performing OAM on a future 5G mobile bearer network.

The following describes some terms in the SR technology.

Segment routing (SR): SR is a technology designed based on source routing to forward a packet on a network. Segment routing divides a network path into segments and allocates segment identifiers (SID) to the segments and forwarding nodes on the network. The SIDs are sequentially arranged to obtain a segment list. The segment list may indicate a packet forwarding path. Based on the SR technology, a node and a path through which a packet that carries a segment list passes can be specified, to meet a traffic optimization requirement. For example, the packet may be compared to luggage, and SR may be compared to a label on the luggage. If the luggage needs to be sent from a region A to a region D through a region B and a region C, a label "first to the region B, then to the region C, and finally to the region D" may be put on the luggage at an origin region, that is, the region A. In this way, at each region, only the label on the luggage needs to be identified, and the luggage is forwarded from one region to another based on the label on the luggage. Based on the SR technology, a source node adds a label to a packet, and a transit node may forward the packet to a next node based on the label until the packet arrives at a destination node. For example, <SID1, SID2, SID3> is inserted into a packet header of the packet. In this case, the packet is first forwarded to a node corresponding to SID1, forwarded to a node corresponding to SID2, and then forwarded to a node corresponding to SID3.

SR tunnel: The SR tunnel is a tunnel on which a head node encapsulates a segment list into a packet header, and may be manually created by an administrator, or may be automatically created by a controller through an interface protocol such as NETCONF or PCEP.

One SR tunnel may be used for traffic engineering TE, OAM, FRR, and the like. SR label switched path (LSP): The SR LSP is a label forwarding path established by using the SR technology. A prefix or node segment is used to guide data packet forwarding. One SR tunnel may include one or more SR LSPs.

Segment routing-traffic engineering (SR-TE): SR-TE is a new TE tunnel technology that uses SR as a control protocol. A controller is responsible for calculating a tunnel forwarding path and delivering a label stack strictly corresponding to the path to a forwarder. On an ingress node on the SR-TE tunnel, the forwarder may control a transmission path of a packet on the network based on the label stack. The label stack is a label arrangement set and is used to identify a complete label switched path (LSP). Each adjacency label in the label stack identifies an adjacency, and the entire label stack identifies all adjacencies of the complete label switched path LSP. During packet forwarding, a corresponding adjacency is found based on each adjacency label in the label stack, and each label is forwarded after being popped out. After all the adjacency labels in the label stack are popped out, a packet passes through the complete LSP and arrives at a destination device of the SR-TE tunnel.

SRv6 technology: The SRv6 technology means to apply the SR technology to an IPv6 network. An SRv6 SID is encoded by using an IPv6 address (128 bits) and encapsulated in an SRv6 extension header (SRH). During packet forwarding, an SRv6-aware node searches a local SID table (local SID table) based on a destination address (DA) in the packet. If the destination address in the packet matches any SID in the local SID table, it is determined that the destination address hits the local SID table. In this case, a corresponding operation is performed based on a topology, an instruction, or a service corresponding to the SID. If the destination address of the packet does not match any SID in the local SID table, an IPv6 routing and forwarding table is searched based on the destination address, and the packet is forwarded based on a routing and forwarding table that hits the destination address in the routing and forwarding table.

Local SID table: The local SID table is a table maintained by an SRv6-enabled node. The local SID table includes an SRv6 SID generated by a local node. An SRv6 forwarding table FIB may be generated based on the local SID table. The local SID table has the following three functions: 1. Define a locally generated SID, for example, an End.X SID. 2. Specify instructions bound to these SIDs. 3. Store forwarding information related to the instructions, for example, an outbound interface and a next hop. In some embodiments, after a command "display segment-routing ipv6 local-sid" in input, a local SID table of SRv6 configured on a device may be viewed. The command may carry a parameter End, to specify to view a local SID table of SRv6 End. The command may carry a parameter End.X, to specify to view a local SID table of SRv6 End.X. The command may carry a parameter End.DT4, to specify to view a local SID table of SRv6 End.DT4.

SRv6 packet: An IPv6 packet consists of a standard IPv6 header, extension headers (0 . . . n), and a payload. To implement SRv6 based on an IPv6 forwarding plane, an IPv6 extension header, referred to as an SRH, is added. The extension header specifies an IPv6 explicit path and stores IPv6 segment list information. A function of the extension header is the same as that of a segment list in SR MPLS. A head node adds an SRH extension header to an IPv6 packet, so that a transit node can forward the packet based on path information included in the SRH extension header. By adding an extension header, SR is smoothly integrated with an original IPv6 forwarding plane.

An IPv6 header in the SRv6 packet may include a source address (SA) and a destination address (DA). In a common IPv6 packet, an IPv6 DA is fixed. In SRv6, the IPv6 DA identifies a next node of a current packet. On an SR tunnel, an SR node may continuously update the destination address, to implement hop-by-hop forwarding. An SID carried in the destination address in the IPv6 header may be referred to as an active SID.

The SRH in the SRv6 packet is an IPv6 extension header. The SRH is used to implement SRv6 based on the IPv6 forwarding plane. The SRH may include Segment List. Segment List may include one or more SIDs, and each SID may be in a form of an IPv6 address. Therefore, Segment List may also be understood as an explicit IPv6 address stack. Segment List may be denoted as Segment List [n], a length of Segment List [n] is 128*n bits, and Segment List may be encoded starting from a last segment of a path. Segment List is in the form of an IPv6 address.

The SRH may include (2.1) to (2.9).

(2.1) Segment List

Segment List may include one or more SIDs, and each SID may be in a form of an IPv6 address. Therefore, Segment List may also be understood as an explicit IPv6 address stack. Segment List may be denoted as Segment List [n], a length of Segment List [n] is 128*n bits, and Segment List may be encoded starting from a last segment of a path. Segment List is in the form of an IPv6 address.

(2.2) Segments Left (SL)

The SL is used to indicate a quantity of transit nodes that still need to be accessed before a destination node is reached, and the SL field may also be referred to as a remaining node field. A value of the SL field may indicate an active SID in the segment list. A length of the SL may be 8 bits. For example, if the segment list includes five SIDs: SID0, SID1, SID2, SID3, and SID4, and a value of the SL is 2, it indicates that there are two unprocessed SIDs in the segment list: SID0 and SID1, one currently to-be-processed SID in the segment list: SID2, and two processed SIDs in the segment list: SID3 and SID4.

(2.3) One or more TLVs

TLV is an encoding format, and TLV includes Type (Type), Length (Length), and Value (Value). The SRH may include one TLV or may include a plurality of TLVs. There may be a parallel relationship or a nesting relationship between different TLVs in the SRH.

Figure 9:
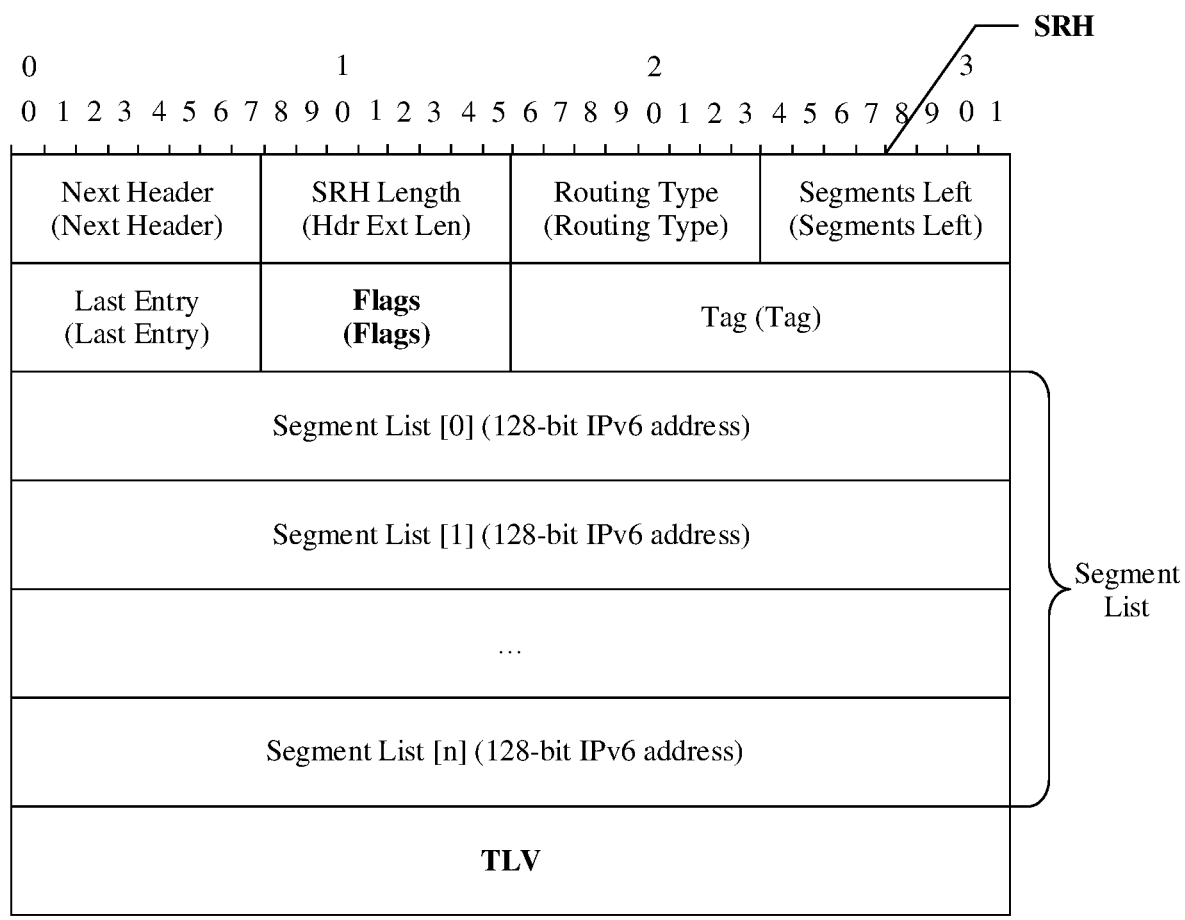
FIG. 9 is a schematic diagram of an SRH according to an embodiment.

In addition, as shown in FIG. 9, the SRH may further include the following fields:

(2.4) Next Header: An SRv6 packet may further include one or more extension headers or one or more high-layer headers after an extension header, and Next Header is used to identify a type of a header immediately following the SRH. A length of the Next Header field may be 8 bits.

(2.5) Header Extended Length (Hdr Ext Len) field: The Hdr Ext Len field is used to indicate a length of an SRH header. The Hdr Ext Len field indicates a length from Segment List [0] to Segment List [n]. The Header Extended Length field may be 8 bits.

(2.6) Routing Type field: The Routing Type field is used to identify a route header type, and value 4 identifies an SRH type. A length of the Routing Type field may be 8 bits.

(2.7) Last Entry field: The Last Entry field is an index of the last element in the segment list. A length of the Last Entry field may be 8 bits.

(2.8) Flags field: The Flags field is used to indicate some identifiers of a data packet. A length of the Flags field may be 8 bits.

(2.9) Tag field: The Tag field is used to identify a same group of data packets. A length of the Tag field may be 16 bits.

The payload in the SRv6 packet may be an IPv4 packet, an IPv6 packet, or an Ethernet frame.

Segment routing-traffic engineering (SR-TE) is a new TE tunnel technology that uses SR as a control protocol. A controller is responsible for calculating a tunnel forwarding path and delivering a label stack strictly corresponding to the path to a forwarder. On an ingress node on the SR-TE tunnel, the forwarder may control a transmission path of a packet on the network based on the label stack.

The label stack is a label arrangement set and is used to identify a complete label switched path (LSP). Each adjacency label in the label stack identifies an adjacency, and the entire label stack identifies all adjacencies of the complete label switched path LSP. During packet forwarding, a corresponding adjacency is found based on each adjacency label in the label stack, and each label is forwarded after being popped out. After all the adjacency labels in the label stack are popped out, a packet passes through the complete LSP and arrives at a destination device of the SR-TE tunnel.

The embodiments relate to application of a protection switching technology, and in particular, to application of an end-to-end protection technology and a local protection technology. For ease of understanding, the following first describes related concepts in the protection switching technology in the embodiments.

A tunnel is a set of end-to-end paths between two points. The two points are respectively referred to as a start point of the tunnel and an end point of the tunnel. The tunnel includes one or more paths. Optionally, a path included in the tunnel is an LSP. As shown in FIG. 1, for example, a tunnel 1 is a set of paths between PE1 and PE3. The tunnel 1 includes two paths. One path included in the tunnel 1 is PE1→P1→P3→PE3, and the path is a primary path included in the tunnel 1. The other path included in the tunnel 1 is PE1→PE2→P2→P4→PE4→PE3, and the path is a backup path included in the tunnel 1. For another example, a tunnel 2 is a set of paths between PE2 and PE4. The tunnel 2 includes two paths. One path included in the tunnel 2 is PE2→P2→P4→PE4, and the path is a primary path included in the tunnel 2. The other path included in the tunnel 2 is PE2→PE1→P1→P3→PE3→PE4, and the path is a backup path included in the tunnel 2. PE means a provider edge device, and P means a provider device.

A primary path is a main path planned for end-to-end. Optionally, if a plurality of different LSPs is pre-planned in one tunnel, the primary path is a primary LSP in the tunnel. Optionally, if only one LSP is pre-planned in a tunnel, the primary path may be the LSP, or may be the tunnel. A fault that occurs on the primary path includes a node fault on the primary path and a link fault on the primary path. The planned end-to-end path may include two elements: a node and a link between different nodes. When fault detection is performed on the primary path, a source node sends a packet to an egress node on the primary path. If a transit node on the primary path is faulty or a link connected to the transit node is faulty, the primary path is faulty.

A local protection path is a protection path that does not pass through a fault point. For example, if a local fault is a node fault, the local protection path is a path that does not pass through the faulty node; if a local fault is a link fault, the local protection path is a path that does not pass through the faulty link. Generally, the local protection path meets only a constraint of skipping a faulty node or a faulty link and does not replace the primary path. A head node on the local protection path is usually a transit node on the primary path. The local protection path includes a topology-independent loop-free alternate fast reroute (TI-LFA FRR) path and a midpoint topology-independent loop-free alternate (Midpoint TI-LFA) path.

A local protection algorithm is an algorithm used by a transit node to switch to a local protection path. For example, a previous-hop node of a faulty node calculates, by using the local protection algorithm, another path for skipping the faulty node, and the calculated path is a local protection path.

TI-LFA FRR provides link and node protection for an SR tunnel. If a link or a node is faulty, traffic is quickly switched to a backup path for continuous forwarding, so that a traffic loss is minimized. In some LFA FRR and remote LFA scenarios, P space and Q space do not intersect or have direct neighbors. As a result, a backup path cannot be calculated, and a reliability requirement cannot be met. In this case, TI-LFA is implemented. By using a TI-LFA algorithm, the P space, the Q space, and a post-convergence shortest path tree are calculated based on a protection path, a repair list is calculated based on different scenarios, and an SR tunnel is established between a source node and a PQ node to form backup next-hop protection. If a protection link is faulty, traffic is automatically switched to a tunnel backup path for continuous forwarding, so that network reliability is improved. A conventional LFA technology needs to ensure that at least one neighbor has a loop-free next hop to a destination node. An RLFA technology needs to ensure that at least one node exists on a network and a path from a source node to the node and a path from the node to a destination node do not pass through a faulty node. The TI-LFA technology may use an explicit path to indicate a backup path, impose no restriction on a topology, and provide an FRR technology with higher reliability. When TI-LFA is deployed on an SRv6 network, 50 ms switching performance of local protection can be met. In addition, SBFD for SRv6 TE Policy List may be deployed to quickly detect an end-to-end fault, so as to meet a 50 ms switching performance of an end-to-end service. An end-to-end protection path is a global protection path. For an end-to-end primary path, end-to-end protection is implemented by providing an end-to-end backup path, and the backup path is an end-to-end protection path. The end-to-end protection path includes the following implementations.

Manner 1: Two different LSPs are planned in one tunnel. The two different LSPs are respectively a primary LSP and a backup LSP, and the backup LSP is an end-to-end protection path of the primary LSP. For example, two end-to-end paths, namely, path1 "A-B-D" and path2 "A-C-D", may be deployed between the node A and the node D. There is a primary/backup relationship between path1 and path2, path1 can be planned as a primary path, and path2 can be planned as a backup path.

Manner 2: There are two tunnels from a source to a destination. The two tunnels have a same source and sink. In other words, source nodes are the same and sink nodes are the same. The two tunnels are respectively a primary tunnel and a backup tunnel. The backup tunnel is an end-to-end protection path of the primary tunnel. The primary tunnel and the backup tunnel are iterated by two virtual private network (Virtual Private Network, VPN) services, and VPN protection is implemented.

The packet processing method provided in the embodiments can be applied to a scenario in which a local protection mechanism and an end-to-end protection mechanism coexist. In this scenario, a service preferentially travels on a local protection path. For example, a customer has SLA requirements on the network, which can be implemented by planning different paths that meet the SLA requirements. For another example, a customer deploys local protection (such as TI-LFA or Midpoint TI-LFA) on the network. In this case, when a node or a link is faulty, a device preferentially switches to a local protection path, but cannot quickly switch to an end-to-end protection path. For example, local protection TI-LFA/Midpoint TI-LFA and the end-to-end BFD detection technology are deployed on the SRv6 network. A BFD detection packet and a service data packet are transmitted through a same path. In addition, when local protection is implemented, protocol packet interaction can still be implemented through a TI-LFA protection path. In this case, a link fault cannot be quickly detected and a service cannot be switched to a backup path. Consequently, traffic is diverted to an unknown path for a long time. When a fault occurs, a service path needs to wait for a controller or another path computation module to trigger a service to switch to a backup path on a head node or re-deliver a path that meets the SLA requirement to a head node. On a new path, a current service path is diverted to the TI-LFA protection path for a long time. In this case, the path cannot meet the SLA requirement. However, in the following embodiment, a protection flag can be added to a detection packet, to prevent the detection packet from going through a local protection path. Therefore, when a local fault occurs, the detection packet may be lost, so as to trigger a source node of the detection packet to switch the packet to an end-to-end protection path.

The following describes an example of a system architecture.

FIG. 1 shows a packet processing system according to an embodiment. As shown in FIG. 1, the system includes a plurality of network devices, and different network devices are connected to each other through a network. The plurality of network devices may include but may not be limited to a customer edge (CE) device, a provider (P) device, and a provider edge (PE) device. The system architecture 100 deploys a primary path and a protection path used to protect the primary path.

The packet processing system may include CE1, PE1, PE2, P1, P2, P3, P4, PE3, PE4, and CE2. In the packet processing system, some providers use a tunneling technology to meet a customer's SLA quality requirement such as a bandwidth requirement or a delay requirement. In a tunnel, different paths may be planned according to customer's requirements, as shown in FIG. 1. A tunnel 1 is established between PE1 and PE3, and two completely separated paths are planned for the tunnel 1. A primary path in the tunnel 1 is PE1→P1→P3→PE3, a head node on the primary path in the tunnel 1 is PE1, transit nodes on the tunnel 1 include P1 and P3, and an egress node on the tunnel 1 is PE3. A backup path in the tunnel 1 is PE1→PE2→P2→P4→PE4→PE3. A head node on the backup path in the tunnel 1 is PE1, transit nodes on the backup path in the tunnel 1 include PE2, P2, P4, and PE4, and an egress node on the backup path in the tunnel 1 is PE3. The backup path in the tunnel 1 is an end-to-end protection path of the primary path in the tunnel 1. The primary path in the tunnel 1 and the backup path in the tunnel 1 are two different LSPs in one tunnel, and the two LSPs form a primary/backup LSP relationship.

A tunnel 2 is established between PE2 and PE4, and two completely separated paths are planned for the tunnel 2. A primary path in the tunnel 2 is PE2→P2→P4→PE4. A head node on the primary path in the tunnel 2 is PE2, transit nodes on the primary path in the tunnel 2 include P2 and P4, and an egress node on the primary path in the tunnel 2 is PE4. A backup path in the tunnel 2 is PE2→PE1→P1→P3→PE3→PE4. The backup path in the tunnel 2 is an end-to-end protection path of the primary path in the tunnel 2. The primary path in the tunnel 2 and the backup path in the tunnel 2 are two different LSPs in one tunnel, and the two LSPs form a primary/backup LSP relationship.

The tunnel 1 and the tunnel 2 optionally meet different SLA requirements. For example, the tunnel 1 meets a high bandwidth requirement. If a customer has a service with a bandwidth requirement, the tunnel 1 may be used to carry the service. The tunnel 2 meets a delay requirement. If a customer has a service with a delay requirement, the tunnel 2 may be used to carry the service.

A tunnel is used to externally carry a service, but a path planned in the tunnel is used to guide traffic forwarding. When service traffic is carried on a tunnel, service traffic continuity needs to bet be ensured. The service traffic continuity cannot be interrupted due to a physical network element fault or a software fault. Therefore, when service traffic is carried on a tunnel, if a physical network element fault (a link fault of a network element or a fault of the entire network element) or a software (protocol) fault occurs, a protection mechanism needs be provided for the tunnel, to ensure that a service carried on the tunnel is not interrupted or is not interrupted for a long time. For a service with an SLA quality requirement, the SLA quality requirement still needs to be met when a network element fault or a link fault occurs. This assurance means is classified into a tunnel protection solution and a service protection solution. The tunnel protection solution includes a local tunnel protection technology and an end-to-end tunnel protection technology. The service protection solution includes a VPN FRR protection means. Service protection means protecting a service running on a VPN.

Figure 2:
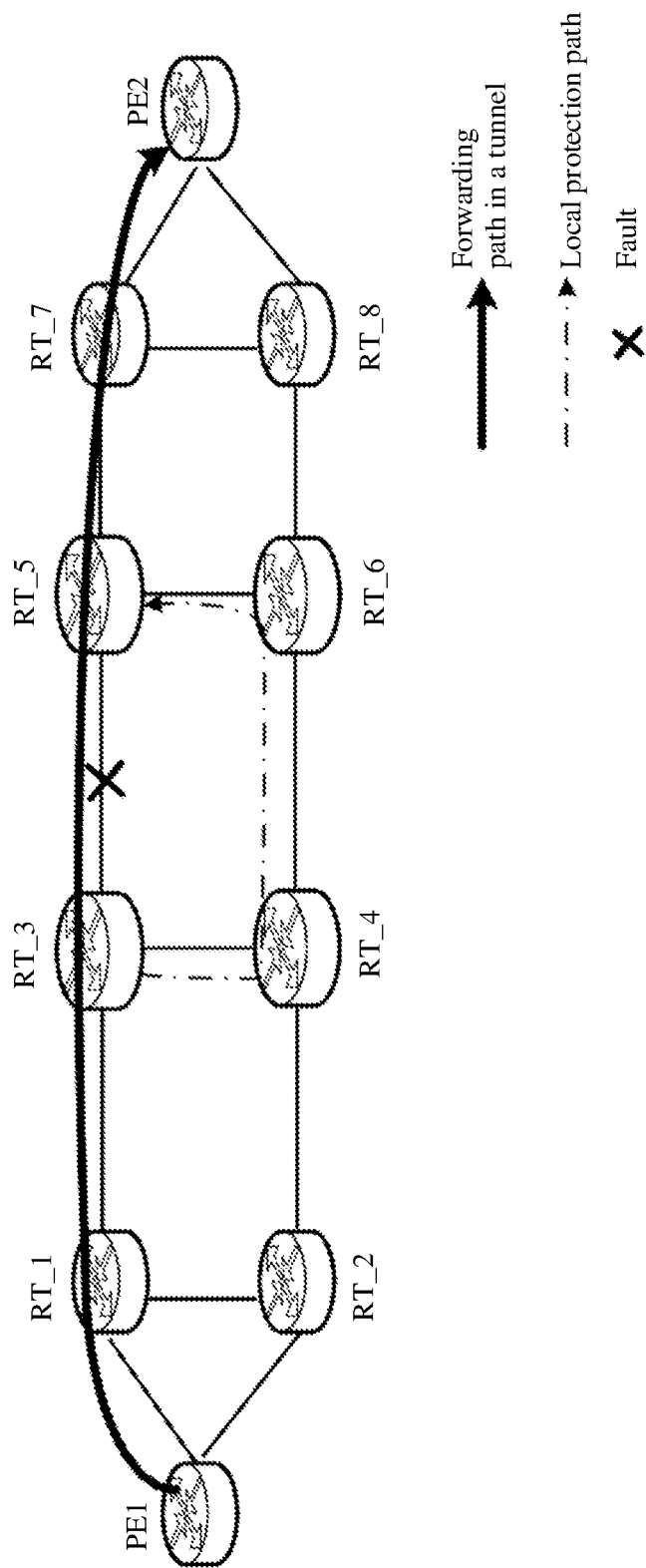
FIG. 2 is a schematic diagram of a local tunnel protection solution according to an embodiment.

For the local tunnel protection solution, the local tunnel protection technology means locally adjusting, when a fault (a network element fault or a link fault) occurs, a path through which a tunnel that is currently carrying service traffic passes. As shown in FIG. 2, a bold solid line indicates a forwarding path in a tunnel, and the forwarding path is PE1→RT_1→RT_3→RT_5→RT_7→PE2. When a link between RT_3 and RT_5 is faulty, RT_3 starts a local protection mechanism. Finally, a path that carries service traffic is switched to a local protection path. The local protection path is shown by a dotted-dashed line in FIG. 2, the local protection path is RT_3→RT_4→RT_6→RT_5, and an ingress node on the local protection path is RT_3.

Figure 3:
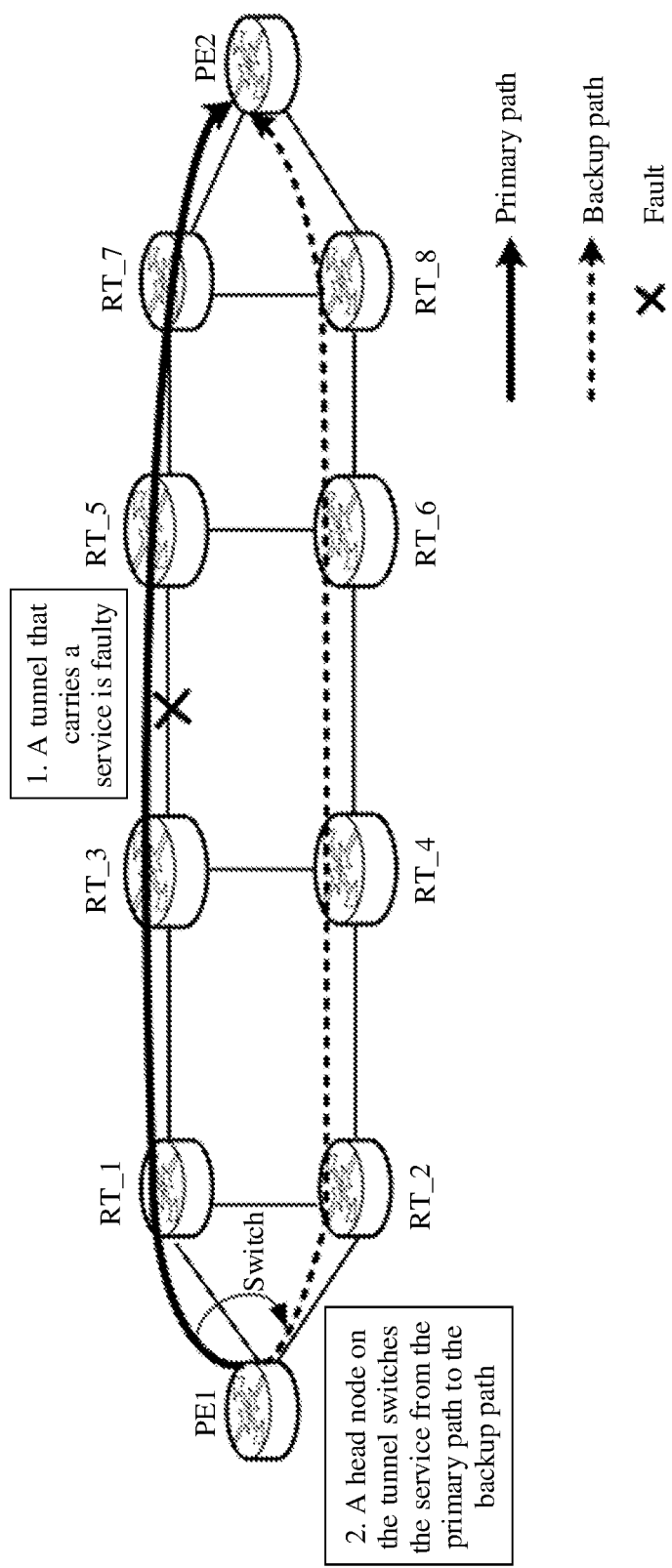
FIG. 3 is a schematic diagram of an end-to-end tunnel protection solution according to an embodiment.

For the end-to-end tunnel protection solution, the end-to-end protection technology requires that at least two paths that can carry service traffic exist in a tunnel. One path is a primary path, and the other paths are backup paths. A service is carried on only one path at a moment. When the primary path that carries the service is faulty, the head node on the tunnel switches the service to the backup path. As shown in FIG. 3, the service is originally carried through the primary path. When a path between RT_3 and RT_5 is faulty, the head node PE1 switches the service to the backup path. The primary path is shown by a bold solid line in FIG. 3, and the primary path is PE1→RT_1→RT_3→RT_5→RT_7→PE2. The backup path is shown by dashed lines in FIG. 3, and the backup path is PE1→RT_2→RT_4→RT_6→RT_8→PE2.

Figure 4:
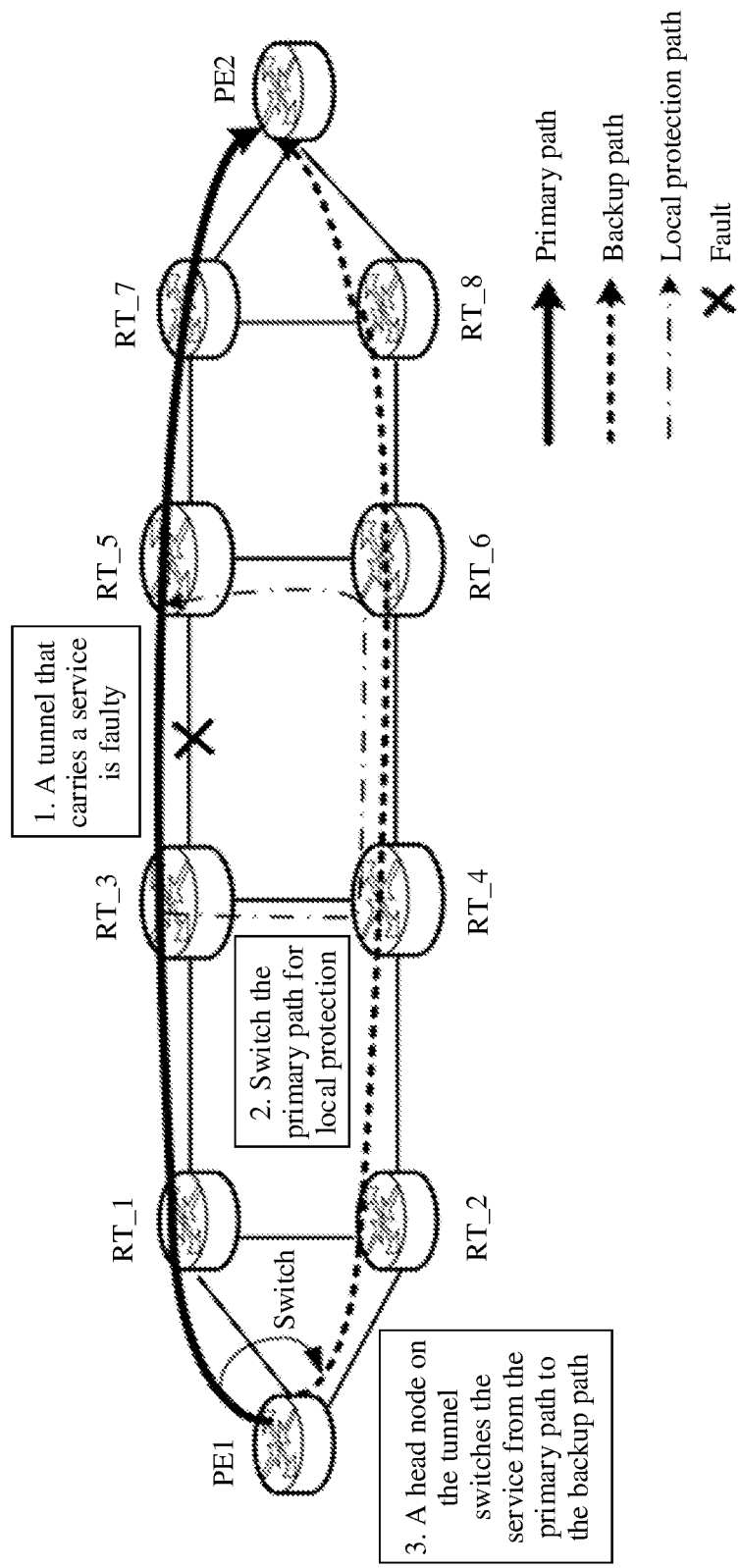
FIG. 4 is a schematic diagram of a solution combining local tunnel protection and end-to-end tunnel protection according to an embodiment.

For a combination of the local tunnel protection and the end-to-end tunnel protection, the local protection is protection for a single path, and can also be used to protect the primary path in the end-to-end protection technology. For example, when a network element of the primary path is faulty or a link between network elements is faulty, the local protection may be first performed to ensure connectivity of the primary path. Then, the end-to-end protection is performed to switch the service to another backup path, so as to meet a related SLA requirement. As shown in FIG. 4, the service is carried on the primary path. The primary path in FIG. 4 is shown by a bold solid line, and the primary path in FIG. 4 is PE1→RT_1→RT_3→RT_5→RT_7→PE2. If the path between RT_3 and RT_5 is faulty, the node RT_3 starts the local protection mechanism to switch the service to the local protection path, so as to ensure service continuity. The local protection path is shown by a dashed line in FIG. 4, and the local protection path is RT_3→RT_4→RT_6→RT_5. However, in this case, the local protection path does not meet the SLA requirement. When detecting that the primary path is faulty, the head node PE1 switches the service to the backup path.

Figure 5:
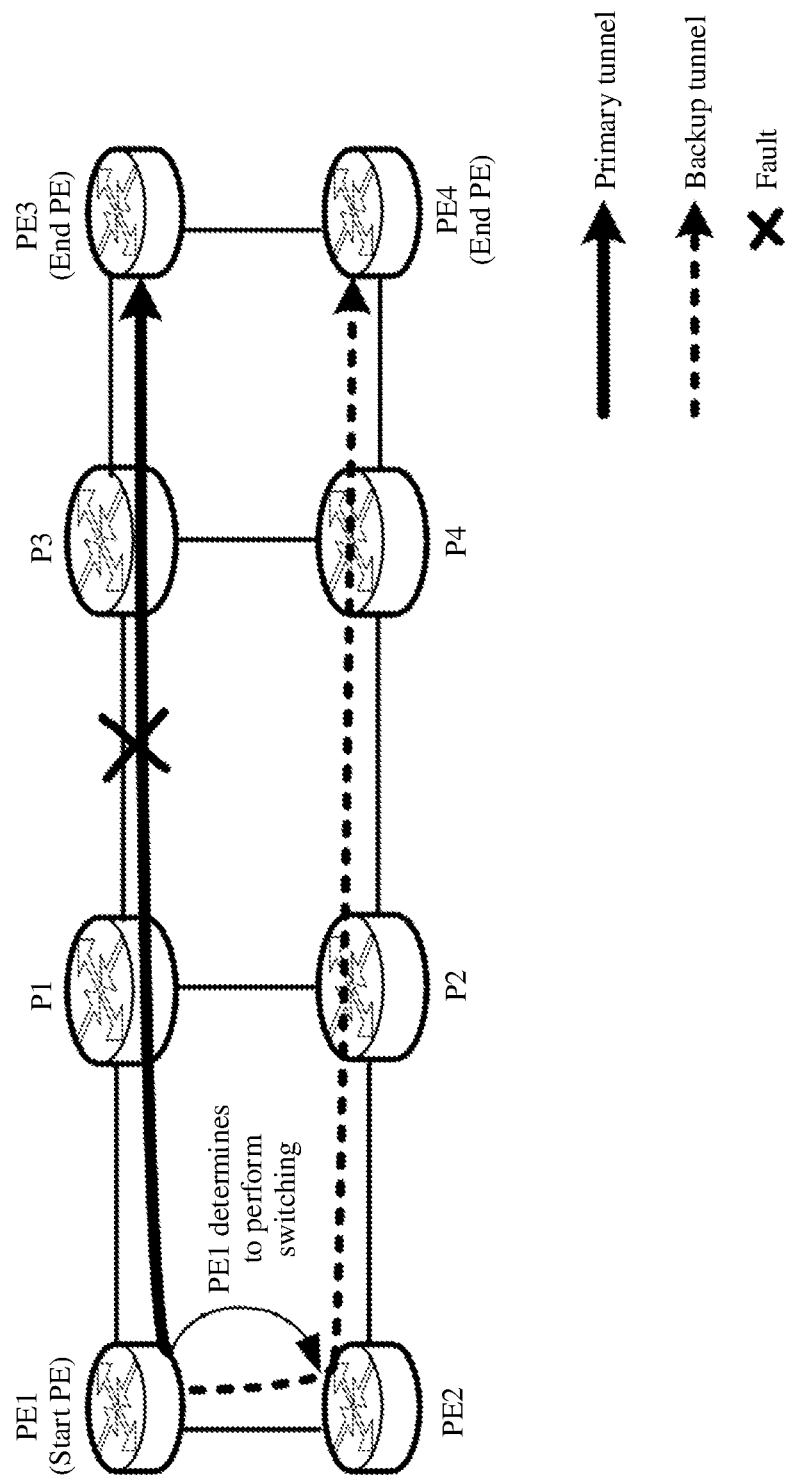
FIG. 5 is a schematic diagram of a VPN FRR technology according to an embodiment.

For end-to-end service protection (VPN FRR technology), the VPN FRR technology is an end-to-end service protection technology. This technology uses tunnels to carry services, and destination addresses of the tunnels are different remote PE nodes (one CE accesses two PEs). Different paths may be deployed in a tunnel, which means that the end-to-end tunnel protection and local tunnel protection technologies can be used. When a tunnel that carries service traffic is faulty, the service may be switched to another backup tunnel by using the VPN FRR technology. As shown in FIG. 5, two tunnels are established with PE1 as an ingress, a primary tunnel in the two tunnels is PE1→P1→P3→PE3, and a backup tunnel in the two tunnels is PE1→PE2→P2→P4→PE4. Both an ingress PE of the primary tunnel and an ingress PE of the backup tunnel are PE1, an egress PE of the primary tunnel is PE3, and an egress PE of the backup tunnel is PE4. When the primary tunnel is faulty, PE1 determines tunnel switching through VPN FRR. In a possible implementation, PE1 pre-stores routing information used to reach PE3 and routing information used to reach PE4 in a routing and forwarding table. If PE1 determines that the primary tunnel is faulty, after PE1 receives traffic, PE1 sends, to PE4 based on the routing information used to reach PE4 in the routing and forwarding table, the traffic originally sent to PE3, so as to switch a service from the primary tunnel to the backup tunnel.

On an SRv6 network, TI-LFA and Midpoint TI-LFA are local tunnel protection technologies. When a network element or a link on a path is faulty, the two technologies TI-LFA and Midpoint TI-LFA may be used to implement local protection. However, the two local protection technologies can ensure only link connectivity but cannot ensure service SLA quality.

SBFD for SRv6 TE Policy List is a protection technology implementing end-to-end tunnel fault detection and fast convergence (implementing end-to-end tunnel protection). First, two paths (also referred to as List) that meet SLA requirements need to be deployed on an SRv6 TE Policy tunnel, and primary and backup paths need to be distinguished and completely separated. In addition, BFD is performed to detect the primary and backup paths. When BFD detects that the primary path is faulty, a service may be quickly switched to the backup path, so as to implement fast service convergence.

Figure 6:
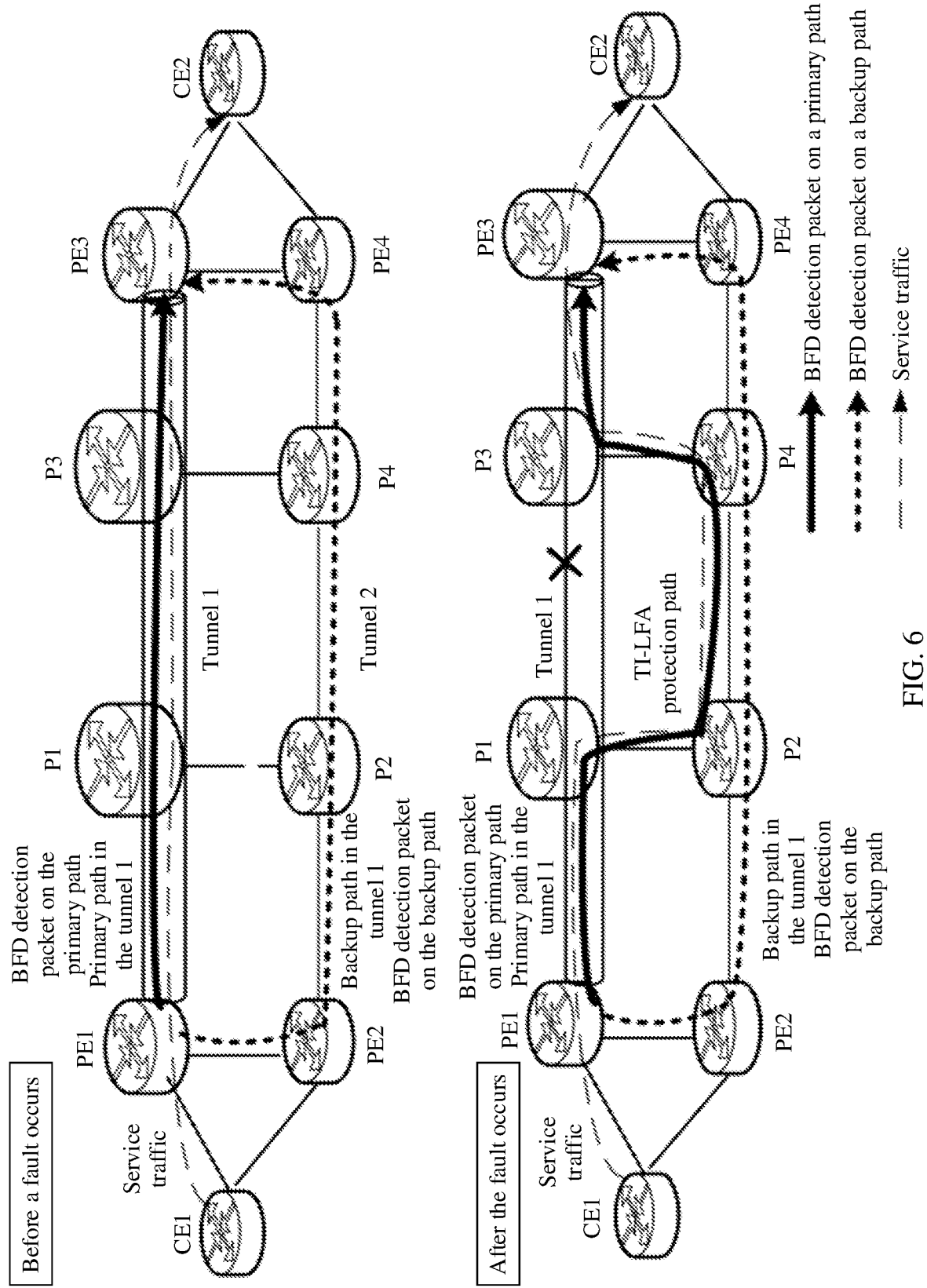
FIG. 6 is a schematic diagram of a BFD detection mechanism used when local protection occurs according to an embodiment.

When both the local protection technology TI-LFA/Midpoint TI-LFA and the end-to-end BFD detection technology are deployed on the SRv6 network, a BFD detection packet and a service data packet are forwarded through a same path. For example, as shown in FIG. 6, before a fault occurs, a BFD detection packet on a primary path is transmitted from PE1 to PE3 through a path PE1→P1→P3→PE3, and service traffic is transmitted from CE1 to CE2 through a path CE1→PE1→P1→P3→PE3→CE2.

When local protection occurs, a BFD detection mechanism can still complete BFD detection packet exchange through the TI-LFA protection path. For example, as shown in FIG. 6, after a link between P1 and P3 is faulty, P1 switches the BFD detection packet to the TI-LFA protection path, and therefore the BFD detection packet on the primary path is transmitted from PE1 to PE3 through a path PE1→P1→P2→P4→P3→PE3, so that PE3 can receive and respond to the BFD detection packet. In this case, a head node on a tunnel cannot quickly detect the link fault, and a service cannot be triggered on the head node to be quickly switched to a backup path. Consequently, the traffic is diverted to the local protection path for a long time, and the traffic diverted to the local protection path for a long time cannot meet a customer's SLA requirement. When local protection occurs and the head node cannot quickly perform switching to the backup path, only a controller or another path computation module can be used to trigger the service to be transmitted through the backup path on the head node, or a path that meets the SLA requirement is re-delivered to the head node. This process takes a long time, and consequently a current service may be diverted to the TI-LFA protection path for a long time.

The foregoing describes the system architecture, and the following describes a procedure of a packet forwarding method by using an example.

Embodiment 1

Figure 7:
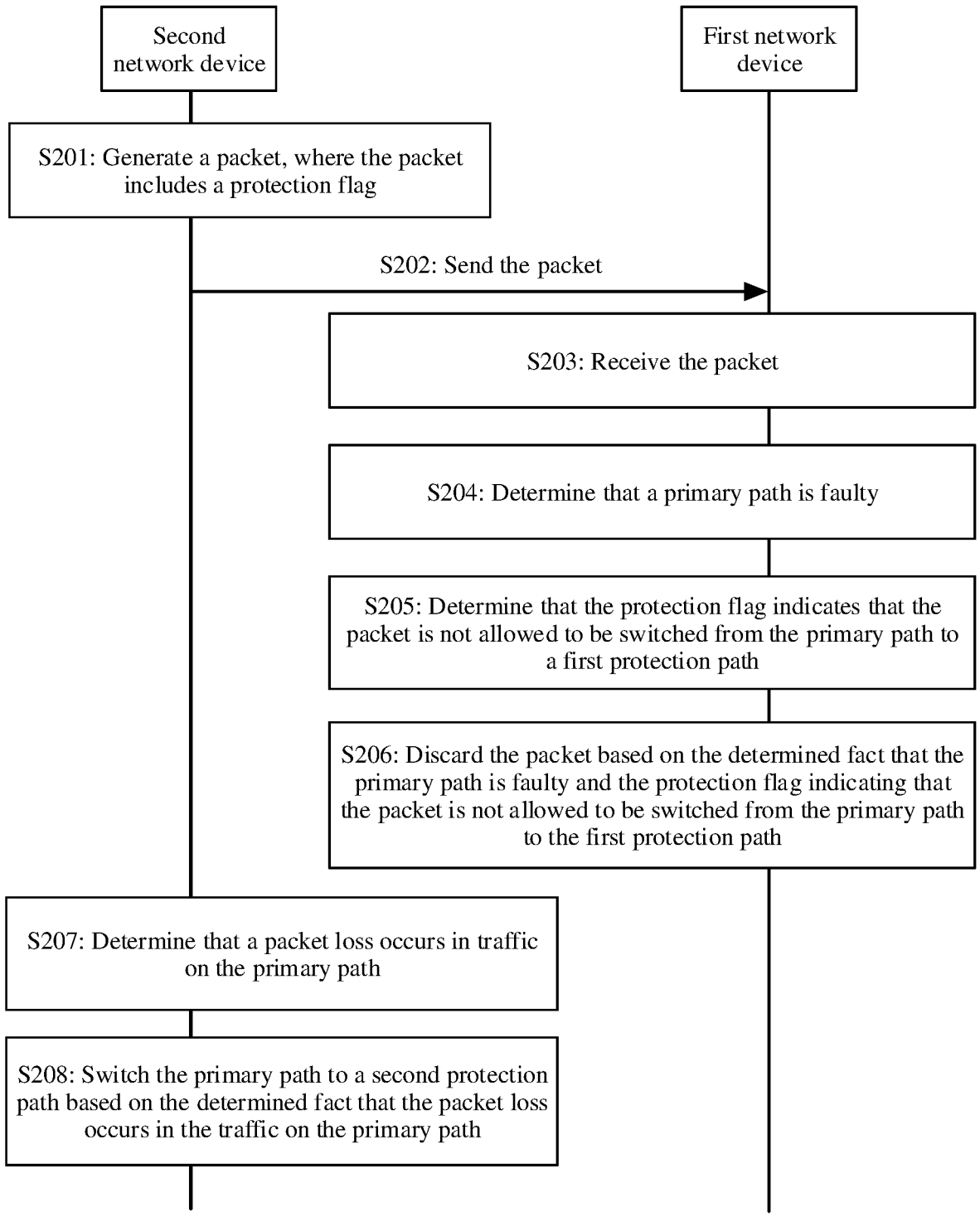
FIG. 7 is a flowchart of a packet processing method according to Embodiment 1.

FIG. 7 shows a packet processing method according to Embodiment 1. Embodiment 1 includes S201 to S208. Optionally, S201, S202, S207, and S208 in Embodiment 1 may be performed by one network device, for example, performed by PE1 in FIG. 2. S203 to S206 in Embodiment 1 may be performed by another network device, for example, performed by RT_3 in FIG. 2.

Optionally, Embodiment 1 is processed by a central processing unit (CPU). Optionally, Embodiment 1 is processed by a network processor (NP for short). Optionally, Embodiment 1 may be jointly processed by a CPU and an NP. Optionally, Embodiment 1 may be not processed by a CPU or an NP but may be processed by another processor suitable for packet forwarding, for example, a field programmable gate array (FPGA) chip or another application-specific integrated circuit (ASIC) chip. This is not limited.

S201: A second network device generates a packet, where the packet includes a protection flag.

In this embodiment, the protection flag is added to the packet, and a multi-side interaction procedure for the protection flag is described. This embodiment relates to a method in which a device that receives the packet performs processing based on the protection flag and relates to a method in which a device that sends the packet adds the protection flag to the packet. To distinguish between different network devices, a network device serving as a packet receiving side is referred to as a first network device, and a network device serving as a packet sending side is referred to as a second network device. Optionally, the protection flag includes at least one of T Flag and M Flag. T in T Flag indicates TI-LFA. T Flag is used to indicate whether the first network device is allowed to switch the packet from a primary path to a TI-LFA protection path. M in M Flag indicates Midpoint TI-LFA. M Flag is used to indicate whether the first network device is allowed to switch the packet from the primary path to a Midpoint TI-LFA protection path.

Optionally, the second network device is a head node on the primary path. In other words, the second network device is an ingress node on the primary path. For example, as shown in FIG. 1, the second network device is PE1, and PE1 is the head node on the primary path. For example, in an SR scenario, the primary path is an LSP in an SR tunnel, and the second network device is a head node on the SR tunnel. A SID list is pushed to the packet on the second network device, and each SID in the SID list is used to identify each node on the LSP in the SR tunnel. After the second network device sends the packet from an outbound interface, the packet can be transmitted on the LSP in the SR tunnel by using the SID list. In this case, the packet is introduced to the LSP in the SR tunnel from the second network device. In an SR-TE scenario of SR MPLS, the SID list may be referred to as a label stack. In an SRv6 scenario, the SID list may be a segment list in an SRH. In terms of physical hardware, the second network device is, for example, a switch or a router.

Optionally, the first network device is a node along the primary path, and the first network device may be a transit node on the primary path. The packet on the primary path passes through the first network device during transmission. For example, as shown in FIG. 1, the first network device is P1 in FIG. 1. For another example, as shown in FIG. 2, the first network device is RT_3 in FIG. 2. In terms of physical hardware, the first network device is, for example, a switch or a router.

The protection flag is used to indicate whether the first network device is allowed to switch the packet from the primary path to a first protection path. For example, as shown in FIG. 2, the protection flag is used to indicate whether RT_3 is allowed to switch the packet from the primary path to a local protection path obtained by RT_3 through calculation.

The first protection path is used to protect the primary path. The first protection path is a local protection path of the primary path. An ingress node on the first protection path is the first network device. The first protection path and the primary path may belong to a same tunnel. For example, as shown in FIG. 2, the primary path includes PE1→RT_1→RT_3→RT_5→RT_7→PE2, and the primary path is an LSP in a tunnel between PE1 and PE2. The first protection path includes RT_3→RT_4→RT_6→RT_5, and the first protection path is another LSP in the tunnel between PE1 and PE2. The first network device is, for example, RT_3 in FIG. 2, and the primary path starts to be switched from RT_3 to the first protection path. Herein, → indicates a packet transmission direction, a left side of → identifies a packet transmit end, and a right side of → identifies a packet receive end. For example, PE1→RT_1 indicates that PE1 sends the packet to RT_1.

Optionally, the first protection path is a local protection path, and has any feature of the local protection path in the concept introduction part. The first protection path may be used to protect a node on the primary path. If a node on the primary path is faulty, a constraint that the first protection path meets may be that the first protection path does not pass through a faulty node on the primary path. Alternatively, the first protection path may be used to protect a link on the primary path. If a link on the primary path is faulty, a constraint that the first protection path meets may be that the first protection path does not pass through a faulty link on the primary path. Generally, the first protection path is optionally a path that skips a faulty node or a faulty link on the primary path, and generally does not replace the entire primary path.

For example, the first protection path includes a TI-LFA FRR path, the first protection path may be referred to as a "TI-LFA FRR backup path", and the first protection path is a path obtained by the first network device through calculation by using a TI-LFA algorithm. For another example, the first protection path includes a Midpoint TI-LFA path, and the first protection path may be referred to as "Bypass CR-LSP".

Optionally, when the primary path works, the first protection path is in an idle state and does not independently carry service data.

Optionally, in an SLA assurance scenario, the primary path is a path that meets the SLA, and the first protection path is a path that does not meet the SLA. For example, a delay of the primary path meets an SLA delay requirement, and a delay of the first protection path does not meet the SLA delay requirement. For example, the delay of the primary path is less than a delay threshold, and the delay of the first protection path is greater than the delay threshold. For another example, a bandwidth of the primary path meets an SLA bandwidth requirement, and a bandwidth of the first protection path does not meet the SLA bandwidth requirement. For example, the bandwidth of the primary path is greater than a bandwidth threshold, and the bandwidth of the first protection path is less than the bandwidth threshold.

The following explains and describes the protection flag from a plurality of perspectives.

The following describes the protection flag from the perspective of a function of the protection flag by using Case A and Case B as examples.

Case A: The protection flag not only can indicate whether the packet is allowed to pass through the first protection path, but also can indicate a type of a first protection path that is allowed or a type of a first protection path that is not allowed. For example, the first network device enables a plurality of local protection mechanisms, and the first network device can forward the packet through one of the plurality of local protection paths. In this scenario, the protection flag can indicate a local protection path that is allowed to be used in the plurality of local protection paths and a type of a local protection path that is not allowed to be used, so that the packet does not pass through the specified local protection path in the plurality of local protection paths.

This improves flexibility.

The following describes Case A by using Case A1 to Case A4 as examples. In Case A1 to Case A4, the Midpoint TI-LFA path and the TI-LFA FRR path are two cases of the first protection path.

Case A1: The protection flag indicates that the first network device is not allowed to switch the packet from the primary path to the Midpoint TI-LFA path and the TI-LFA FRR path. The Midpoint TI-LFA path and the TI-LFA FRR path are two cases of the first protection path. In Case A1, the packet that carries the protection flag is not allowed to pass through the Midpoint TI-LFA path, and the packet that carries the protection flag is not allowed to pass through the TI-LFA FRR path either.

Case A2: The protection flag indicates that the first network device is not allowed to switch the packet to the Midpoint TI-LFA path but is allowed to switch the packet to the TI-LFA FRR path. In Case A2, the packet that carries the protection flag is not allowed to pass through the Midpoint TI-LFA path, but the packet that carries the protection flag is allowed to pass through the TI-LFA path.

Case A3: The protection flag indicates that the first network device is allowed to switch the packet to the Midpoint TI-LFA path but is not allowed to switch the packet to the TI-LFA FRR path. In Case A3, the packet that carries the protection flag is not allowed to pass through the TI-LFA path, but the packet that carries the protection flag is allowed to pass through the Midpoint TI-LFA path.

Case A4: The protection flag indicates that the first network device is allowed to switch the packet from the primary path to the Midpoint TI-LFA path or the TI-LFA FRR path. In Case A4, the packet that carries the protection flag is allowed to pass through the TI-LFA path, and the packet that carries the protection flag is also allowed to pass through the Midpoint TI-LFA path.

Case B: The protection flag only indicates whether switching to a protection path is allowed but does not indicate a type of the protection path. Optionally, the protection flag indicates that the first network device is not allowed to switch the packet from the primary path to the first protection path. In Case B, the packet that carries the protection flag is not allowed to pass through the first protection path. Optionally, the first protection path is a local protection path, and the first network device enables a plurality of local protection mechanisms. In this case, Case B optionally includes Case B1 and Case B2.

Case B1: The protection flag indicates that the first network device is not allowed to switch the packet from the primary path to all first protection paths.

Case B2: The protection flag indicates that the first network device is not allowed to switch the packet from the primary path to a pre-configured first protection path. For example, a local protection path is pre-configured on the first network device, and whether the local protection path is allowed to be used may be indicated by using a protection flag. In this case, the protection flag indicates that the packet is not allowed to pass through the pre-configured local protection path.

From the perspective of a data form of the protection flag, the protection flag may occupy one or more bits in the packet, and a value of the bit may be 0 or 1. The protection flag can indicate, by using different bit values, whether the packet is allowed to be switched from the primary path to the first protection path. The data form of the protection flag may include a plurality of cases. The following describes the protection flag from the perspective of the data form by using Case C and Case D as examples.

Figure 8:
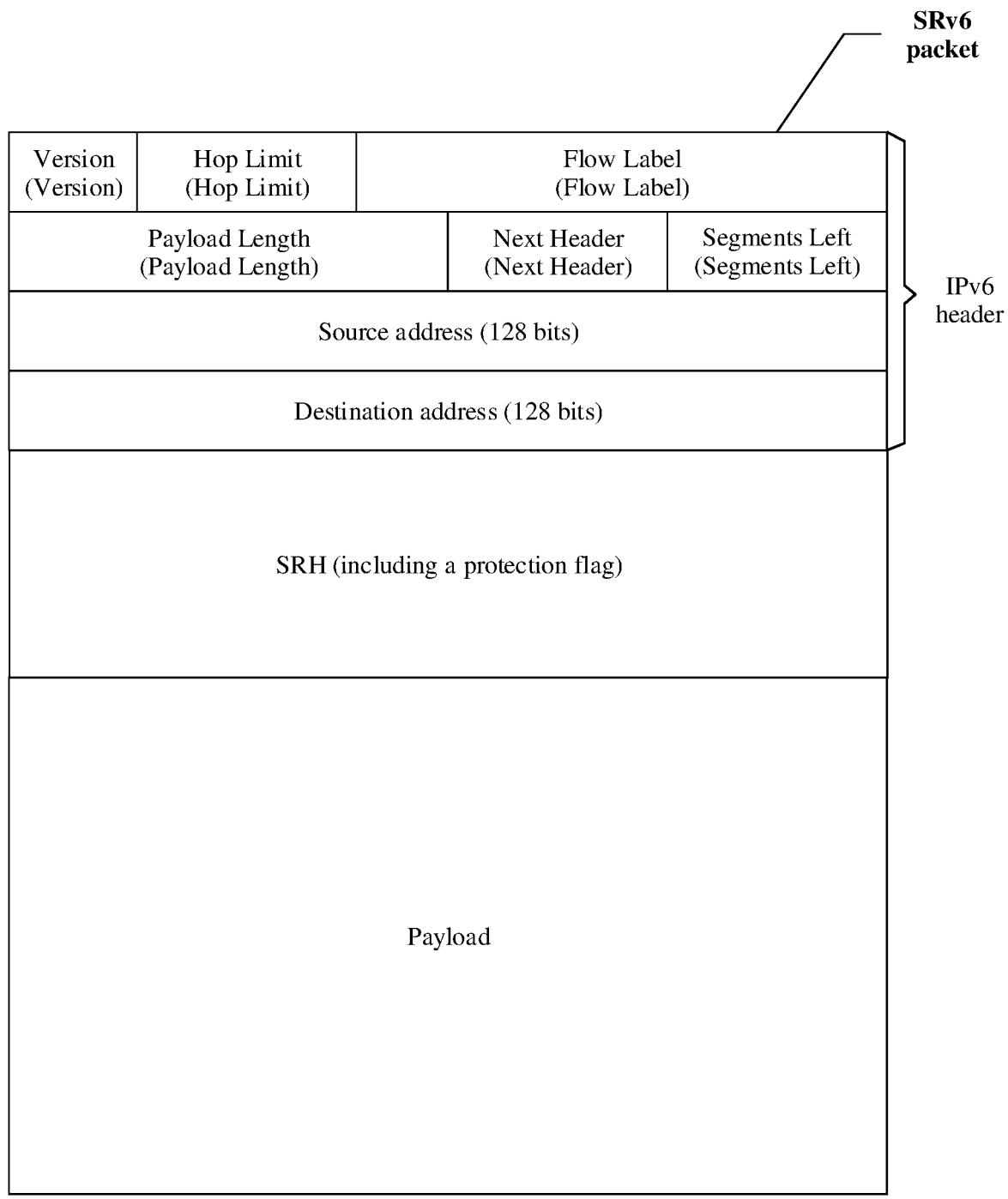
FIG. 8 is a schematic diagram of an SRv6 packet according to an embodiment.

Case C: The protection flag occupies two bits, and values of the two bits can be used to indicate whether the first network device is allowed to switch the packet from the primary path to the first protection path. For example, FIG. 8 is a schematic diagram of an SRv6 packet according to an embodiment. The protection flag occupies two bits in the SRv6 packet. For example, an SRH in the SRv6 packet occupies two bits. As shown in FIG. 9, the SRH in the SRv6 packet includes a Flags field and a TLV. Optionally, the protection flag occupies two bits in the Flags field. Optionally, the protection flag occupies two bits in the TLV. It should be understood that occupying two bits in the Flags field or two bits in the TLV is used as an example for description, and two bits in the packet that are occupied by the protection flag are not limited in this embodiment. Optionally, the protection flag occupies two bits in a reserved field in the packet, and the reserved field is optionally a field in a packet header, for example, a field in an extension header.

Optionally, the two bits are adjacent bits, and the two bits include four values: 00, 01, 10, and 11, so that different cases can be indicated by using the four values.

An example in which the protection flag occupies a second bit and a third bit in the packet is used below to describe Case C by using Case C1.1 to Case C1.4. It should be understood that the second bit and the third bit herein may be any two different bits, the second bit is not limited to the $2^{nd}$ bit in a field, the third bit is not limited to the $3^{rd}$ bit in a field either, and the second bit is not limited to being in front of the third bit.

Figure 10:
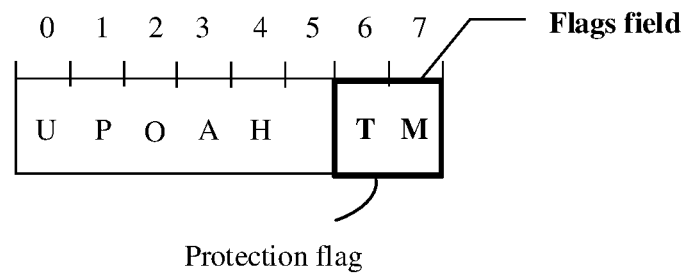
FIG. 10 is a schematic diagram of a Flags field that carries a protection flag according to an embodiment.

For example, as shown in FIG. 10, in the Flags field (Flags field), the $1^{st}$ bit is bit0, the $2^{nd}$ bit is bit1, and the second bit is bit7, that is, the second bit is bit6. The third bit is the $8^{th}$ bit in the Flags field, that is, the third bit is bit7. In other words, the protection flag occupies bit6 and bit7 in the Flags field. The protection flag is "T/M" in FIG. 10.

In addition, U in FIG. 10 indicates an unused flag, and U may be provided as a flag for future use. In addition, U should not be set during transmission, and the receive end needs to ignore U. P Flag (P Flag) indicates a protected flag. If the packet has been rerouted by an SR end node by using an FRR mechanism, P Flag is set. O Flag (O Flag) is an OAM flag. When O Flag is set, it indicates that the packet is an OAM packet. A Flag (A Flag) is an alert flag. If A Flag exists, it indicates that an important TLV object exists in the packet. H Flag (H Flag) indicates an HMAC flag. If H Flag is set, it indicates that an HMAC TLV exists in the packet, and the HMAC TLV is encoded as the last TLV of the SRH. In other words, the last 36 octets of the SRH indicate HMAC information. In FIG. 10, T is T Flag. If T Flag is set, the packet needs to not pass through the TI-LFA path. In FIG. 10, M is M Flag. If M Flag is set, the packet needs to not pass through the Midpoint TI-LFA path.

Case C1: If both the second bit and the third bit are set, it indicates that the first network device is not allowed to switch the packet from the primary path to the Midpoint TI-LFA path and the TI-LFA FRR path.

In Case C1, if a value of the second bit is 1, and a value of the third bit is also 1, it indicates that the packet is not allowed to be switched from the primary path to the Midpoint TI-LFA path or the TI-LFA FRR path. For example, as shown in FIG. 10, bit6 in the Flags field carries T Flag. If T Flag is set, it indicates that the packet cannot pass through the TI-LFA protection path. In addition, bit7 in the Flags field carries M Flag. If M Flag is set, it indicates that the packet cannot pass through the Midpoint TI-LFA protection path. If values of bit6 and bit7 (T/M in FIG. 10) in the Flags field are "11", it indicates that the packet is not allowed to pass through the TI-LFA path, and the packet is not allowed to pass through the Midpoint TI-LFA path either.

Case C2: If the second bit is set and the third bit is not set, it indicates that the first network device is not allowed to switch the packet to the Midpoint TI-LFA path but is allowed to switch the packet to the TI-LFA FRR path.

In Case C2, if a value of the second bit is 1, and a value of the third bit is 0, it indicates that the packet is not allowed to be switched to the Midpoint TI-LFA path but is allowed to be switched to the TI-LFA FRR path. For example, as shown in FIG. 10, if values of bit6 and bit7 (T/M in FIG. 10) in the Flags field are "10", it indicates that the packet is allowed to pass through the TI-LFA path, but the packet is not allowed to pass through the Midpoint TI-LFA path.

Case C3: If the second bit is not set and the third bit is set, it indicates that the first network device is allowed to switch the packet to the Midpoint TI-LFA path but is not allowed to switch the packet to the TI-LFA FRR path.

In Case C3, if a value of the second bit is 0, and a value of the third bit is 1, it indicates that the packet is allowed to be switched to the Midpoint TI-LFA path but is not allowed to be switched to the TI-LFA FRR path. For example, as shown in FIG. 10, if values of bit6 and bit7 (T/M in FIG. 10) in the Flags field are "01", it indicates that the packet is allowed to pass through the Midpoint TI-LFA path, but the packet is not allowed to pass through the TI-LFA path.

Case C4: If neither the second bit nor the third bit is set, it indicates that the first network device is allowed to switch the packet from the primary path to the Midpoint TI-LFA path or the TI-LFA FRR path.

In Case C4, if a value of the second bit is 0, and a value of the third bit is 0, it indicates that the packet is allowed to be switched from the primary path to the Midpoint TI-LFA path or the TI-LFA FRR path. For example, if values of bit6 and bit7 (T/M in FIG. 10) in the Flags field are "00", it indicates that the packet is allowed to pass through the Midpoint TI-LFA path, and the packet is also allowed to pass through the TI-LFA FRR path. In Case C4, if the primary path is faulty, whether the packet is switched to the Midpoint TI-LFA path or the TI-LFA FRR path is optionally determined based on priorities between Midpoint TI-LFA and TI-LFA FRR. For details, refer to descriptions of Case V3 in Embodiment 2.

It should be understood that Case C1 to Case C4 are optional implementations of Case C rather than mandatory implementations of Case C. In some other embodiments, Case C optionally includes another manner. For example, if a bit is not set, it indicates that the packet is not allowed to be switched from the primary path to the Midpoint TI-LFA path or the TI-LFA FRR path.

Case D: The protection flag occupies one bit, and a value of the one bit is used to indicate whether the first network device is allowed to switch the packet from the primary path to the first protection path. For example, as shown in FIG. 8, the protection flag occupies one bit in the SRv6 packet. For example, an SRH in the SRv6 packet occupies one bit. As shown in FIG. 9, the SRH in the SRv6 packet includes a Flags field (Flags field) and a TLV. Optionally, the protection flag occupies one bit in the Flags field. Optionally, the protection flag occupies one bit in the TLV. It should be understood that occupying one bit in the Flags field or one bit in the TLV is used as an example for description, and one bit in the packet that is occupied by the protection flag is not limited in this embodiment. Optionally, the protection flag occupies one bit in a reserved field in the packet, and the reserved field is optionally a field in a packet header, for example, a field in an extension header.

Optionally, Case D is applicable to a case in which the first network device enables only one local protection mechanism. For example, the first network device enables a TI-LFA mechanism but does not enable a Midpoint TI-LFA mechanism, and a value of a first bit can be used to indicate whether the first network device is allowed to switch the packet from the primary path to the TI-LFA protection path. For another example, the first network device enables a Midpoint TI-LFA mechanism but does not enable a TI-LFA mechanism, and a value of a first bit can be used to indicate whether the first network device is allowed to switch the packet from the primary path to the Midpoint TI-LFA protection path.

Optionally, Case D is applicable to a case in which the first network device enables a plurality of local protection mechanisms, and a binding relationship between the protection flag and one local protection mechanism is preconfigured. For example, the first network device enables a TI-LFA mechanism and a Midpoint TI-LFA mechanism, and a binding relationship between the TI-LFA mechanism and the protection flag is pre-configured by using a command line or in another manner, so as to indicate the first network device to determine, based on a value of the protection flag, whether to use the TI-LFA mechanism. Therefore, a value of a first bit can be used to indicate whether the first network device is allowed to switch the packet from the primary path to the TI-LFA protection path.

Figure 11:
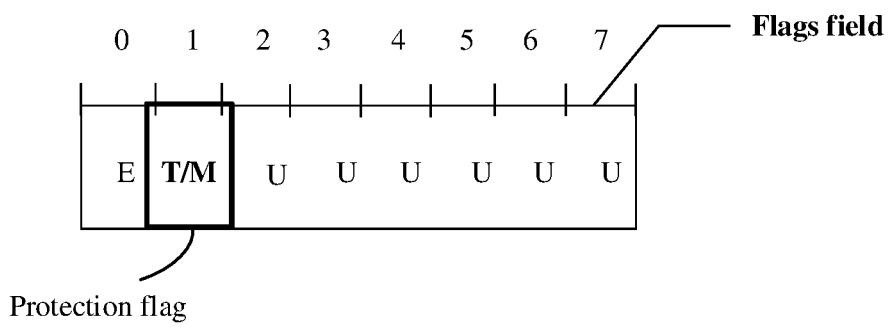
FIG. 11 is a schematic diagram of a Flags field that carries a protection flag according to an embodiment.

A value of one bit includes two values: 0 and 1, and the two values can be used to indicate different cases. An example in which the protection flag occupies a first bit in the packet is used below for detailed descriptions by using Case D1 and Case D2. It should be understood that the first bit herein may be any different bit in the packet, and the first bit is not limited to the $1^{st}$ bit in a field. For example, as shown in FIG. 11, optionally, the first bit is the $2^{nd}$ bit (that is, T/M in FIG. 11) in the Flags field. In other words, the protection flag occupies the $2^{nd}$ bit in the Flags field. Optionally, if the $1^{st}$ bit in the Flags field is bit0, the protection flag is bit1 in the Flags field, and the protection flag is T/M in FIG. 11.

Case D1: If the first bit is set, it indicates that the packet is not allowed to be switched from the primary path to the first protection path. Optionally, if the first bit is set, it indicates that the packet is not allowed to be switched from the primary path to the TI-LFA path. For example, as shown in FIG. 11, if a value of the $2^{nd}$ bit (that is, bit1, namely, T/M in FIG. 11) in the Flags field is "1", it indicates that the packet is not allowed to pass through the TI-LFA path. Optionally, if the first bit is set, it indicates that the packet is not allowed to be switched from the primary path to the Midpoint TI-LFA path. For example, as shown in FIG. 11, if a value of the $2^{nd}$ bit (that is, bit1, namely, T/M in FIG. 11) in the Flags field is "1", it indicates that the packet is not allowed to pass through the Midpoint TI-LFA path. Optionally, if the first bit is set, it indicates that the packet is not allowed to be switched from the primary path to the TI-LFA path, and the packet is not allowed to be switched from the primary path to the Midpoint TI-LFA path either. For example, as shown in FIG. 11, if a value of the $2^{nd}$ bit in the Flags field is "1", it indicates that the packet is not allowed to pass through the TI-LFA path, and the packet is not allowed to pass through the Midpoint TI-LFA path either.

Case D2: If the first bit is not set, it indicates that the packet is allowed to be switched from the primary path to the first protection path. Optionally, if the first bit is not set, it indicates that the packet is allowed to be switched from the primary path to the TI-LFA path. For example, as shown in FIG. 11, if a value of the $2^{nd}$ bit in the Flags field is "0", it indicates that the packet is allowed to pass through the TI-LFA path. Optionally, if the first bit is not set, it indicates that the packet is allowed to be switched from the primary path to the Midpoint TI-LFA path. For example, as shown in FIG. 11, if a value of the $2^{nd}$ bit in the Flags field is "0", it indicates that the packet is allowed to pass through the Midpoint TI-LFA path. Optionally, if the first bit is not set, it indicates that the packet is allowed to be switched from the primary path to the TI-LFA path, and the packet is also allowed to be switched from the primary path to the Midpoint TI-LFA path. For example, as shown in FIG. 11, if a value of the $2^{nd}$ bit in the Flags field is "0", it indicates that the packet is allowed to pass through the TI-LFA path, and the packet is also allowed to pass through the Midpoint TI-LFA path.

It should be understood that Case D1 and Case D2 are optional implementations of Case D rather than mandatory implementations of Case D. In some other embodiments, Case D optionally includes another manner. For example, if the first bit is not set, it indicates that the packet is not allowed to be switched from the primary path to the first protection path.

It should be understood that Case C and Case D both are optional implementations of the protection flag rather than mandatory implementations of the protection flag. Optionally, the protection flag occupies more than two bits, and a manner of indicating the protection flag by using more than two bits is an implementation of the protection flag and should also fall within the scope of this embodiment.

A location of the protection flag in the packet may include a plurality of cases. The following describes the protection flag from the perspective of the location of the protection flag by using Case E1 and Case E2 as examples.

Case E1: The protection flag is in a Flags field. In other words, the packet includes the Flags field, and the packet carries the protection flag by using the Flags field. The Flags field used to carry the protection flag may be referred to as a T/M flag. The Flags field may also have other names according to different vendors or scenarios.

Optionally, the Flags field that carries the protection flag is located in a packet header. Optionally, the packet header including the Flags field is an outer packet header or an inner packet header. Optionally, the Flags field that carries the protection flag is located in an extension header. Optionally, the Flags field that carries the protection flag is located in an SRH. Optionally, as shown in FIG. 9, the Flags field that carries the protection flag is a Flags field between a Last Entry field and a Tag field in FIG. 9. Optionally, a TLV in the SRH includes a Flags field, and the Flags field that carries the protection flag is the Flags field included in the TLV. Optionally, the Flags field that carries the protection flag is not in the SRH, but in another extension header in the SRH. For example, the Flags field that carries the protection flag is located in a hop-by-hop options header (hop-by-hop options header). Optionally, the Flags field that carries the protection flag is in a packet header of a detection packet carried in the packet or is in a packet header of a data packet.

It should be understood that the foregoing enumerated cases are all optional implementations of Case E1 and should fall within the scope of this embodiment.

In Case E1, a new Flags field is extended for the packet, and the Flags field is used to carry the protection flag. When the primary path is faulty, because the packet includes the Flags field, after a receiving side identifies the protection flag in the Flags field, the packet does not pass through the first protection path. If the first protection path is a local protection path, the packet does not pass through the local protection path.

Case E2: The protection flag is in a TLV. In other words, the packet includes the TLV, and the TLV is used to carry the protection flag. Optionally, the TLV is a TLV dedicated to carrying the protection flag. Optionally, a bit is occupied in an original TLV to carry the protection flag, so that a function of indicating whether local switching to a protection path is allowed is extended by the TLV on the basis of an original function. In Case E2, the TLV used to carry the protection flag may be referred to as a protection TLV or a no protection TLV (no protection TLV). The TLV may also have other names according to different vendors or scenarios.

Optionally, whether the packet carries the TLV is used to indicate whether the packet is allowed to be switched from the primary path to the first protection path. For example, if the packet carries the TLV, it indicates that the packet is not allowed to pass through the local protection path when the primary path is faulty. If the packet does not carry the TLV, it indicates that the packet is allowed to pass through the local protection path when the primary path is faulty.

Optionally, a value of a value (value) field in the TLV in the packet is used to indicate whether the packet is allowed to be switched from the primary path to the first protection path. For example, with reference to Case C1 to Case C8 described above, the value field in the TLV includes a second bit and a third bit, and values of the two bits in the value field are used to indicate whether the packet is allowed to be switched from the primary path to the first protection path. For example, with reference to Case C1, if both the second bit and the third bit in the value field are set, it indicates that the first network device is not allowed to switch the packet from the primary path to the Midpoint TI-LFA path and the TI-LFA FRR path. With reference to Case C2, if the second bit in the value field is set and the third bit is not set, it indicates that the first network device is not allowed to switch the packet to the Midpoint TI-LFA path but is allowed to switch the packet to the TI-LFA FRR path. It should be understood that two bits in the value field in the TLV that are used to indicate TI-LFA FRR and Midpoint TI-LFA are not limited in this embodiment. For another example, with reference to Case D described above, the value field in the TLV includes a first bit, and a value of one bit in the value field is used to indicate whether the packet is allowed to be switched from the primary path to the first protection path. For example, with reference to Case D1, if the first bit in the value field is set, it indicates that the packet is not allowed to be switched from the primary path to the first protection path. It should be understood that one bit in the value field in the TLV that is used to indicate TI-LFA FRR or Midpoint TI-LFA is not limited in this embodiment.

Optionally, the TLV used to carry the protection flag is identified by using Type (Type). A value of the type field in the TLV used to carry the protection flag is a preset value, and the preset value indicates that the TLV is a protection TLV, that is, a TLV used to indicate whether the packet is allowed to be switched from the primary path to the first protection path. The packet receiving side identifies the value of the type field in the TLV. If the value of the type field in the TLV is a preset value, the receiving side may determine that the TLV is a protection TLV. The preset value may be a newly applied value.

Optionally, a value of a length field in the TLV used to carry the protection flag ranges from 0 to 5.

Optionally, the TLV used to carry the protection flag is located in a packet header. Optionally, the packet header including the TLV is an outer packet header or an inner packet header. Optionally, the TLV used to carry the protection flag is located in an extension header. Optionally, the TLV used to carry the protection flag is located in the SRH. As shown in FIG. 9, the TLV that carries the protection flag is a TLV in the SRH. Optionally, the TLV that carries the protection flag is not in the SRH, but in an extension header other than the SRH. For example, the TLV that carries the protection flag is located in a hop-by-hop options header. Optionally, the TLV that carries the protection flag is in a packet header of a detection packet carried in the packet or is in a packet header of a data packet.

Optionally, the TLV used to carry the protection flag is a new top TLV, and Type in the TLV used to carry the protection flag is unused Type in the top TLV. Optionally, the TLV used to carry the protection flag is a new sub-TLV of a top TLV, and Type in the TLV used to carry the protection flag is unused Type in the sub-TLV. Optionally, the TLV used to carry the protection flag is a new sub-TLV of a top TLV, and Type in the TLV used to carry the protection flag is unused Type in the sub-TLV. Optionally, the TLV used to carry the protection flag is a new sub-sub-TLV of a top TLV, and Type in the TLV used to carry the protection flag is unused Type in the sub-sub-TLV. Whether the TLV used to carry the protection flag is a top TLV, a sub-TLV, or a sub-sub-TLV is not limited in this embodiment.

Optionally, Type in the TLV used to carry the protection flag may be a value allocated by IANA. Optionally, the value of Type in the TLV is 6. A value of Length in the TLV used to carry the protection flag may range from 0 to 5.

Optionally, Value in the TLV used to carry the protection flag may be an 8-byte padding field. A bit of the padding field may have no semantic meaning. A value of the padding field is set to 0 during transmission, and the padding field is ignored during packet receiving.

It should be understood that the foregoing enumerated cases are all optional implementations of Case E2 and should fall within the scope of this embodiment.

In Case E2, a new TLV is extended for the packet, and the TLV is used to carry the protection flag. When the primary path is faulty, after a receiving side identifies the TLV, the packet does not pass through the first protection path. If the first protection path is a local protection path, the packet does not pass through the local protection path.

The foregoing describes various possible cases of the protection flag from a plurality of perspectives. The packet that carries the protection flag may also include a plurality of cases. In other words, in S201, the second network device may add the protection flag to a plurality of types of packets. The following describes various cases of the packet that carries the protection flag by using examples. It should be understood that various cases of the protection flag described above are applicable to various cases of the following packet.

The packet that carries the protection flag optionally includes Case H and Case I.

Case H: The packet includes a detection packet. The detection packet is used to detect at least one of connectivity or a transmission performance parameter of the primary path. The transmission performance parameter includes at least one of a delay, a packet loss rate, a delay variation, real-time traffic, a packet quantity, and a byte quantity.

Optionally, a payload of the packet sent by the second network device includes the detection packet, and the protection flag is in an outer packet header of the detection packet. As shown in FIG. 8, optionally, the packet sent by the second network device is the SRv6 packet shown in FIG. 8, a payload of the SRv6 packet includes a detection packet, an outer packet header of the detection packet includes an SRH, and the protection flag is in the SRH. Optionally, the packet sent by the second network device is an SR-TE packet, a payload of the SR-TE packet includes a detection packet, and an outer packet header of the detection packet includes a label stack and the protection flag. Optionally, if the packet sent by the second network device is forwarded in another source routing manner other than SRv6 or SR-TE, the outer packet header of the detection packet is another packet header used for source routing, and the another packet header includes the protection flag. Optionally, the protection flag is located inside the detection packet. For example, the packet header of the detection packet is extended, and the packet header of the detection packet carries the protection flag.

The following describes Case H by using Case H1 to Case H5 as examples.

Case H1: The detection packet is a bidirectional forwarding detection BFD packet.

Case H1 is applicable to the foregoing BFD detection application scenario. The BFD packet may be an SBFD control packet, and the second network device may be an SBFD initiator. As shown in FIG. 8, optionally, the packet sent by the second network device is an SRv6 BFD packet, and a payload of the SRv6 BFD packet includes the BFD packet. Optionally, the packet sent by the second network device is an SR-TE BFD packet, and a payload of the SR-TE BFD packet includes the BFD packet.

Optionally, the protection flag is located outside the BFD packet. For example, the payload of the packet that carries the protection flag includes the BFD packet, and the packet header of the packet that carries the protection flag includes the protection flag. Optionally, the protection flag is located inside the BFD packet. For example, a packet header of the BFD packet is extended, and the protection flag is added to the packet header of the BFD packet.

Case H2: The detection packet is a PING detection packet.

Case H2 is applicable to the foregoing PING detection connectivity application scenario. The PING detection packet may be referred to as an ICMP Echo Request packet. As shown in FIG. 8, optionally, the packet sent by the second network device is an SRv6 PING detection packet, and a payload of the SRv6 PING detection packet includes the PING detection packet. Optionally, the packet sent by the second network device is an SR-TE PING detection packet, and a payload of the SR-TE PING packet includes the PING detection packet.

Optionally, the protection flag is located outside the PING detection packet. For example, the payload of the packet that carries the protection flag includes the PING detection packet, and the packet header of the packet that carries the protection flag includes the protection flag. Optionally, the protection flag is located inside the PING detection packet. For example, a packet header of the PING detection packet is extended, and the protection flag is added to the packet header of the PING detection packet.

Case H3: The detection packet is an OAM detection packet.

Case H3 is applicable to the foregoing OAM detection application scenario. In Case H3, the OAM detection packet may also be referred to as a Y.1731 detection packet or an ICMPv6 Echo Request packet. As shown in FIG. 8, optionally, the packet sent by the second network device is an SRv6 OAM detection packet, and a payload of the SRv6 BFD packet includes the OAM detection packet. Optionally, the packet sent by the second network device is an SR-TE OAM detection packet, and a payload of the SR-TE OAM packet includes the OAM detection packet.

Optionally, the protection flag is located outside the OAM detection packet. For example, the payload of the packet that carries the protection flag includes the OAM detection packet, and the packet header of the packet that carries the protection flag includes the protection flag. Optionally, the protection flag is located inside the OAM detection packet. For example, a packet header of the OAM detection packet is extended, and the protection flag is added to the packet header of the OAM detection packet.

Case H4: The detection packet is a TWAMP detection packet.

Case H4 is applicable to the foregoing TWAMP detection application scenario. In Case H4, the TWAMP detection packet may also be referred to as a TWAMP-Test-request packet. As shown in FIG. 8, optionally, the packet sent by the second network device is an SRv6 TWAMP detection packet, and a payload of the SRv6 TWAMP packet includes the TWAMP detection packet. Optionally, the packet sent by the second network device is an SR-TE TWAMP detection packet, and a payload of the SR-TE TWAMP packet includes the TWAMP detection packet.

Optionally, the protection flag is located outside the TWAMP detection packet. For example, the payload of the packet that carries the protection flag includes the TWAMP detection packet, and the packet header of the packet that carries the protection flag includes the protection flag. Optionally, the protection flag is located inside the TWAMP detection packet. For example, a packet header of the TWAMP detection packet is extended, and the protection flag is added to the packet header of the TWAMP detection packet.

Case H5: The detection packet is an IFIT packet.

Case H5 is applicable to the foregoing IFIT application scenario. Optionally, the IFIT packet in Case H5 is also referred to as an ICMPv6 Echo Request packet. The IFIT packet includes an IFIT packet header. Optionally, the protection flag is located inside the IFIT packet header. Optionally, the protection flag is in an outer packet header of the IFIT packet header.

Figure 13:
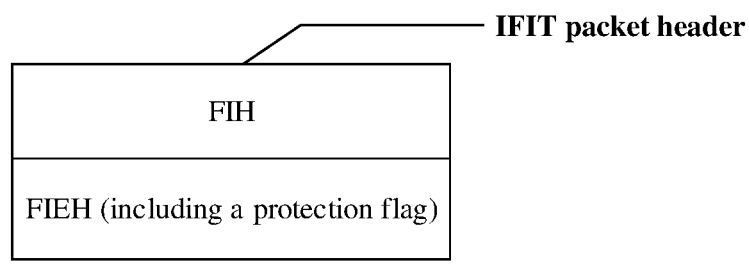
FIG. 13 is a schematic diagram of an IFIT packet header that carries a protection flag according to an embodiment.
Figure 14:
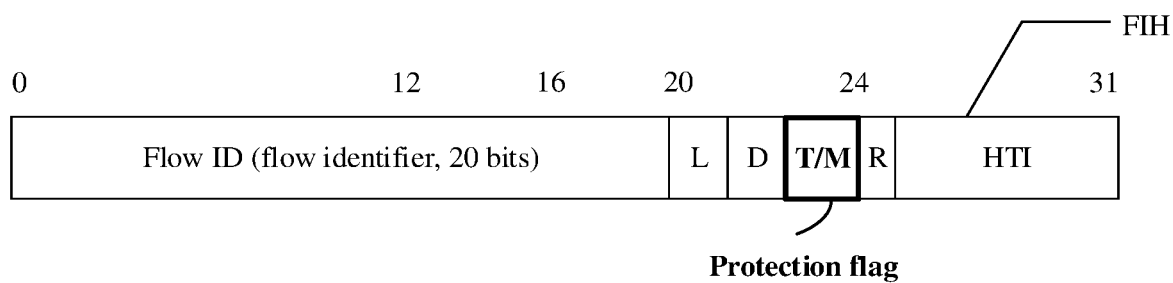
FIG. 14 is a schematic diagram of an IFIT packet that carries a protection flag according to an embodiment.

For example, FIG. 13 is a schematic diagram of an IFIT packet header according to an embodiment. The IFIT packet includes the protection flag. In a possible implementation, the IFIT packet header includes a flow instruction header (FIH) and a flow instruction extension header (FIEH). Optionally, the FIH includes the protection flag. FIG. 14 is a schematic diagram of an FIH according to an embodiment. Optionally, the protection flag is T/M in FIG. 14. The protection flag is located between a D Flag field and an HTI field in the FIH.

The FIH carries basic information used for IFIT in-situ flow detection, including a flow ID, a coloring indicator bit, and a detection header type indication. The FIEH carries information used to support an IFIT extension capability. The flow instruction extension header includes two types: an end-to-end extension header and a hop-by-hop extension header. An extension field includes an extension flow ID, a detection period indication, backward flow automatic learning, and the like. Optionally, the FIH not only includes the protection flag, but also includes the following fields (a) to (f):

(a) Flow ID: bit0 to bit19, used to uniquely identify a service flow, where Flow ID needs to be unique on the entire network in a detection domain, and an IP radio access network (IP Radio Access Network, IP RAN) network element performs flow identification based on Flow ID.
(b) L Flag: Loss Flag, namely, loss measurement flag.
(c) D Flag: Delay Flag, namely, delay measurement flag, where 1 indicates that delay measurement is required, and 0 indicates that delay measurement is not required.
(d) R: reserved bit, reserved for future extension.
(e) R/S: If a boot label is a stack bottom label, the flag is R and is set to 1 by default. If a boot label is not a stack bottom label, the flag is S.
(f) Header Type Indicator (HTI): indicating an extension data type and indicating whether an extension header is carried:
0x00: reserved;
0x01: indicating that the FIH is basic end-to-end detection information and does not carry an extension header;
0x02: indicating that the FIH is basic hop-by-hop detection information and does not carry an extension header;
0x03: indicating that the FIH is extended end-to-end detection information and carries an extension header, and the FIEH is valid;
0x04: indicating that the FIH is extended hop-by-hop detection information and carries an extension header, and the FIEH is valid; and
0x05 to 0xFF: reserved for future extension.

Case I: The packet includes a data packet, the data packet is used to carry service data of the primary path, and the data packet includes the protection flag. Optionally, the protection flag is located outside the data packet. For example, the payload of the packet sent by the second network device includes the data packet, and an outer packet header of the data packet includes the protection flag. As shown in FIG. 8, optionally, the packet sent by the second network device is the SRv6 packet shown in FIG. 8, a payload of the SRv6 packet includes a data packet, an outer packet header of the data packet includes an SRH, and the SRH includes the protection flag. Optionally, the packet sent by the second network device is an SR-TE packet, a payload of the SR-TE packet includes a data packet, and an outer packet header of the data packet includes a label stack and the protection flag. Optionally, if the packet sent by the second network device is forwarded in another source routing manner other than SRv6 or SR-TE, the outer packet header of the data packet is another packet header used for source routing, and the another packet header includes the protection flag. Optionally, the protection flag is located inside the data packet. For example, a packet header of the data packet is extended, and the protection flag is added to the packet header of the data packet.

Optionally, the service data carried in the data packet is service data received by the second network device. For example, as shown in FIG. 1, a packet sent by CE1 to PE1 includes service data, and a packet sent by PE1 (the second network device) to P1 (the first network device) includes the service data. For another example, as shown in FIG. 2, a packet sent by PE1 (the second network device) to RT_3 (the first network device) includes the service data.

The foregoing separately describes various cases of the protection flag and various cases of the packet. It should be understood that the foregoing described various cases of the protection flag and various cases of the packet may be combined in any manner, and the combination manner includes features in a plurality of cases.

A packet generation manner in S201 optionally includes a plurality of implementations. The following describes the packet generation manner by using Case V1 and Case V2 as examples.

Case V1: A third device sends a packet to the second network device, and the second network device receives the packet from the third device, and generates, based on the packet from the third device, a packet including the protection flag. Optionally, the third device is a network device. For example, as shown in FIG. 1, the third device is optionally a CE device such as CE1 in FIG. 1, CE1 sends a packet to PE1, and PE1 generates, based on the packet from CE1, a packet including the protection flag. Optionally, Case V1 is applicable to a data packet forwarding scenario. For example, in an SR scenario, a data packet starts to enter an SR tunnel from the second network device; and when the second network device receives the data packet, the second network device adds an SID list and the protection flag based on the data packet to obtain an SR data packet and sends the SR data packet to the first network device. Because the SID list is pushed to the SR data packet, the SR data packet is introduced into the SR tunnel, so that the data packet and the protection flag are combined and are transmitted on each node on the SR tunnel.

It should be understood that, that the packet sent by the second network device needs to include all data packets received by the second network device is not limited in Case V1 in this embodiment. Case V1 optionally includes Case V11 and Case V12.

Case V11: The packet sent by the second network device includes some content (for example, the service data carried in the data packet) of the data packet received by the second network device, and the other content of the data packet received by the second network device is changed. Optionally, after receiving the data packet, the second network device updates some content in the data packet, for example, modifies data, deletes data, or adds data (for example, modifies a MAC address) for the packet header of the data packet, encapsulates an updated data packet and the protection flag to obtain a packet, and sends the packet to the first network device. Therefore, the packet sent by the second network device includes some content in the data packet received by the second network device and the protection flag.

Case V12: The packet sent by the second network device includes all content of the data packet received by the second network device. For example, the second network device does not update the received data packet, but encapsulates the received data packet, the protection flag, and other optional information to obtain a packet, and then sends the packet to the first network device. Therefore, the packet sent by the second network device includes all content of the data packet received by the second network device and the protection flag.

Case V2: The second network device does not perform S201 based on a packet sent by another device but performs assembling to generate an entire packet. For example, as shown in FIG. 1, if the second network device is PE1, and the first network device is PE3, PE1 establishes a BFD session with PE3, and PE1 generates a BFD packet and sends the BFD packet to PE3.

S202: The second network device sends the packet to the first network device.

S203: The first network device receives the packet.

Optionally, the second network device sends the packet to the first network device through an outbound interface corresponding to the primary path. The first network device receives the packet through an inbound interface corresponding to the primary path.

S204: The first network device determines that the primary path is faulty.

An implementation of determining that the primary path is faulty may include a plurality of cases. The following describes the fault determining implementation by using Case J and Case K as examples.

Case J: The first network device actively detects that the primary path is faulty. For example, the first network device has an outbound interface that establishes a binding relationship with the primary path, and a packet sent through the outbound interface may arrive at the primary path. If the first network device detects that the outbound interface is in a down state, the first network device may determine that the primary path is faulty.

Case K: Another device notifies the first network device that the primary path is faulty. For example, a next-hop node of the first network device sends a fault notification message to the first network device. After receiving the fault notification message, the first network device determines, based on the fault notification message, that the primary path is faulty. The fault notification message indicates that the primary path is faulty, and the fault notification message is optionally carried through signaling. Optionally, the fault notification message is generated by the next-hop node of the first network device. For example, after detecting the fault, the next-hop node generates the fault notification message and sends the fault notification message to the first network device. Optionally, the fault notification message is generated by any node from the next-hop node of the first network device to an egress node on the primary path. After detecting the fault, the node returns the fault notification message to the first network device in a hop-by-hop backhaul manner.

Optionally, when Embodiment 1 is applied to an SR scenario, the packet is an SR packet, and the primary path is included in an SR tunnel. For example, the primary path is one LSP in the SR tunnel. A manner of determining that the primary path is faulty in the SR scenario is described below by using Case L, Case M, and Case N as examples.

Case L: The first network device determines, based on an SID in the packet, an outbound interface corresponding to the SID. If the outbound interface corresponding to the SID is faulty, the first network device determines that the primary path is faulty.

For example, the packet is an SRv6 packet. A destination address field in an outer IPv6 header of the SRv6 packet carries an SID, or an SID list in an SRH in the SRv6 packet carries an SID. The SID in the destination address field may be an active SID in the SID list.

In Case L, "based on an SID in the packet" may be interpreted as "based on the SID in the destination address field in the outer IPv6 header of the packet" or "based on the active SID in the SID list in the SRH in the packet".

The "outbound interface corresponding to the SID" is described below by using Case L1 to Case L3 as examples.

Case L1: An SID type (FuncType) is End, that is, the SID is End SID. For example, after receiving the SRv6 packet, the first network device reads the destination address field in the outer IPv6 header of the SRv6 packet to obtain a destination address and queries a local SID table based on the destination address. If the destination address hits the local SID table and the SID type is End, the first network device continues to query an IPv6 routing and forwarding table and finds the outbound interface from the IPv6 routing and forwarding table.

Case L2: An SID type is End.X, that is, the SID is End.X SID.

In Case L2, the "outbound interface corresponding to the SID" is an outbound interface bound to End.X SID in a local SID table of the first network device. After receiving the SRv6 packet, the first network device reads the destination address field in the outer IPv6 header of the SRv6 packet to obtain a destination address, and queries the local SID table based on the destination address. If the destination address hits the local SID table and the SID type is End.X, the first network device queries the local SID table, and finds the outbound interface bound to End.X SID.

Case L3: The SID is not an SID advertised by the first network device.

In Case L3, the "outbound interface corresponding to the SID" is an outbound interface obtained by the first network device through matching from an IPv6 routing and forwarding table based on the SID. For example, after receiving the SRv6 packet, the first network device reads the destination address field in the outer IPv6 header of the SRv6 packet to obtain a destination address and queries a local SID table based on the destination address. If the first network device finds no matched SID in the local SID table, the first network device continues to use the SID to query the IPv6 routing and forwarding table and finds the outbound interface in the IPv6 routing and forwarding table.

Case M: The first network device determines, based on an SID in the packet, a next hop corresponding to the SID. If the next hop is faulty, the first network device determines that the primary path is faulty.

In Case M, "based on an SID in the packet" may be interpreted as "based on the SID in the destination address field in the outer IPv6 header of the packet" or "based on the active SID in the SID list in the SRH in the packet".

The "next hop corresponding to the SID" is described below by using Case M1 to Case M3 as examples.

Case M1: An SID type is End, that is, the SID is End SID.

For example, after receiving the SRv6 packet, the first network device reads the destination address field in the outer IPv6 header of the SRv6 packet to obtain a destination address and queries a local SID table based on the destination address. If the destination address hits the local SID table and the SID type is End, the first network device continues to query an IPv6 routing and forwarding table and finds the next hop from the IPv6 routing and forwarding table.

Case M2: An SID type is End.X, that is, the SID is End.X SID.

In Case M2, the "next hop corresponding to the SID" is a next hop bound to End.X SID in a local SID table of the first network device. For example, after receiving the SRv6 packet, the first network device reads the destination address field in the outer IPv6 header of the SRv6 packet to obtain a destination address and queries the local SID table based on the destination address. If the destination address hits the local SID table and the SID type is End.X, the first network device queries the local SID table, and finds the next hop bound to End.X SID.

Case M3: The SID is not an SID advertised by the first network device.

For example, after receiving the SRv6 packet, the first network device reads the destination address field in the outer IPv6 header of the SRv6 packet to obtain a destination address and queries a local SID table based on the destination address. If the first network device finds no matched SID in the local SID table, the first network device continues to use the SID to query an IPv6 routing and forwarding table and finds the next hop in the IPv6 routing and forwarding table.

Case N: The first network device determines, based on an SID in the packet, an outbound interface and a next hop corresponding to the SID. If the outbound interface and the next hop are faulty, the first network device determines that the primary path is faulty.

For details of Case N, refer to Case M and Case N. Details are not described herein again.

It can be understood from Case L, Case M, and Case N that, in a process of transmitting a packet on a primary path in an SR tunnel, when the primary path is faulty, each hop node along the path can determine, based on an outbound interface or a next hop of the node, that the primary path is faulty. Therefore, each hop node along the path is likely to determine that the primary path is faulty. In this case, if the node along the path pre-deploys a local protection mechanism, when the packet on the primary path passes through the node, the node switches the packet to a local protection path. Therefore, it can be proved that, if the packet does not carry the protection flag, once any node or link on the primary path is faulty, any hop node along the path is likely to switch the packet to the local protection path. However, the protection flag is added to the packet, so that the packet received by each hop node along the primary path carries the protection flag. Therefore, regardless of a hop node along the path that receives the packet and then determines that the primary path is faulty, because the protection flag already indicates that switching to a protection path is not allowed, the hop node can discard the packet as indicated by the protection flag and does not switch the packet to the local protection path. Therefore, it can be understood that, in this method, the packet on the primary path is not switched to the local protection path, and the node along the path can determine, based on the protection flag carried in the packet, whether to perform local protection switching, so that implementation is relatively easy and service deployment complexity is reduced.

S205: The first network device determines that the protection flag indicates that the packet is not allowed to be switched from the primary path to the first protection path.

The following describes S205 from a plurality of perspectives by using Case O1 to Case O7 as examples.

Case O1: With reference to Case C1, the first network device determines whether both the second bit and the third bit are set. If both the second bit and the third bit are set, the first network device determines that the protection flag indicates that the packet is not allowed to be switched from the primary path to the Midpoint TI-LFA path or the TI-LFA FRR path. For example, if the first network device identifies that specified two bits are "11", the first network device determines that the packet is not allowed to be switched from the primary path to the Midpoint TI-LFA path, and the packet is not allowed to be switched from the primary path to the TI-LFA FRR path either.

Optionally, in Case O1, the first network device obtains the second bit and the third bit from the Flags field or the TLV of the packet.

Case O3: With reference to Case D1, the first network device determines whether the first bit is set. If the first bit is set, the first network device determines that the protection flag indicates that the packet is not allowed to be switched from the primary path to the first protection path. For example, if the first network device identifies that a value of one bit is "1", the first network device determines that the packet is not allowed to be switched from the primary path to the Midpoint TI-LFA path. For another example, if the first network device identifies that a value of one bit is "1", the first network device determines that the packet is not allowed to be switched from the primary path to the TI-LFA FRR path.

Case O4: With reference to Case D2, the first network device determines whether the first bit is not set. If the first bit is not set, the first network device determines that the protection flag indicates that the packet is not allowed to be switched from the primary path to the first protection path. For example, if the first network device identifies that a value of one bit is "0", the first network device determines that the packet is not allowed to be switched from the primary path to the Midpoint TI-LFA path. For another example, if the first network device identifies that a value of one bit is "0", the first network device determines that the packet is not allowed to be switched from the primary path to the TI-LFA FRR path.

Optionally, in Case O3 and Case O4, the first network device reads the first bit in the Flags field of the packet. Optionally, in Case O3 and Case O4, the first network device obtains the first bit from the TLV of the packet.

Case O5: With reference to Case E1, the first network device may determine whether the packet includes the Flags field that carries the protection flag. If the packet includes the Flags field that carries the protection flag, the first network device determines that the packet is not allowed to be switched from the primary path to the first protection path, and therefore does not send the packet through the first protection path. Case O5 optionally includes a plurality of cases. For a location of the Flags field that carries the protection flag, refer to the foregoing descriptions of Case E1. Optionally, the Flags field that carries the protection flag is located in the SRH, the extension header other than the SRH, the packet header of the detection packet, or the packet header of the data packet. Correspondingly, a case in which the first network device determines whether the packet includes the Flags field that carries the protection flag may include a plurality of cases, for example, a case of determining whether the SRH in the packet includes the Flags field that carries the protection flag, a case of determining whether the extension header other than the SRH includes the Flags field that carries the protection flag, a case of determining whether the packet header of the detection packet includes the Flags field that carries the protection flag, and a case of determining whether the packet header of the data packet includes the Flags field that carries the protection flag.

Case O6: With reference to Case E2, the first network device may determine whether the packet includes the TLV that carries the protection flag. If the packet includes the TLV that carries the protection flag, the first network device determines that the packet is not allowed to be switched from the primary path to the first protection path, and therefore does not send the packet through the first protection path. Case O6 optionally includes a plurality of cases. For a location of the TLV that carries the protection flag, refer to the foregoing descriptions of Case E2. Optionally, the TLV that carries the protection flag is located in the SRH, the extension header other than the SRH, the packet header of the detection packet, or the packet header of the data packet. Correspondingly, a case in which the first network device determines whether the packet includes the TLV that carries the protection flag may include a plurality of cases, for example, a case of determining whether the SRH in the packet includes the TLV that carries the protection flag, a case of determining whether the extension header other than the SRH includes the TLV that carries the protection flag, a case of determining whether the packet header of the detection packet includes the TLV that carries the protection flag, and a case of determining whether the packet header of the data packet includes the TLV that carries the protection flag.

Case O7: With reference to Case H, optionally, the first network device obtains the protection flag from the outer packet header of the detection packet. Optionally, the first network device obtains the protection flag from the packet header of the detection packet.

For example, with reference to Case H1, optionally, the first network device obtains the protection flag from the outer packet header of the BFD packet. Optionally, the first network device obtains the protection flag from the packet header of the BFD packet.

For example, with reference to Case H2, optionally, the first network device obtains the protection flag from the outer packet header of the PING detection packet. Optionally, the first network device obtains the protection flag from the packet header of the PING detection packet.

For example, with reference to Case H3, optionally, the first network device obtains the protection flag from the outer packet header of the OAM detection packet. Optionally, the first network device obtains the protection flag from the packet header of the OAM detection packet.

For example, with reference to Case H4, optionally, the first network device obtains the protection flag from the outer packet header of the TWAMP detection packet. Optionally, the first network device obtains the protection flag from the packet header of the TWAMP detection packet.

For example, with reference to Case H5, optionally, the first network device obtains the protection flag from the outer packet header of the IFIT packet. Optionally, the first network device obtains the protection flag from the packet header of the IFIT packet. For example, optionally, the first network device may obtain the protection flag from the FIH in the IFIT packet. For example, as shown in FIG. 13 and FIG. 14, the first network device may read the T/M field of the FIH in the IFIT packet and identify a value of the T/M field of the FIH, so as to determine whether the packet is allowed to pass through the first protection path.

It should be understood that there may be only one of Case O1 to Case O7, or there may be a plurality of cases in a combination manner.

It should be further understood that a time sequence of S204 and S205 is not limited in this embodiment. The following describes two possible time sequence cases of S204 and S205 by using examples. The following time sequence case 1 and time sequence case 2 are two optional implementations provided in this embodiment, and both should fall within the scope of this embodiment.

Time sequence case 1: S204 is performed first, and then S205 is performed. For example, the first network device first receives the packet, then determines the next hop or the outbound interface based on the packet and determines whether the next hop or the outbound interface is faulty. If the next hop or the outbound interface is faulty, the first network device further identifies the protection flag in the packet and determines whether the protection flag indicates that the packet is allowed to be switched from the primary path to the first protection path. If the protection flag indicates that the packet is not allowed to be switched from the primary path to the first protection path, S206 is performed to discard the packet. If the next hop or the outbound interface is not faulty, the first network device does not identify the protection flag in the packet, but directly forwards the packet through the determined next hop or outbound interface.

Time sequence case 2: S205 is performed first, and then S204 is performed. For example, before the first network device receives the packet, because the outbound interface corresponding to the primary path is in a down state, or the first network device receives the fault notification message transmitted by the next-hop node, before receiving the packet that carries the protection flag, the first network device has determined in advance that the primary path is faulty. Then, the first network device receives the packet that carries the protection flag. The first network device identifies the protection flag in the packet and determines whether the protection flag indicates that the packet is allowed to be switched from the primary path to the first protection path. If the protection flag indicates that the packet is not allowed to be switched from the primary path to the first protection path, because the first network device determines in advance that the primary path is faulty, the first network device performs S206 to discard the packet.

S206: The first network device discards the packet based on the determined fact that the primary path is faulty and the protection flag indicating that the packet is not allowed to be switched from the primary path to the first protection path.

After the first network device discards the packet, the packet cannot be transmitted to a destination device.

Optionally, the packet described in S201 to S206 may be a packet in traffic on the primary path. The traffic (also referred to as a data flow or a packet flow) means a series of packets from a source end to a destination end. The destination end may be another host and includes a multicast group or a broadcast domain of a plurality of hosts.

Optionally, the second network device performs S201 and S202 for a plurality of times to send the traffic to the first network device through the primary path, and the first network device performs S203 to S206 for a plurality of times to discard the packet in the flow, so that the traffic is interrupted when being transmitted to the first network device and cannot be transmitted to the destination device, and S207 is further triggered.

S207: The second network device determines that a packet loss occurs in traffic on the primary path.

Optionally, in S207, it is determined that the packets described in S201 to S206 are lost. Optionally, in S207, it is determined that another packet in the packets described in S201 to S206 is lost. The another packet is also traffic on the primary path. A transmission procedure of the another packet is similar to that in S201 to S206.

Optionally, S207 is applicable to Case H described above. In Case H, the detection packet may detect the connectivity or the transmission performance parameter based on a response of the destination device of the packet. If the response of the destination device is not received before timeout, the initiator of the detection packet determines that a packet loss occurs on the primary path. However, because the first network device discards the detection packet, the traffic is interrupted on the first network device. Therefore, the destination node of the detection packet cannot receive the detection packet, and the destination node does not return the response to the first network device. In this case, the first network device cannot receive the response from the destination node, and the first network device determines, based on the fact that the response of the destination node is not received before timeout, that the packet loss occurs in the traffic on the primary path.

A case in which the second network device determines a packet loss is described below by using Case H1 to Case H5 as examples.

Case H1: The packet sent by the second network device on the primary path includes a BFD packet. In this case, a manner in which the second network device determines that a packet loss occurs on the primary path may be that the second network device determines that BFD detection is in a down state. For example, if the second network device does not receive a returned loopback SBFD packet before a timer expires, the second network device maintains a local state to a down state.

Case H2: The packet sent by the second network device on the primary path includes a PING detection packet. In this case, a manner in which the second network device determines that a packet loss occurs on the primary path may be that the second network device determines that the PING detection packet is lost.

Case H3: The packet sent by the second network device on the primary path includes an OAM detection packet. In this case, a manner in which the second network device determines that a packet loss occurs on the primary path may be that the second network device determines that the OAM detection packet is lost. For example, if the second network device does not receive an Echo Reply packet before timeout, the second network device determines that the PING detection packet is lost.

Case H4: The packet sent by the second network device on the primary path includes a TWAMP detection packet. In this case, a manner in which the second network device determines that a packet loss occurs on the primary path may be that the second network device determines that the TWAMP detection packet is lost.

Case H5: The packet sent by the second network device on the primary path includes an IFIT detection packet. In this case, a manner in which the second network device determines that a packet loss occurs on the primary path may be that the second network device determines that the IFIT detection packet is lost.

Optionally, when the packet is a data packet, the second network device may determine, in a passive detection manner, that a packet loss occurs in the traffic on the primary path. For example, a downstream node on the primary path notifies the second network device in a hop-by-hop backhaul manner that the primary path is faulty. Alternatively, when sending the packet, the second network device not only sends the data packet that carries the protection flag, but also sends the detection packet that carries the protection flag. If the second network device determines that the detection packet is lost, because the detection packet and the data packet are sent together, the second network device determines that the data packet is also lost.

S208: The second network device switches the primary path to a second protection path based on the determined fact that the packet loss occurs in the traffic on the primary path.

S208 is an optional step rather than a mandatory step. S208 is applicable to a case in which a trigger condition for switching from the primary path to the second protection path is that a packet loss is detected in the traffic on the primary path.

The second protection path is also a backup path of the primary path. The second protection path is used to protect the primary path. The second protection path has a same ingress node as the primary path. For example, in this embodiment, the ingress node on the primary path is the second network device, and the ingress node on the second protection path is also the second network device. For example, as shown in FIG. 1, the ingress node on the primary path is PE1, and the second protection path may be a protection path with PE1 as the ingress node, for example, may be a backup path in the tunnel 1. Optionally, the second protection path is an end-to-end protection path, and has any feature of the end-to-end protection path in the concept introduction part. The second protection path may protect the entire primary path. Optionally, when the primary path works, the second protection path is in an idle state and does not independently carry service data. When the primary path is faulty, the second protection path takes over work of the primary path and replaces the primary path to carry the service data. Optionally, the second protection path is a pre-planned path. For example, a user pre-plans a backup path whose bandwidth is greater than a bandwidth threshold, and the backup path may be the second protection path. For another example, the user pre-plans a backup path whose delay is less than a delay threshold, and the backup path may be the second protection path.

The following describes the second protection path by using Case Y1 and Case Y2 as examples.

Case Y1: The second protection path and the primary path may belong to a same tunnel. For example, the second protection path and the primary path are two LSPs in the same tunnel, the primary path is a primary LSP in the tunnel, and the second protection path is a backup LSP in the tunnel. For example, as shown in FIG. 1, the tunnel 1 exists between PE1 and PE3, the second protection path is a backup path in the tunnel 1, and the primary path is a primary path in the tunnel 1. In this manner, a protection mechanism between the second protection path and the primary path belongs to mutual protection between the two LSPs in the same tunnel. When the primary LSP is faulty, because the packet carries a protection flag indicating not to pass through a local protection path, traffic to be transmitted through the primary LSP is switched to the backup LSP in time. This provides end-to-end protection.

Case Y2: The second protection path and the primary path may belong to different tunnels. In other words, the second protection path and the primary path are two tunnels, and the two tunnels are in a primary/backup relationship. The primary path is a primary tunnel, the second protection path is a backup tunnel, a source node on the primary tunnel is the same as a source node on the backup tunnel, and a sink node on the primary tunnel is the same as a sink node on the backup tunnel. The primary tunnel and the backup tunnel are iterated by two VPN services, and VPN protection is implemented. For example, as shown in FIG. 5, the primary path is a primary tunnel between PE1 and PE3, and the second protection path is a backup tunnel between PE2 and PE4. In this manner, when the primary tunnel is faulty, because the packet carries a protection flag indicating not to pass through a local protection path, traffic to be transmitted through the primary tunnel is switched to the backup tunnel in time. This provides tunnel-level protection.

Optionally, in an SLA assurance scenario, the second protection path is a path that meets the SLA. For example, a delay of the second protection path meets an SLA delay requirement. For example, the delay of the second protection path is less than the delay threshold. For another example, a bandwidth of the second protection path meets an SLA bandwidth requirement. For example, the bandwidth of the second protection path is greater than the bandwidth threshold.

In this scenario, when the packet does not carry the protection flag, in a process in which the packet is transmitted along the primary path, if the node along the path determines that the primary path is faulty, the node locally switches the packet to the protection path. Because the protection path to which the node along the path switches the packet usually does not meet the SLA, transmission performance of the protection path to which the node along the path switches the packet cannot be ensured in terms of a bandwidth, a delay, and the like. Consequently, the traffic on the primary path is diverted to a path that does not meet the SLA, and service SLA assurance cannot be achieved. However, in this embodiment, an identifier that can indicate whether local protection is allowed is added to the packet. In a process in which the packet that carries the protection flag is transmitted along the primary path, if the node along the path determines that the primary path is faulty, but the protection flag indicates that local switching to a protection path is not allowed, the node along the path does not perform local protection, so that the packet is not switched by the node along the path to the protection path. This avoids a problem, caused after the packet enters the protection path from the node along the path, that the traffic on the primary path is transmitted for a long time on the path that does not meet the SLA. In addition, because the node along the path discards the packet, a head node can detect a packet loss in the traffic on the primary path in time, so that the head node can switch the traffic on the primary path in time to a protection path that meets the SLA, and service SLA assurance can be achieved.

After switching the primary path to the second protection path, the second network device sends the packet through the second protection path. Optionally, a manner in which the second network device sends the packet through the second protection path is similar to the manner of sending the packet in S201 and S202 and includes any feature of the packet described in S201 and S202. For example, the packet sent by the second network device through the second protection path optionally includes the protection flag.

Optionally, the second network device determines that a packet loss occurs in traffic on the primary path and detects a cause of the fault on the primary path. In this case, because the packet does not pass through the first protection path, the second network device determines the packet loss in time and can detect the cause of the fault on the primary path in time, so as to detect service impairment in time, and help rectify the fault on the primary path in time.

It should be understood that S207 and S208 are optional steps. In some other embodiments, optionally, S207 and S208 are not performed. Optionally, S207 is performed, but S208 is not performed.

For example, S208 is applicable to Case H, and may be applied to any scenario in which a detection packet can trigger primary/backup path switching.

Case H1 is used as an example. In the BFD scenario, a BFD detection principle is that a source node sends a BFD packet, a destination node receives the BFD packet and then responds to the BFD packet, and the source node receives a response packet and then considers that the detection succeeds. When the head node sends the BFD packet, if the head node does not transmit the BFD packet and the protection flag together, when the primary path is faulty, a node along the path switches the BFD packet to a local protection path and transmits the BFD packet to the destination node through the local protection path. In this case, the destination node receives the BFD packet and then responds to the BFD packet. After the head node receives the response packet, the BFD detection is in an UP state. In this case, because the BFD detection succeeds, the head node cannot learn that the traffic is diverted to the local protection path from the primary path. Consequently, the head node cannot detect a fault on the primary path in time, the head node cannot detect service impairment in the traffic in time, and the head node cannot detect a cause of the fault on the primary path in time. Further, in a scenario in which path switching is triggered by detecting a BFD failure, because the BFD detection performed by the head node succeeds, a path switching trigger condition cannot be met. Consequently, the head node cannot switch the traffic on the primary path to an end-to-end protection path in time.

However, in the foregoing method embodiment, the head node (for example, the second network device) transmits the BFD packet together with the protection flag and uses the protection flag to indicate that local switching to a protection path is not allowed. Therefore, in a process in which the BFD packet is transmitted along the primary path, if the primary path is faulty, because the protection flag indicates that local switching to the protection path is not allowed, when receiving the BFD packet, the node along the path (for example, the first network device) does not switch the BFD packet to the local protection path by using a local protection mechanism, but discards the BFD packet. In this case, transmission of the BFD packet is interrupted on the node along the path, and the BFD packet is not transmitted to the destination node. Because the destination node does not receive the BFD packet, the destination node does not respond to the BFD packet, and the head node does not receive the response packet from the destination node. In this case, the BFD detection performed by the head node is in a down state. Therefore, based on the fact that the BFD detection is in a down state, the head node can detect in time that the primary path is faulty, so that the head node can detect in time a cause of the fault on the primary path and detect service impairment in time. This helps rectify the fault on the primary path in time and avoid long-term service impairment.

In addition, optionally, the path switching trigger condition is pre-configured on the head node. The path switching trigger condition is that the primary path is switched to the end-to-end protection path when the BFD detection is in a down state. Therefore, in the foregoing method, because the BFD detection performed by the head node is in a down state, the pre-configured trigger condition is met, so that the head node switches the traffic on the primary path to the end-to-end protection path, to implement timely switching between the primary path and the end-to-end protection path in the BFD scenario.

In addition, optionally, the end-to-end protection path is pre-configured as a path that meets the SLA on the head node according to an SLA requirement. Therefore, when the primary path is faulty, because the head node switches the traffic on the primary path to the end-to-end protection path, the traffic is switched from the faulty primary path to the path that meets the SLA, so that the traffic can be transmitted to the destination node through the path that meets the SLA, and SLA assurance can be achieved.

By analogy, the PING detection scenario, the OAM detection scenario, the TWAMP detection scenario, and the IFIT detection scenario each are based on a principle similar to that of the BFD detection scenario. In this way, the head node can detect a packet loss in time and trigger primary/backup path switching in time.

In addition, optionally, the path switching trigger condition is pre-configured on the head node. The path switching trigger condition is that the primary path is switched to the end-to-end protection path when the IFIT detection fails. Therefore, in the foregoing method, because the IFIT detection performed by the head node fails, the pre-configured trigger condition is met, so that the head node switches the traffic on the primary path to the end-to-end protection path, to implement timely switching between the primary path and the end-to-end protection path in the IFIT detection scenario. In addition, optionally, the end-to-end protection path is pre-configured as a path that meets the SLA on the head node according to an SLA requirement. Therefore, when the primary path is faulty, because the head node switches the traffic on the primary path to the end-to-end protection path, the traffic is switched from the faulty primary path to the path that meets the SLA, so that the traffic can be transmitted to the destination node through the path that meets the SLA, and SLA assurance can be achieved.

In the method provided in this embodiment, an identifier that can indicate whether local protection is allowed is added to the packet. In a process in which the packet that carries the protection flag is transmitted along the primary path, if a node along the path determines that the primary path is faulty, but the protection flag indicates that local switching to a protection path is not allowed, the node along the path does not perform local protection, so that the packet is not switched by the node along the path to the protection path. This prevents the packet from passing through a protection path with the node along the path as an ingress when the primary path is faulty, and resolves a problem caused after the packet enters the protection path from the node along the path.

Additionally, in most cases, the node along the path can perform only local protection and cannot switch to an end-to-end protection path. Therefore, the protection with the node along the path as the ingress is usually a local protection path instead of a pre-planned end-to-end protection path. In this case, if the packet is switched to the local protection path, traffic on the primary path is diverted to the local protection path for a long time. However, the protection flag is added to the packet, so that the packet is not transmitted to the local protection path. Therefore, the traffic on the primary path can be switched to the end-to-end protection path in time.

In addition, because the node along the path discards the packet, a packet sending side can detect a packet loss in the traffic on the primary path in time. In various scenarios in which a packet loss is detected to trigger protection switching, the packet sending side can switch the traffic on the primary path to the end-to-end protection path in time, so that the packet sending side can detect service impairment and a cause of a fault on the primary path in time.

Embodiment 1 describes a manner in which the first network device performs processing when the protection flag in the received packet indicates that the packet is not allowed to be switched from the primary path to the first protection path. Embodiment 2 describes a manner in which the first network device performs processing when the protection flag indicates that the packet is allowed to be switched from the primary path to the first protection path. It should be understood that Embodiment 2 focuses on a difference from Embodiment 1. For steps or other features in Embodiment 2 that are similar to those in Embodiment 1, refer to Embodiment 1. Details are not described in Embodiment 2.

Embodiment 2

Figure 15:
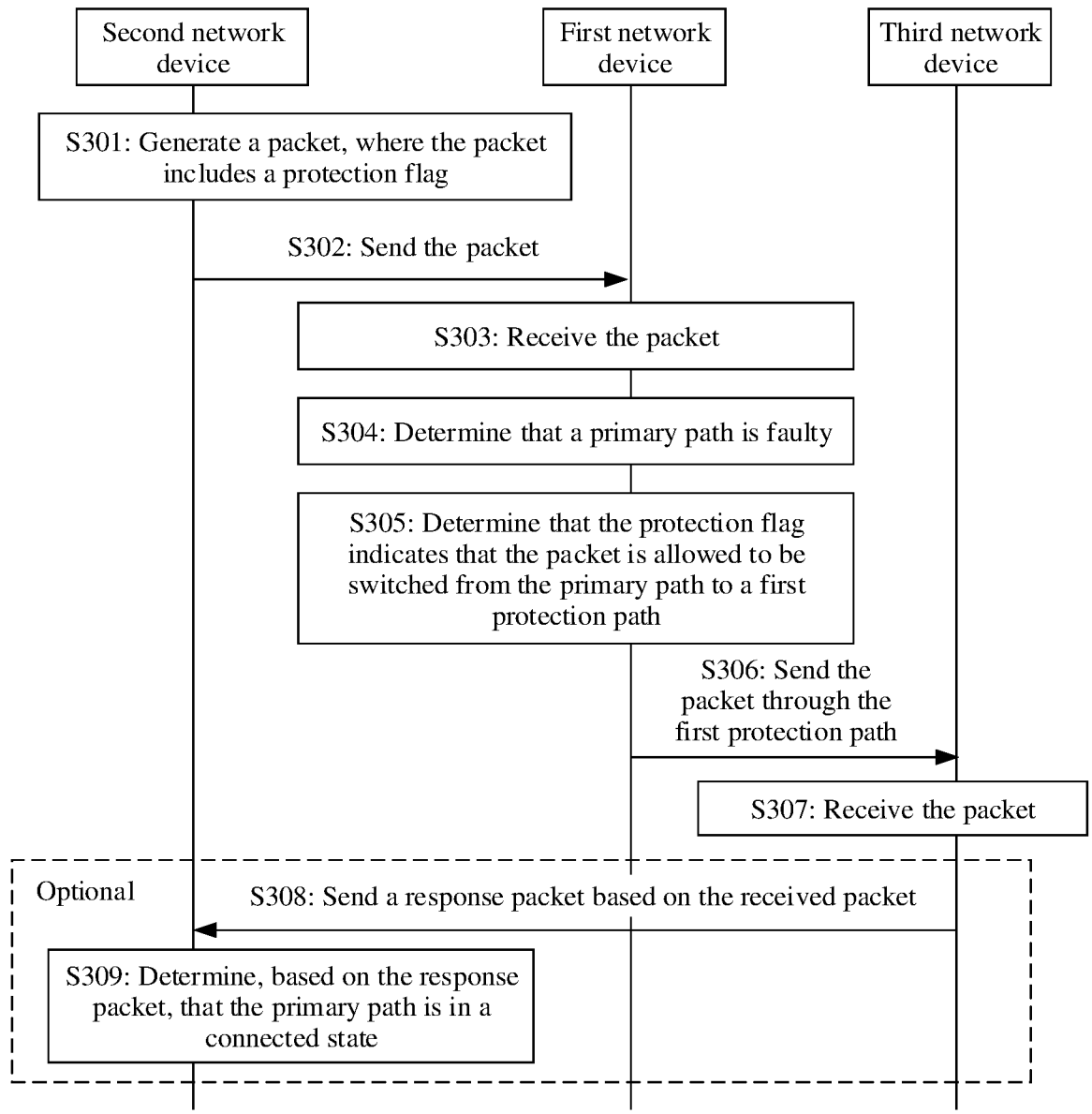
FIG. 15 is a flowchart of a packet processing method according to Embodiment 2.

FIG. 15 is a flowchart of a packet processing method according to Embodiment 2. Embodiment 2 includes S301 to S309.

S301: A second network device generates a packet, where the packet includes a protection flag.

S302: The second network device sends the packet to a first network device.

S303: The first network device receives the packet.

S304: The first network device determines that a primary path is faulty.

S305: The first network device determines that the protection flag indicates that the packet is allowed to be switched from the primary path to a first protection path.

Optionally, "the packet is allowed to be switched from the primary path to a first protection path" in S305 includes: the packet is allowed to be switched to all first protection paths, or the packet is allowed to be switched to some specified first protection paths but the packet is not allowed to be switched to some other specified first protection paths.

The following describes S305 from a plurality of perspectives by using Case W1 to Case W6 as examples.

Case W1: With reference to Case C2, the first network device may determine whether the second bit is set and the third bit is not set. If the second bit is set and the third bit is not set, the first network device determines that the protection flag indicates that the packet is not allowed to be switched to the Midpoint TI-LFA path but is allowed to be switched to the TI-LFA FRR path. For example, the first network device finds that values of the second bit and the third bit are "10" and determines that the packet on the primary path is allowed to pass through the TI-LFA path, but the packet on the primary path is not allowed to pass through the Midpoint TI-LFA path. In this case, because the TI-LFA path is allowed, the first network device forwards the packet through the TI-LFA path.

Case W2: With reference to Case C3, the first network device may determine whether the second bit is not set and the third bit is set. If the second bit is not set and the third bit is set, the first network device determines that the protection flag indicates that the packet is allowed to be switched to the Midpoint TI-LFA path but is not allowed to be switched to the TI-LFA FRR path. For example, the first network device finds that values of the second bit and the third bit are "01" and determines that the packet on the primary path is allowed to pass through the Midpoint TI-LFA path, but the packet on the primary path is not allowed to pass through the TI-LFA path. In this case, because the Midpoint TI-LFA path is allowed, the first network device forwards the packet through the Midpoint TI-LFA path.

Case W3: With reference to Case C4, the first network device may determine whether the second bit is not set and the third bit is not set. If neither the second bit nor the third bit is set, the first network device determines that the protection flag indicates that the packet is allowed to be switched from the primary path to the Midpoint TI-LFA path or the TI-LFA FRR path. For example, the first network device finds that values of the second bit and the third bit are "00" and determines that the packet on the primary path is allowed to pass through the Midpoint TI-LFA path, and the packet on the primary path is also allowed to pass through the TI-LFA path. In this case, because the Midpoint TI-LFA path and the TI-LFA path are allowed, the first network device sends the packet through the Midpoint TI-LFA path or the TI-LFA path. The first network device may determine one path from the Midpoint TI-LFA path and the TI-LFA path and send the packet through the determined path.

Case W4: With reference to Case D1, the first network device may determine whether the first bit is not set. If the first bit is not set, the first network device determines that the protection flag indicates that the packet is allowed to be switched from the primary path to the first protection path. For example, if the first network device finds that the $2^{nd}$ bit in the Flags field is 0, the first network device determines that the packet is allowed to pass through the first protection path. Optionally, the first network device enables a plurality of protection mechanisms. Case W4 includes: the first network device determines that the protection flag indicates that the packet is allowed to be switched to the TI-LFA FRR path. Case W4 also includes: the first network device determines that the protection flag indicates that the packet is allowed to be switched to the Midpoint TI-LFA path.

Case W5: With reference to Case E1, the first network device may determine whether the packet includes the Flags field that carries the protection flag. If the packet does not include the Flags field that carries the protection flag, the first network device determines that the packet is allowed to be switched from the primary path to the first protection path, and therefore sends the packet through the first protection path.

Case W6: With reference to Case E2, the first network device may determine whether the packet includes the TLV that carries the protection flag. If the packet does not include the TLV that carries the protection flag, the first network device determines that the packet is allowed to be switched from the primary path to the first protection path, and therefore sends the packet through the first protection path.

It should be understood that there may be only one of Case W1 to Case W7, or there may be a plurality of cases in a combination manner.

It should be further understood that a time sequence of S304 and S305 is not limited in this embodiment. The following describes two possible time sequence cases of S304 and S305 by using examples. The following time sequence case 1 and time sequence case 2 are two optional implementations provided in this embodiment, and both should fall within the scope of this embodiment.

Time sequence case 1: S304 is performed first, and then S305 is performed. For example, the first network device first receives the packet, then determines the next hop or the outbound interface based on the packet and determines whether the next hop or the outbound interface is faulty. If the next hop or the outbound interface is faulty, the first network device further identifies the protection flag in the packet and determines whether the protection flag indicates that the packet is allowed to be switched from the primary path to the first protection path. If the protection flag indicates that the packet is allowed to be switched from the primary path to the first protection path, S306 is performed to forward the packet. If the next hop or the outbound interface is not faulty, the first network device does not identify the protection flag in the packet, but directly forwards the packet through the determined next hop or outbound interface.

Time sequence case 2: S305 is performed first, and then S304 is performed. For example, before the first network device receives the packet, because the outbound interface corresponding to the primary path is in a down state, or the first network device receives the fault notification message transmitted by the next-hop node, before receiving the packet that carries the protection flag, the first network device has determined in advance that the primary path is faulty. Then, the first network device receives the packet that carries the protection flag. The first network device identifies the protection flag in the packet and determines whether the protection flag indicates that the packet is allowed to be switched from the primary path to the first protection path. If the protection flag indicates that the packet is allowed to be switched from the primary path to the first protection path, because the first network device determines in advance that the primary path is faulty, the first network device performs S306 to forward the packet.

S306: The first network device sends the packet through the first protection path based on the determined fact that the primary path is faulty and the protection flag indicating that the packet is allowed to be switched from the primary path to the first protection path.

For example, as shown in FIG. 4, the first network device is RT_3. RT_3 enables a local protection mechanism based on the determined fact that the primary path is faulty and the protection flag indicating that the packet is allowed to be switched from the primary path to the first protection path. RT_3 sends the packet to RT_4 through the path indicated by the dashed line, so that the packet arrives at RT_4 from RT_3, arrives at RT_6 from RT_4, arrives at RT_5 from RT_6, arrives at RT_7 from RT_5, and arrives at PE2 from RT_7.

The following describes S305 from a plurality of perspectives by using Case V1 to Case V3 as examples.

Case V1: The first network device sends the packet through the Midpoint TI-LFA path based on the determined fact that the primary path is faulty and the protection flag indicating that the packet is allowed to be switched to the Midpoint TI-LFA path but is not allowed to be switched to the TI-LFA FRR path. In this manner, the first network device switches the packet from the primary path to the Midpoint TI-LFA path but does not switch the packet from the primary path to the TI-LFA FRR path. Because the packet does not pass through the TI-LFA FRR path, a problem caused after the packet is switched to the TI-LFA FRR path is avoided.

Case V2: The first network device sends the packet through the TI-LFA FRR path based on the determined fact that the primary path is faulty and the protection flag indicating that the packet is allowed to be switched to the TI-LFA FRR path but is not allowed to be switched to the Midpoint TI-LFA path. In this manner, the first network device switches the packet from the primary path to the TI-LFA FRR path but does not switch the packet from the primary path to the Midpoint TI-LFA path. Because the packet does not pass through the Midpoint TI-LFA path, a problem caused after the packet is switched to the Midpoint TI-LFA path is avoided.

Case V3: The first network device sends the packet through the TI-LFA FRR path or the TI-LFA FRR path based on the determined fact that the primary path is faulty and the protection flag indicating that the packet is allowed to be switched from the primary path to the Midpoint TI-LFA path or the TI-LFA FRR path.

In Case V3, because the TI-LFA FRR path is allowed, and the TI-LFA FRR path is also allowed, the first network device may determine one path from the TI-LFA FRR path and the TI-LFA FRR path and send the packet through the determined path. For example, the first network device presets a priority of a Midpoint TI-LFA protection mechanism and a priority of a TI-LFA protection mechanism, and the first network device determines one path from the Midpoint TI-LFA path and the TI-LFA path based on the priority of the Midpoint TI-LFA protection mechanism and the priority of the TI-LFA protection mechanism.

For example, the first network device determines a path having a higher priority from the Midpoint TI-LFA path and the TI-LFA FRR path and sends the packet through the path having a higher priority. For example, the first network device presets that the priority of the Midpoint TI-LFA protection mechanism is higher than the priority of the TI-LFA protection mechanism. When both Midpoint TI-LFA and TI-LFA can be used, Midpoint TI-LFA is preferentially used. In this case, the first network device sends the packet through the Midpoint TI-LFA path. Alternatively, the first network device presets that the priority of the TI-LFA protection mechanism is higher than the priority of the Midpoint TI-LFA protection mechanism. When both Midpoint TI-LFA and TI-LFA can be used, TI-LFA is preferentially used. In this case, the first network device sends the packet through the TI-LFA path.

Optionally, if a fault occurs on a protection mechanism having a higher priority in the Midpoint TI-LFA protection mechanism and the TI-LFA protection mechanism, the first network device may forward the packet by using a protection mechanism that has a lower priority but can be normally used. For example, the first network device presets that the priority of the Midpoint TI-LFA protection mechanism is higher than the priority of the TI-LFA protection mechanism. However, the Midpoint TI-LFA protection mechanism cannot be used currently, but the TI-LFA protection mechanism can be used currently. In this case, the first network device sends the packet through the TI-LFA path. For another example, the first network device presets that the priority of the TI-LFA protection mechanism is higher than the priority of the Midpoint TI-LFA protection mechanism. However, the TI-LFA protection mechanism cannot be used currently, but the Midpoint TI-LFA protection mechanism can be used currently. In this case, the first network device sends the packet through the Midpoint TI-LFA path.

S307: A third network device receives the packet.

For example, the third network device is an egress node on the primary path, and the third network device is a sink node on a tunnel to which the primary path belongs. For example, as shown in FIG. 1, the third network device is PE3 in FIG. 1.

S308: The third network device sends a response packet to the first network device based on the received packet.

S309: The first network device determines, based on the response packet, that the primary path is in a connected state.

S308 and S309 are optional steps. S308 and S309 are applicable to the detection packet transmission scenario described in Case H. In this scenario, the first network device is an initiation node of the detection packet, and the third network device is a destination node of the detection packet. For example, in Case H1, the first network device is an initiating node of the BFD packet, and the third network device is a destination node of the BFD packet.

In the method provided in this embodiment, the protection flag is added to the packet, so that the protection flag can indicate whether the packet is allowed to be switched from the primary path to a protection path. When the primary path is faulty, if a network device serving as a node along the path receives the packet that carries the protection flag, because it is determined that the primary path is faulty and the protection flag indicates that the packet is allowed to be switched to the protection path, the packet is sent through the protection path, the node along the path is guided to switch the packet to a local protection path by using the protection flag carried in the packet, and the node along the path can be further guided to switch the packet to a protection path. This improves flexibility.

Optionally, Embodiment 1 is applied to an SR scenario. Optionally, in the SR scenario, the second network device in Embodiment 1 is a head node on the SR tunnel, the first network device is a transit node on the SR tunnel, and the packet in Embodiment 1 is an SR packet. In Embodiment 1, the primary path is a primary LSP included in the SR tunnel. The first protection path is a first backup LSP. The second protection path is a second backup LSP. The SR scenario includes an SRv6 scenario and a segment routing multiprotocol label switching (SR MPLS) scenario. The SR MPLS scenario includes an SR-TE scenario and a segment routing-best effort (SR-BE) scenario. As cases of Embodiment 3, these SR scenarios should all fall within the scope of this embodiment.

A procedure in which Embodiment 1 is applied to the SR scenario is described below by using Embodiment 3. In other words, Embodiment 3 describes an implementation in which a packet does not pass through a protection path in the SR scenario. It should be understood that, for steps in Embodiment 3 that are similar to those in Embodiment 1, refer to Embodiment 1. Details are not described in Embodiment 3.

Embodiment 3

Figure 16:
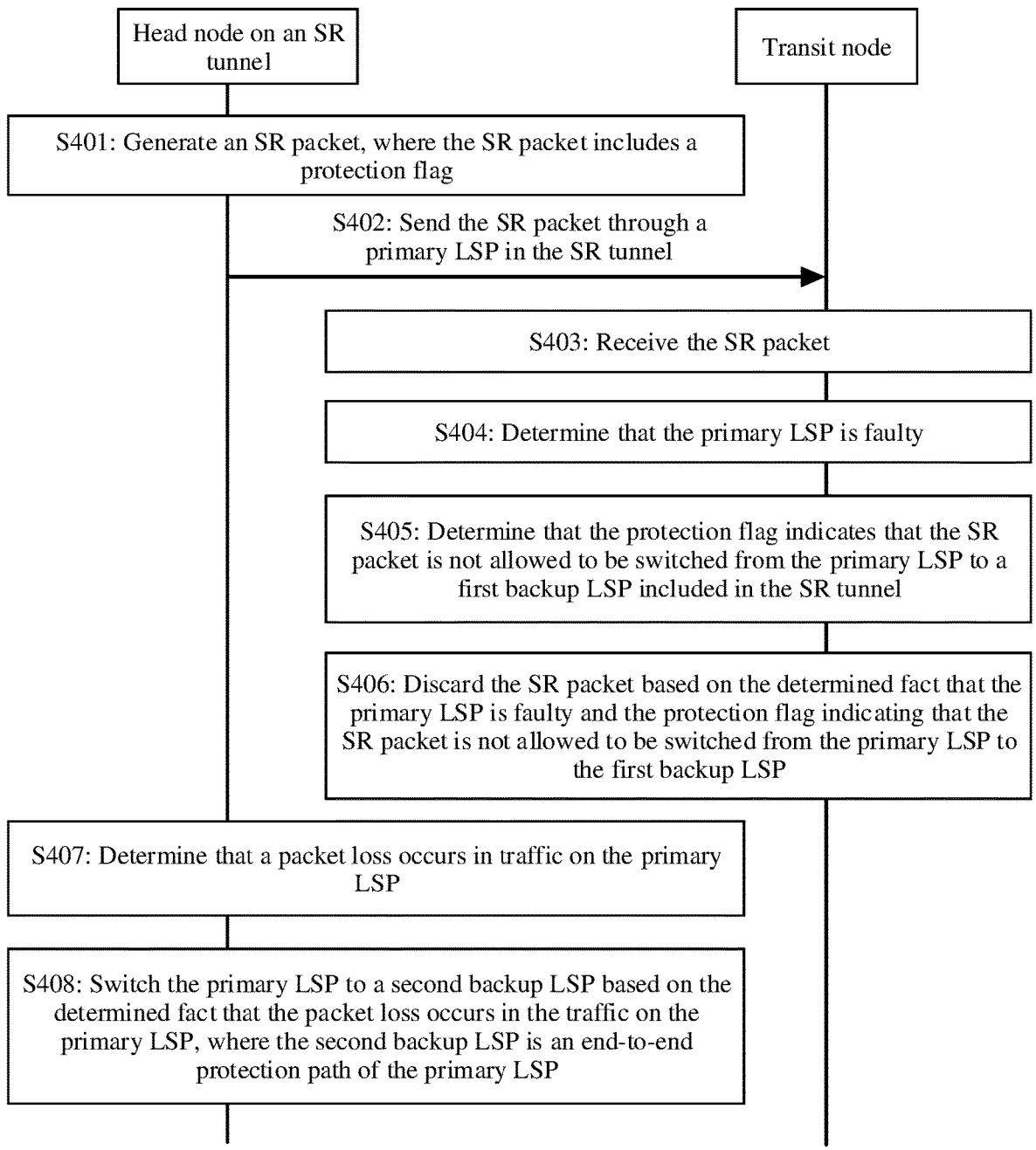
FIG. 16 is a flowchart of a packet processing method according to Embodiment 3.

FIG. 16 is a flowchart of a packet processing method according to Embodiment 3. Embodiment 3 includes S401 to S408.

S401: A head node on an SR tunnel generates an SR packet.

The SR packet described in S401 has any feature involved in Case A, Case B, Case C, Case D, Case E1, Case E2, Case H, or Case I.

For example, in SRv6, the SR packet is an SRv6 packet, the SRv6 packet includes an SRH, and the SRH includes a protection flag.

Optionally, the head node enables a protection flag adding function by entering a command line or performing another configuration in advance. The head node may add the protection flag to the SRH in a process of adding the SRH. In this case, the SRH in the packet sent by the head node carries the protection flag.

For example, with reference to Case C, the protection flag occupies two bits in the SRH, and values of the two bits can be used to indicate whether the transit node is allowed to switch the SRH from the primary LSP to the first backup LSP. For example, with reference to Case C1, the protection flag occupies the second bit and the third bit in the SRH, and the first backup LSP is on the Midpoint TI-LFA path or the TI-LFA FRR path. If both the second bit and the third bit are set, it indicates that the transit node is not allowed to switch the packet from the primary path to the Midpoint TI-LFA path and the TI-LFA FRR path.

For example, with reference to Case D, the protection flag occupies one bit in the SRH, and a value of the one bit can be used to indicate whether the transit node is allowed to switch the SRH from the primary LSP to the first backup LSP.

Optionally, the $2^{nd}$ bit in the Flags field is used to carry the protection flag, and the protection flag is T/M in FIG. 11. When a value of the $2^{nd}$ bit in the Flags field is 1, it indicates that the packet is not allowed to be switched from the primary LSP to the first backup LSP. When a value of the $2^{nd}$ bit in the Flags field is 0, it indicates that the transit node is allowed to switch the packet from the primary LSP to the first backup LSP.

Optionally, the Flags field that carries the protection flag further includes an exclude flag. The exclude flag is E Flag, a function of the exclude flag is to exclude the last SID in compression, and the function of the exclude flag may be translated into "set when the last SID is excluded in compression".

Optionally, the Flags field that carries the protection flag further includes an unused flag. The unused flag is U Flag. For a Flags field that is not used and can be used in the future, if a value of the unused flag in the packet is set to 0, a packet receive end ignores the unused flag.

Figure 12:
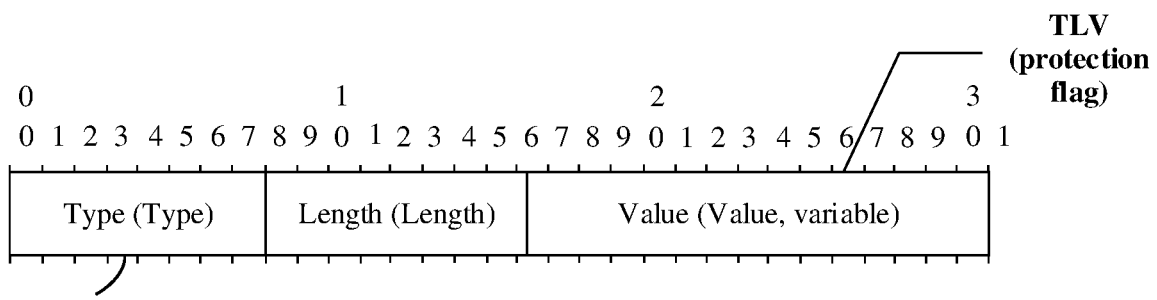
FIG. 12 is a schematic diagram of a TLV that carries a protection flag according to an embodiment.

For example, with reference to Case E2, the protection flag is in a TLV in the SRH. For example, as shown in FIG. 12, the TLV that carries the protection flag is the TLV in the SRH. The TLV may be referred to as a protection TLV. The protection TLV is used to indicate whether an SRv6 packet can pass through a protection path when a fault occurs. If the SRv6 packet includes the protection TLV, because the protection TLV indicates that the SRv6 packet is not allowed to be switched from the primary LSP to the first backup LSP, when the primary LSP is faulty, the transit node discards the SRv6 packet, so that the SRv6 packet does not pass through the first backup LSP. In addition, if the SRv6 packet does not include the protection TLV, when the primary LSP is faulty, the transit node forwards the SRv6 packet through the first backup LSP, so that the SRv6 packet passes through the first backup LSP.

S402: The head node sends the SR packet to the transit node on the primary LSP through the primary LSP in the SR tunnel.

For example, in S401, the head node adds a SID list to the SRH in the SRv6 packet. The SID list identifies a node or a link on the primary LSP, so that the SRv6 packet is transmitted through the primary LSP.

S403: The transit node on the primary LSP in the SR tunnel receives the SR packet.

S404: The transit node determines that the primary LSP is faulty.

S405: The transit node determines that the protection flag indicates that the SRv6 packet is not allowed to be switched from the primary LSP to the first backup LSP, where the first backup LSP is an LSP included in the SR tunnel, and the first backup LSP is a local protection path of the primary LSP.

The transit node may obtain the protection flag from the SRH in the SRv6 packet and determine whether the protection flag indicates that the SRv6 packet is not allowed to be switched from the primary LSP to the first backup LSP.

Optionally, as shown in FIG. 10, the transit node determines the Flags field from the SRH in the packet and obtains the second bit and the third bit from the Flags field, for example, reads bit6 and bit7 from the Flags field. The transit node determines, based on a value of the second bit and a value of the third bit in the Flags field, that the protection flag indicates that the SRv6 packet is not allowed to be switched from the primary LSP to the first backup LSP. For example, if the transit node identifies that bit6 and bit7 in the Flags field are "11", the transit node determines that the packet is not allowed to be switched from the primary path to the Midpoint TI-LFA path, and the packet is not allowed to be switched from the primary path to the TI-LFA FRR path either. Additionally, it may be appreciated that "11" is an optional manner. In another optional implementation, if the transit node identifies that bit6 and bit7 in the Flags field are "00", the transit node determines that the packet is not allowed to be switched from the primary path to the Midpoint TI-LFA path, and the packet is not allowed to be switched from the primary path to the TI-LFA FRR path either.

For another example, as shown in FIG. 11, the transit node determines the Flags field from the SRH in the packet, and obtains the first bit from the Flags field, for example, reads the $2^{nd}$ bit from the Flags field. The transit node determines, based on a value of the first bit in the Flags field, that the protection flag indicates that the SRv6 packet is not allowed to be switched from the primary LSP to the first backup LSP. For example, if the transit node identifies that the $2^{nd}$ bit in the Flags field is "1", the transit node determines that the packet is not allowed to be switched from the primary path to the Midpoint TI-LFA path or determines that the packet is not allowed to be switched from the primary path to the TI-LFA FRR path. Further, "1" is an optional manner. Optionally, if the transit node identifies that the $2^{nd}$ bit in the Flags field is "0", the transit node determines that the packet is not allowed to be switched from the primary path to the Midpoint TI-LFA path, and the packet is not allowed to be switched from the primary path to the TI-LFA FRR path either.

Optionally, the transit node may determine whether the SRH includes a TLV used to carry the protection flag. If the SRH includes the TLV used to carry the protection flag, the transit node determines that the protection flag indicates that the SRv6 packet is not allowed to be switched from the primary LSP to the first secondary LSP. For example, as shown in FIG. 12, if the SRH includes the TLV shown in FIG. 12, the transit node determines that the protection flag indicates that the SRv6 packet is not allowed to be switched from the primary LSP to the first backup LSP.

Optionally, the transit node may identify, from the SRH based on a value of a type field in the TLV in the SRH, the TLV used to carry the protection flag. For example, the transit node may determine whether the value of the type field in the TLV in the SRH is a type value corresponding to the protection TLV. If the value of the type field in the TLV in the SRH is the type value corresponding to the protection TLV, the transit node determines that the SRH includes the TLV used to carry the protection flag.

S406: The transit node discards the SR packet based on the determined fact that the primary LSP is faulty and the protection flag indicating that the SR packet is not allowed to be switched from the primary LSP to the first backup LSP.

S407: The head node on the SR tunnel determines that a packet loss occurs in traffic on the primary LSP.

S408: The head node switches the primary LSP to a second backup LSP based on the determined fact that the packet loss occurs in the traffic on the primary LSP, where the second backup LSP is an end-to-end protection path of the primary LSP.

In the method provided in this embodiment, an identifier that can indicate whether local protection is allowed is added to the SRH in the SRv6 packet. In a process in which the packet that carries the protection flag is transmitted along the primary LSP in the SR tunnel, if the transit node on the primary LSP determines that the primary path is faulty, but the protection flag indicates that local protection is not allowed, a node along the path does not perform local protection, so that the packet is not switched by the transit node to a backup LSP with the transit node as an ingress. This prevents the packet from passing through the backup LSP for local protection when the primary path is faulty, and resolves a problem caused after the packet enters the backup LSP for local protection from the node along the path.

In addition, because the packet is discarded by the transit node, the head node on the SR tunnel can detect the packet loss in the traffic on the primary path in time, the head node on the SR tunnel can detect service impairment in time, and the head node on the SR tunnel can detect a cause of the fault on the primary path.

In addition, optionally, a trigger condition for switching between different LSPs in a same SR tunnel is pre-configured on the head node. The trigger condition is that, when a packet loss is detected, the primary LSP in the SR tunnel is switched to the backup LSP in the SR tunnel. Therefore, in the foregoing method, because the head node determines that the packet loss occurs in the traffic on the primary LSP, the trigger condition is met, so that the head node switches the traffic on the primary LSP to the backup LSP in time. This facilitates fast end-to-end protection switching.

In addition, optionally, the backup LSP is pre-configured on the head node according to an SLA requirement as an LSP that meets the SLA. In this case, because the head node switches the traffic on the primary LSP to the backup LSP that meets the SLA, the traffic can be switched to the backup LSP that meets the SLA and is not diverted for a long time to the backup LSP that does not ensure the SLA and to which the transit node switches. Therefore, traffic transmission performance can be ensured, and SLA assurance can be achieved.

Embodiment 3 shows a procedure of implementing protection switching between two LSPs in one tunnel based on a protection flag in an SR scenario. This embodiment further provides a procedure of implementing tunnel-level protection switching based on a protection flag in an SR scenario. The following describes the procedure by using Embodiment 3. Embodiment 4 provided in Embodiment 3 is also a procedure in which Embodiment 1 is applied to an SR scenario. In other words, Embodiment 4 also describes an implementation in which a packet does not pass through a protection path in the SR scenario. It should be understood that, for steps in Embodiment 4 that are similar to those in Embodiment 1 and Embodiment 3, refer to Embodiment 1 and Embodiment 3. Details are not described in Embodiment 4.

Embodiment 4

Figure 17:
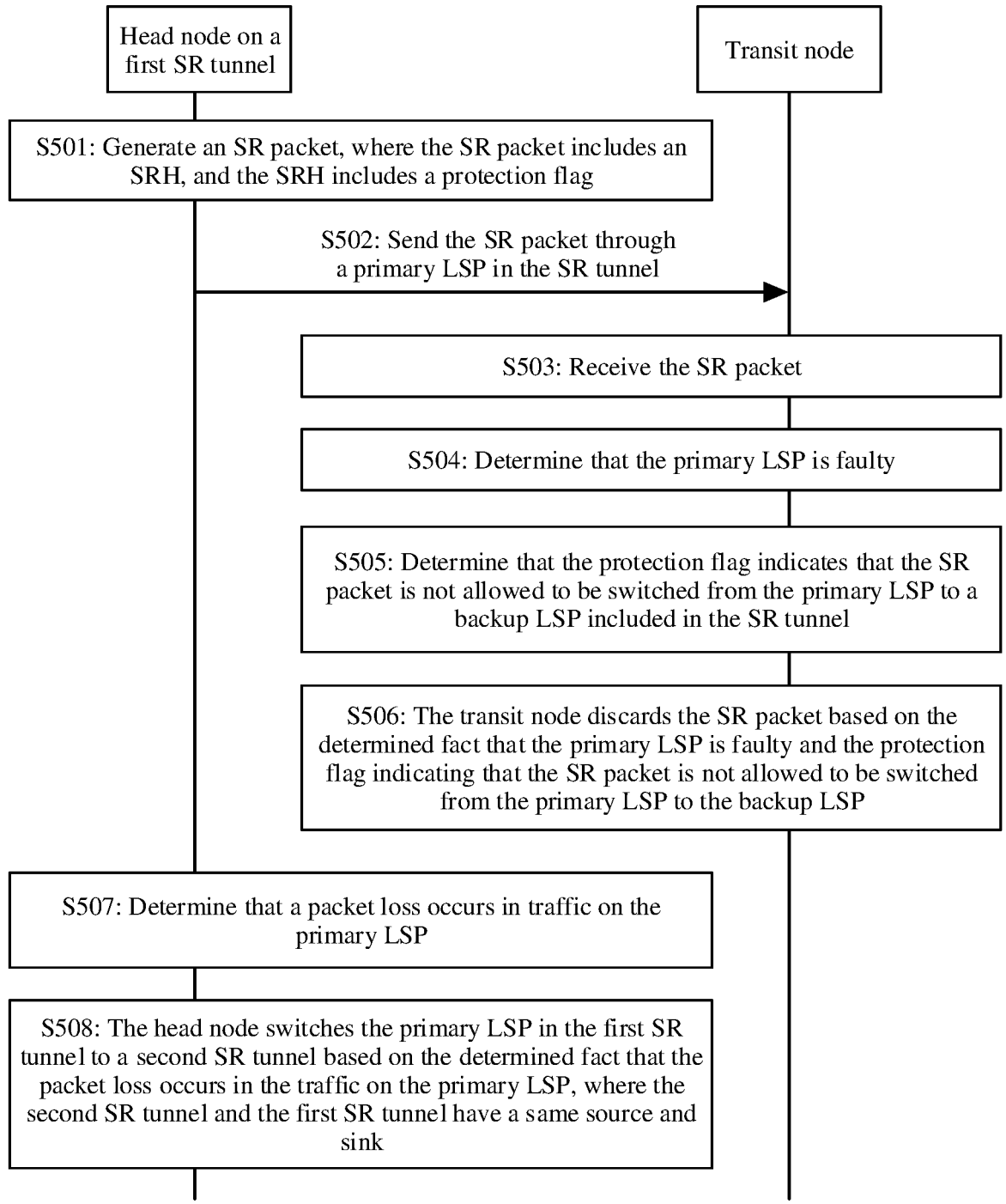
FIG. 17 is a flowchart of a packet processing method according to Embodiment 4.

FIG. 17 is a flowchart of a packet processing method according to Embodiment 4. Embodiment 4 includes S501 to S508.

S501: A head node on a first SR tunnel generates an SR packet.

S502: The head node sends the SR packet to a transit node on a primary LSP through the primary LSP in the first SR tunnel.

S503: The transit node on the primary LSP in the first SR tunnel receives the SR packet.

S504: The transit node determines that the primary LSP is faulty.

S505: The transit node determines that a protection flag indicates that the SR packet is not allowed to be switched from the primary LSP to a backup LSP, where the backup LSP is an LSP included in the SR tunnel, and the backup LSP is a local protection path of the primary LSP.

S506: The transit node discards the SR packet based on the determined fact that the primary LSP is faulty and the protection flag indicating that the SR packet is not allowed to be switched from the primary LSP to the backup LSP.

S507: The head node determines that a packet loss occurs in traffic on the primary LSP.

S508: The head node switches the primary LSP in the first SR tunnel to a second SR tunnel based on the determined fact that the packet loss occurs in the traffic on the primary LSP, where the second SR tunnel and the first SR tunnel have a same source and sink.

For example, as shown in FIG. 1, when a path between P1 and P3 is faulty, P1 discards a packet based on a protection flag. In this case, PE1 detects a packet loss, and therefore PE1 switches a primary path in the tunnel 1 to a backup path in the tunnel 1.

According to the method provided in this embodiment, in a scenario in which protection switching is triggered by detecting a packet loss, when a fault occurs on an SR tunnel, because an identifier that can indicate whether local protection is allowed is added to an SRH in an SR packet, in a process in which the packet that carries the protection flag is transmitted along the SR tunnel, a transit node does not perform local protection because the protection flag indicates that local protection is not allowed. Therefore, because a head node determines that a packet loss occurs, if a tunnel-level switching trigger condition is met, traffic on the SR tunnel can be switched to another SR tunnel in time, so that end-to-end protection switching can be quickly performed.

In addition, optionally, the another SR tunnel is pre-configured on the head node according to an SLA requirement as a tunnel that meets the SLA. In this case, because the head node switches traffic on a primary LSP to the SR tunnel that meets the SLA, traffic transmission performance can be ensured, and SLA assurance can be achieved.

Optionally, Embodiment 3 or Embodiment 4 is applied to an SRv6 scenario and is applied to a scenario of transmitting an SRv6 detection packet. A procedure in which Embodiment 3 or Embodiment 4 is applied to detection packet transmission is described below by using Embodiment 5. In other words, Embodiment 5 describes an implementation in which a detection packet does not pass through a protection path in an SRv6 scenario. It should be understood that, for steps in Embodiment 5 that are similar to those in Embodiment 3 and Embodiment 4, refer to Embodiment 3 and Embodiment 4. Details are not described in Embodiment 5.

Embodiment 5 describes a case in which a detection packet is an SRv6 BFD packet. In other words, Embodiment 5 describes an implementation in which an SRv6 BFD packet does not pass through a protection path in an SRv6 scenario.

Embodiment 5

Figure 18:
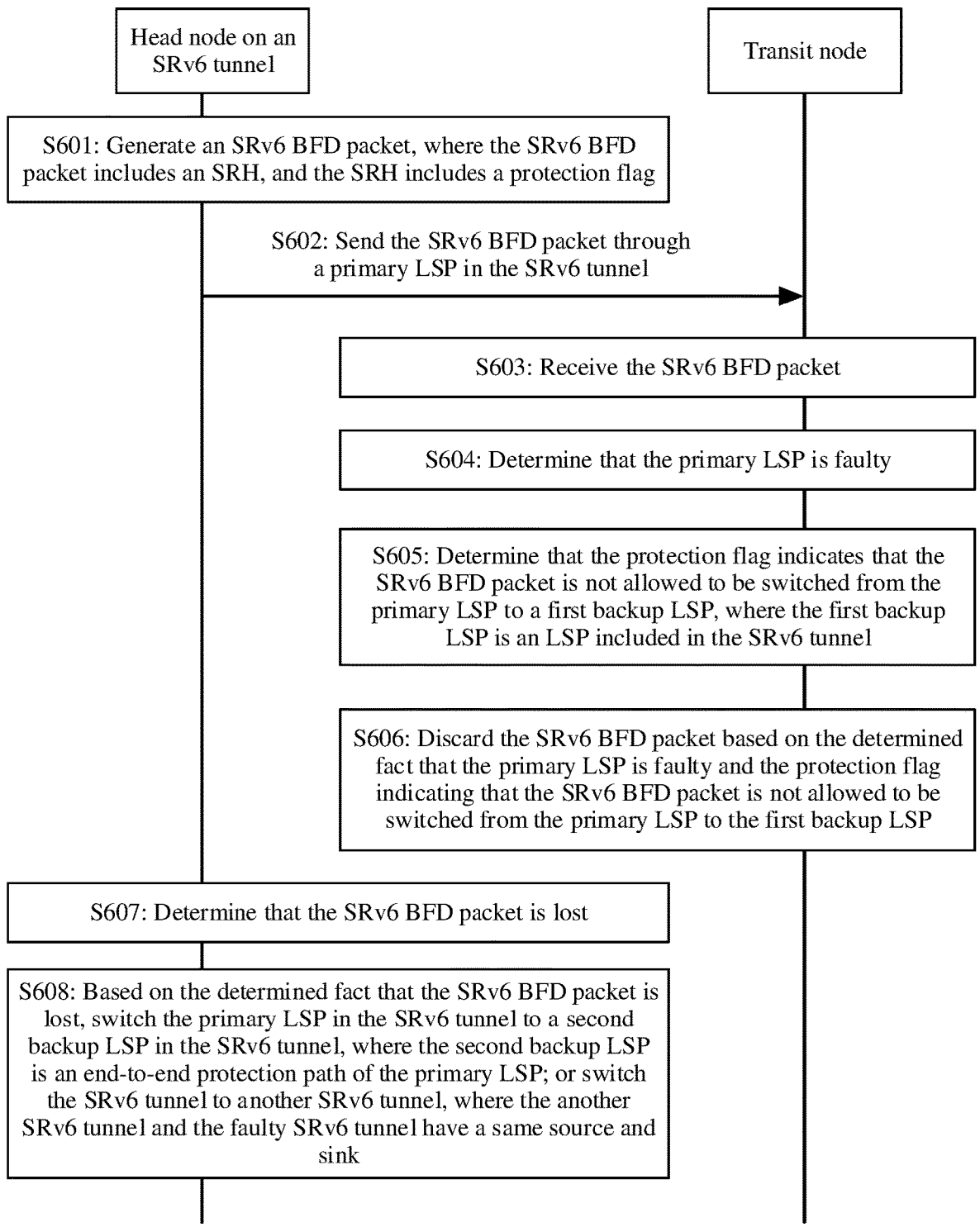
FIG. 18 is a flowchart of a packet processing method according to Embodiment 5.

FIG. 18 is a flowchart of a packet processing method according to Embodiment 5. Embodiment 5 includes S601 to S608.

S601: A head node on an SRv6 tunnel generates an SRv6 BFD packet.

S602: The head node sends the SRv6 BFD packet to a transit node on a primary LSP through the primary LSP in the SRv6 tunnel.

S603: The transit node on the primary LSP in the SRv6 tunnel receives the SRv6 BFD packet.

S604: The transit node determines that the primary LSP is faulty.

S605: The transit node determines that a protection flag indicates that the SRv6 BFD packet is not allowed to be switched from the primary LSP to a first backup LSP, where the first backup LSP is a local protection path of the primary LSP, and the first backup LSP is an LSP included in the SRv6 tunnel.

S606: The transit node discards the SRv6 BFD packet based on the determined fact that the primary LSP is faulty and the protection flag indicating that the SRv6 BFD packet is not allowed to be switched from the primary LSP to the first backup LSP.

S607: The head node on the SRv6 tunnel determines that the SRv6 BFD packet is lost.

S608: Based on the determined fact that the SRv6 BFD packet is lost, the head node switches the primary LSP in the SRv6 tunnel to a second backup LSP in the SRv6 tunnel, where the second backup LSP is an end-to-end protection path of the primary LSP; or the head node switches the SRv6 tunnel to another SRv6 tunnel, where the another SRv6 tunnel and the faulty SRv6 tunnel have a same source and sink.

According to the method provided in this embodiment, because an SRH header of the SRv6 BFD packet carries the protection flag, if a node fault or a link fault occurs on the primary LSP, when a node along the path receives the SRv6 BFD packet, the node along the path discards the SRv6 BFD packet because the protection flag in the SRv6 BFD packet indicates that the packet is not allowed to pass through a local backup LSP. In this case, the SRv6 BFD packet does not reach a BFD destination end, and the BFD destination end does not return a packet to the head node. Therefore, BFD detection on the head node is triggered to be down, so that the head node can detect a fault on the primary path in time. In addition, when end-to-end protection switching is triggered because BFD detection is down, the head node can perform primary/backup LSP switching on a same SRv6 tunnel in time, so as to switch a packet of the primary LSP in the SRv6 tunnel to a backup LSP in the SRv6 tunnel, thereby reducing a primary/backup LSP switching time; or the head node can perform tunnel-level switching in time, so as to switch a packet of the primary LSP to another SRv6 tunnel, thereby reducing a time of switching between two SRv6 tunnels.

It should be understood that the SRv6 BFD packet is used as an example for description in Embodiment 5. The SRv6 BFD packet in Embodiment 5 may be replaced with an SRv6 PING detection packet, an SRv6 OAM packet, an SRv6 OAM detection packet, or an SRv6 TWAMP detection packet. For a corresponding processing procedure, refer to Embodiment 5. Details are not described herein again.

The foregoing describes the packet processing methods in the embodiments, and the following describes packet processing apparatuses in the embodiments. It should be understood that a packet processing apparatus 110 has any function of the first network device in the foregoing method, and a packet processing apparatus 120 has any function of the second network device in the foregoing method.

Figure 19:
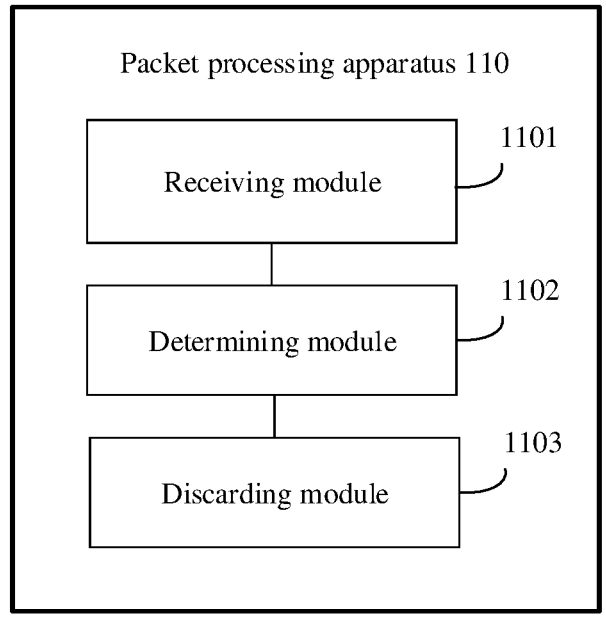
FIG. 19 is a schematic diagram of a structure of a packet processing apparatus 110 according to an embodiment.

FIG. 19 is a schematic diagram of a structure of the packet processing apparatus 110 according to an embodiment. As shown in FIG. 19, the packet processing apparatus 110 includes: a receiving module 1101, configured to perform at least one of S203, S303, S403, S503, or S603; a determining module 1102, configured to perform at least one of S204, S205, S303, S304, S404, S405, S504, S505, S604, or S605; and a discarding module 1103, configured to perform at least one of S206, S406, S506, or S606.

Optionally, the determining module 1102 is further configured to perform S305. The apparatus 110 further includes a sending module, configured to perform S306.

It should be understood that the packet processing apparatus 110 provided in the embodiment in FIG. 19 corresponds to the first network device in the foregoing method embodiment. The modules in the packet processing apparatus 110 and the foregoing other operations and/or functions are respectively used to implement various steps and methods implemented by the first network device in the method embodiment. For details, refer to the foregoing method embodiment. For ease of brevity, details are not described herein again.

It should be understood that, when the packet processing apparatus 110 provided in the embodiment in FIG. 19 processes a packet, division into the foregoing function modules is merely used as an example for description. During actual application, the foregoing functions may be allocated to different function modules as required for completion. An internal structure of the packet processing apparatus 110 may be divided into different function modules, to complete all or some of the functions described above. In addition, the packet processing apparatus 110 provided in the foregoing embodiment belongs to a same idea as the foregoing packet processing method embodiment. For an implementation process thereof, refer to the method embodiment. Details are not described herein again.

Figure 20:
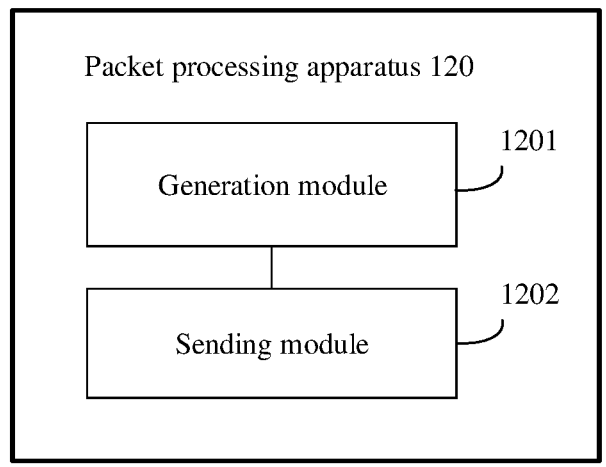
FIG. 20 is a schematic diagram of a structure of a packet processing apparatus 120 according to an embodiment.

FIG. 20 is a schematic diagram of a structure of the packet processing apparatus 120 according to an embodiment. As shown in FIG. 20, the packet processing apparatus 120 includes: a generation module 1201, configured to perform at least one of S201, S301, S401, S501, or S601; and a sending module 1202, configured to perform at least one of S202, S302, S402, S502, or S602.

Optionally, the apparatus 120 further includes: a determining module, configured to determine that a packet loss occurs in traffic on the primary path; and a switching module, configured to switch the primary path to a second protection path based on the determined fact that the packet loss occurs in the traffic on the primary path.

It should be understood that the packet processing apparatus 120 provided in the embodiment in FIG. 20 corresponds to the second network device in the foregoing method embodiment. The modules in the packet processing apparatus 120 and the foregoing other operations and/or functions are respectively used to implement various steps and methods implemented by the second network device in the method embodiment. For details, refer to the foregoing method embodiment. For ease of brevity, details are not described herein again.

It should be understood that, when the packet processing apparatus 120 provided in the embodiment in FIG. 20 processes a packet, division into the foregoing function modules is merely used as an example for description. During actual application, the foregoing functions may be allocated to different function modules as required for completion. An internal structure of the packet processing apparatus 120 may be divided into different function modules, to complete all or some of the functions described above. In addition, the packet processing apparatus 120 provided in the foregoing embodiment belongs to a same idea as the foregoing packet processing method embodiment. For an implementation process thereof, refer to the method embodiment. Details are not described herein again.

The following describes a possible entity form of the first network device or the second network device.

It should be understood that all forms of products having characteristics of the foregoing network device fall within the scope of the embodiments. It should be further understood that the following descriptions are merely examples, and a product form of the network device in the embodiments is not limited thereto.

An embodiment may provide a network device. The network device may be provided as the first network device or the second network device in the foregoing method embodiment. The network device includes a processor, and the processor is configured to execute instructions, so that the network device performs the packet processing method according to the foregoing method embodiment.

For example, the processor may be a network processor (NP), a central processing unit (CPU), an application-specific integrated circuit (ASIC), or an integrated circuit configured to control program execution in the solutions. The processor may be a single-core processor (single-CPU) or may be a multi-core processor (multi-CPU). There may be one or more processors.

In some possible embodiments, the network device may further include a memory.

The memory may be a read-only memory (ROM), another type of static storage device that can store static information and an instruction, a random access memory (RAM), or another type of dynamic storage device that can store information and an instruction, or may be an electrically erasable programmable read-only memory (EEPROM), a compact disc read-only memory (CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer. However, the memory is not limited thereto.

The memory and the processor may be separately disposed, or the memory and the processor may be integrated together.

In some possible embodiments, the network device may further include a transceiver.

The transceiver is configured to communicate with another device or a communications network. A network communication manner may be but is not limited to an Ethernet, a radio access network (RAN), a wireless local area network (WLAN), and the like.

In some possible embodiments, the network processor in the network device may perform the steps in the foregoing method embodiments. For example, the network device may be a router, a switch, or a firewall, or may be another network device that supports a packet forwarding function.

Figure 21:
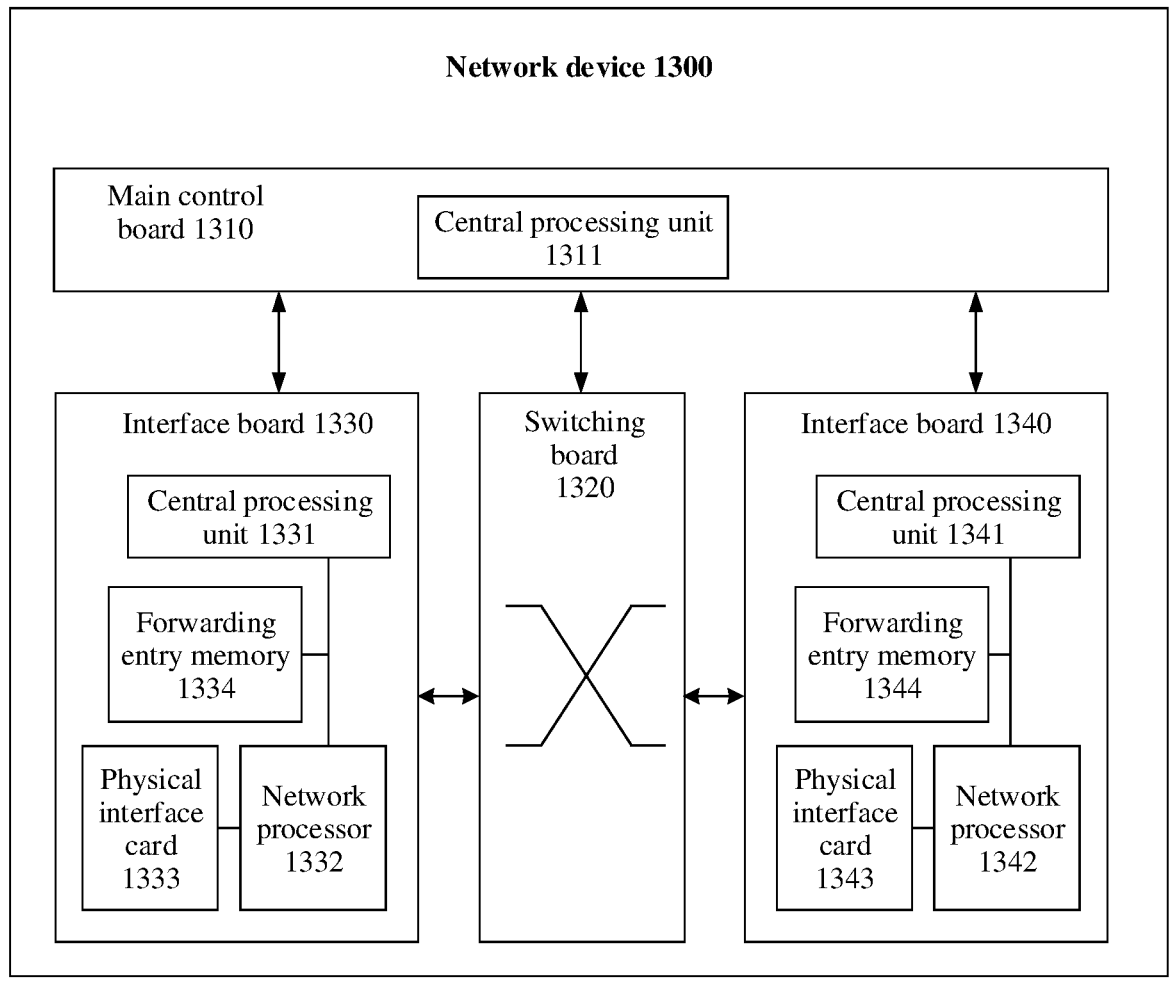
FIG. 21 is a schematic diagram of a structure of a network device 1300 according to an embodiment.

FIG. 21 is a schematic diagram of a structure of a network device 1300 according to an embodiment. The network device 1300 may be configured as a first network device or a second network device. The network device 1300 may be any node in the system architecture embodiment in FIG. 1, for example, may be CE1, PE1, PE2, P1, P2, P3, P4, PE3, PE4, or CE2.

The network device 1300 includes a main control board 1310, an interface board 1330, a switching board 1320, and an interface board 1340. The main control board 1310 is configured to complete functions such as system management, device maintenance, and protocol processing. The switching board 1320 is configured to complete data exchange between interface boards (the interface board is also referred to as a line card or a service board). The interface board 1330 and the interface board 1340 are configured to: provide various service interfaces (for example, an Ethernet interface and a POS interface), and implement data packet forwarding. The main control board 1310, the interface board 1330, the interface board 1340, and the switching board 1320 are connected to a system backboard through a system bus to implement interworking. A central processing unit 1331 on the interface board 1330 is configured to: control and manage the interface board and communicate with a central processing unit 1311 on the main control board 1310.

If the network device 1300 is configured as the first network device, a physical interface card 1333 receives a packet and sends the packet to a network processor 1332, and the network processor 1332 determines that a primary path is faulty and determines that a protection flag in the packet indicates that the packet is not allowed to be switched from the primary path to a first protection path. In this case, the network processor 1332 discards the packet.

In an embodiment, the network processor 1332 queries a forwarding entry memory 534 based on an SID in the packet, so as to determine an outbound interface or a next hop corresponding to the SID. If the outbound interface or the next hop is faulty, the network processor 1332 determines that the primary path is faulty.

In an embodiment, if the network processor 1332 determines that the protection flag indicates that the packet is allowed to be switched to a Midpoint TI-LFA path but is not allowed to be switched to a TI-LFA FRR path, the network processor sends the packet from the physical interface card 1333 based on information such as the outbound interface after link layer encapsulation is completed, so that the packet is transmitted through the Midpoint TI-LFA path.

In an embodiment, if the network processor 1332 determines that the protection flag indicates that the packet is allowed to be switched to a TI-LFA FRR path but is not allowed to be switched to a Midpoint TI-LFA path, the network processor sends the packet from the physical interface card 1333 based on information such as the outbound interface after link layer encapsulation is completed, so that the packet is transmitted through the TI-LFA FRR path.

If the network device 1300 is configured as the second network device, the network processor 1332 generates a packet, and sends the packet from the physical interface card 1333 based on information such as the outbound interface after link layer encapsulation is completed, so that the packet is transmitted to the first network device.

In an embodiment, the network processor 1332 determines that a packet loss occurs in traffic on the primary path and switches the primary path to a second protection path.

It should be understood that an operation on the interface board 1340 is consistent with an operation on the interface board 1330 in this embodiment. For brevity, details are not described again. It should be understood that the network device 1300 in this embodiment may correspond to the first network device or the second network device in the foregoing method embodiments. The main control board 1310, and the interface board 1330 and/or the interface board 1340 in the network device 1300 may implement the functions and/or the steps implemented by the first network device or the second network device in the foregoing method embodiments. For brevity, details are not described herein again.

It should be noted that, when there is a plurality of main control boards, the plurality of main control boards may include a primary main control board and a secondary main control board. There may be one or more interface boards, and a network device having a stronger data processing capability provides more interface boards. There may also be one or more physical interface cards on the interface board. There may be no switching board or one or more switching boards. When there is a plurality of switching boards, load balancing and redundancy backup may be implemented together. In a centralized forwarding architecture, the network device may need no switching board, and the interface board provides a function of processing service data in an entire system. In a distributed forwarding architecture, the network device may have at least one switching board, and data exchange between a plurality of interface boards is implemented by using the switching board, to provide a large-capacity data exchange and processing capability. Therefore, a data access and processing capability of the network device in the distributed architecture is better than that of the device in the centralized architecture. Optionally, the network device may alternatively be in a form in which there is only one card. There is no switching board, and functions of the interface board and the main control board are integrated on the card. In this case, the central processing unit on the interface board and the central processing unit on the main control board may be combined to form one central processing unit on the card, to perform functions obtained by combining the two central processing units. This form of device (for example, a network device such as a low-end switch or a router) has a relatively weak data exchange and processing capability. An architecture that is to be used depends on a networking deployment scenario. This is not limited herein.

Figure 22:
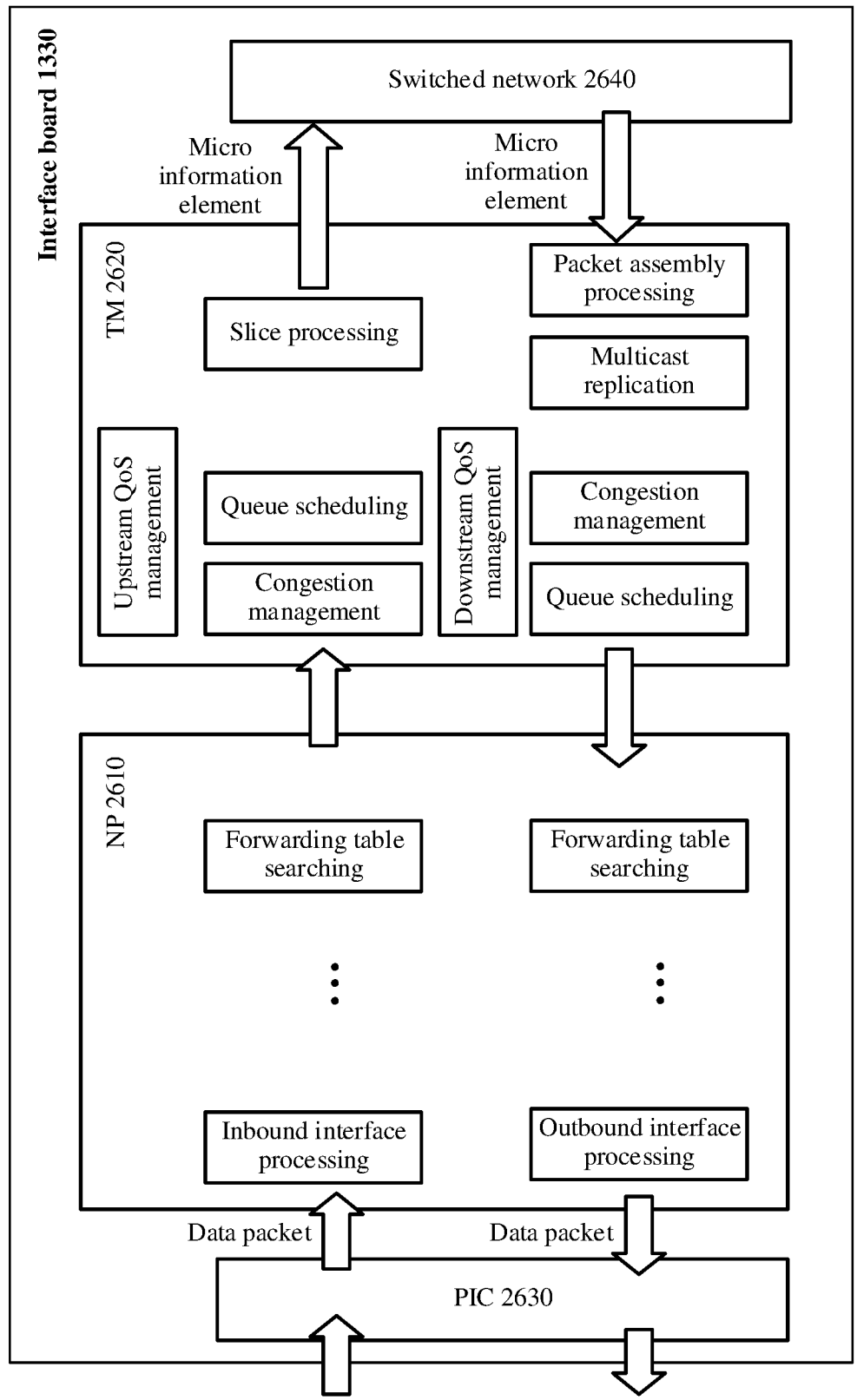
FIG. 22 is a schematic diagram of a structure of an interface board 1330 in a network device 1300 according to an embodiment.

FIG. 22 is a schematic diagram of a structure of an interface board 1330 in a network device 1300 according to an embodiment. The interface board 1330 may include a physical interface card (PIC) 2630, a network processor (NP) 2610, and a traffic management module 2620.

The physical interface card (PIC) is configured to implement a physical layer interconnection function. Original traffic enters an interface board in the network device through the PIC, and a processed packet is sent from the PIC.

The network processor NP 2610 is configured to implement packet forwarding processing. Upstream packet processing may include: packet ingress interface processing, and forwarding table searching (for example, related content of a first forwarding table or a second forwarding table in the foregoing embodiment); and downstream packet processing includes: forwarding table searching (for example, related content of the first forwarding table or the second forwarding table in the foregoing embodiment), and the like.

The traffic management TM 2620 is configured to implement functions such as QoS, line-rate forwarding, large-capacity buffering, and queue management. Upstream traffic management may include upstream QoS processing (such as congestion management and queue scheduling) and slice processing; and downstream traffic management may include packet assembly processing, multicast replication, and downstream QoS processing (such as congestion management and queue scheduling).

It can be understood that, if the network device includes a plurality of interface boards Y30, the plurality of interface boards Y30 may communicate with each other through a switched network 2640.

It should be noted that FIG. 22 shows only an example of a processing procedure or modules inside the NP. A processing sequence of the modules during implementation is not limited thereto. In addition, during actual application, another module or processing procedure may be deployed as required. This is not limited in embodiments.

In some possible embodiments, the network device may alternatively be implemented by a general-purpose processor. For example, the general-purpose processor may be in a form of a chip. The general-purpose processor implementing the network device includes a processing circuit, and an inbound interface and an outbound interface that are internally connected to and communicated with the processing circuit. The processing circuit is configured to perform the packet generation step in the foregoing method embodiments through the inbound interface. The processing circuit is configured to perform the receiving step in the foregoing method embodiments through the inbound interface. The processing circuit is configured to perform the sending step in the foregoing method embodiments through the outbound interface. Optionally, the general-purpose processor may further include a storage medium. The processing circuit is configured to perform the storage step in the foregoing method embodiments through the storage medium. The storage medium may store instructions executed by the processing circuit. The processing circuit is configured to execute the instructions stored in the storage medium, to perform the foregoing method embodiments.

In a possible product form, the network device in this embodiment may be alternatively implemented by using the following: one or more field programmable gate arrays (FPGA), a programmable logic device (PLD), a controller, a state machine, gate logic, a discrete hardware component, any other suitable circuit, or any combination of circuits that can execute various functions described in the embodiments.

In some possible embodiments, the network device may alternatively be implemented by using a computer program product. An embodiment may provide a computer program product. When the computer program product runs on a network device, the network device is enabled to perform the packet processing methods in the foregoing method embodiments.

It should be understood that the network devices in the foregoing product forms separately have any function of the network device in the foregoing method embodiments. Details are not described herein.

A person of ordinary skill in the art may be aware that, in combination with the examples described in embodiments, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and constraints of the solutions. A person of ordinary skill in the art may use different methods to implement the described functions for each particular application, but it should not be considered that the implementation goes beyond the scope of the embodiments.

It may be understood by a person skilled in the art that, for the purpose of convenient and brief description, for a detailed working process of the foregoing described system, apparatus, and unit, refer to a corresponding process in the foregoing method embodiments. Details are not described herein again.

In the several embodiments, it should be understood that the system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one location, or may be distributed on a plurality of network units. Some or all of the units may be selected according to actual requirements to achieve the objectives of the solutions of the embodiments.

In addition, function units in the embodiments may be integrated into one processing unit, each of the units may exist alone physically, or two or more units may be integrated into one unit. The integrated unit may be implemented in a form of hardware or may be implemented in a form of a software function unit.

When the integrated unit is implemented in the form of a software function unit and sold or used as an independent product, the integrated unit may be stored in a computer-readable storage medium. Based on such an understanding, the solutions essentially, or the part contributing to the conventional technology, or all or some of the solutions may be implemented in the form of a software product. The computer software product is stored in a storage medium and includes several instructions for indicating a computer device (which may be a personal computer, a server, a network device, or the like) to perform all or some of the steps of the method described in the embodiments. The storage medium includes any medium that can store program code, such as a USB flash drive, a removable hard disk, a read-only memory (ROM), a random access memory (RAM), a magnetic disk, or an optical disc.

The foregoing descriptions are merely implementations, but are not intended to limit the scope of the embodiments. Any equivalent modification or replacement readily figured out by a person skilled in the art shall fall within the scope of the embodiments.

All or some of embodiments may be implemented by using software, hardware, firmware, or any combination thereof. When the software is used to implement embodiments, all or some embodiments may be implemented in a form of a computer program product. The computer program product includes one or more computer program instructions. When the computer program instructions are loaded and executed on a computer, all or some of the procedures or functions according to the embodiments are generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer program instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive).

A person of ordinary skill in the art may understand that all or some of the steps of embodiments may be implemented by hardware or a program instructing related hardware. The program may be stored in a computer-readable storage medium. The storage medium may be a read-only memory, a magnetic disk, an optical disc, or the like.

The foregoing descriptions are merely optional embodiments but are not intended to limit. Any modification, equivalent replacement, or improvement made without departing from the spirit and principle shall fall within the scope of the embodiments.

What is claimed is:

1. A packet processing method comprising:
receiving, by a first network device, a packet, wherein the packet comprises a protection flag, the protection flag is used to indicate whether the first network device is allowed to switch the packet from a primary path to a first protection path, the first protection path is used to protect the primary path, and an ingress node on the first protection path is the first network device;
determining, by the first network device, that the primary path is faulty; and
when the protection flag indicates that the packet is not allowed to be switched from the primary path to the first protection path, discarding, by the first network device, the packet based on the determined fact that the primary path is faulty and the protection flag indicating that the packet is not allowed to be switched from the primary path to the first protection path, and
when the protection flag indicates that the packet is allowed to be switched from the primary path to the first protection path, sending, by the first network device, the packet through the first protection path based on the determined fact that the primary path is faulty and the protection flag indicating that the packet is allowed to be switched from the primary path to the first protection path, and when the protection flag indicates that the packet is allowed to be switched to a Midpoint TI-LFA path but is not allowed to be switched to a topology-independent loop-free alternate fast reroute (TI-LFA FRR) path, sending, by the first network device, the packet through the Midpoint TI-LFA path based on the determined fact that the primary path is faulty and the protection flag indicating that the packet is allowed to be switched to the Midpoint TI-LFA path but is not allowed to be switched to the TI-LFA FRR path.

2. The packet processing method according to claim 1, wherein a trigger condition for switching from the primary path to a second protection path is that a packet loss is detected on traffic on the primary path, the second protection path is a backup path for protecting the primary path, and the second protection path has a same ingress node as the primary path.

3. The packet processing method according to claim 1, wherein the packet is a segment routing (SR) packet, and determining, by the first network device, that the primary path is faulty further comprises:
   determining, by the first network device based on a segment identifier (SID) in the packet, an outbound interface or a next hop corresponding to the SID; and
   when the outbound interface or the next hop is faulty, determining, by the first network device, that the primary path is faulty.

4. The packet processing method according to claim 1, wherein the packet is a segment routing over internet protocol version 6 (SRv6) packet, the SRv6 packet comprises a segment routing header (SRH), and the protection flag is in the SRH.

5. The packet processing method according to claim 4, wherein that the protection flag is in the SRH further comprises:
   the protection flag is in a Flags field of the SRH; or
   the protection flag is in a type-length-value (TLV) of the SRH.

6. The packet processing method according to claim 1, wherein sending, by the first network device when the protection flag indicates that the packet is allowed to be switched from the primary path to the first protection path, the packet through the first protection path based on the determined fact that the primary path is faulty and the protection flag indicating that the packet is allowed to be switched from the primary path to the first protection path further comprises:
   when the protection flag indicates that the packet is allowed to be switched to a TI-LFA FRR path but is not allowed to be switched to a Midpoint TI-LFA path, sending, by the first network device, the packet through the TI-LFA FRR path based on the determined fact that the primary path is faulty and the protection flag indicating that the packet is allowed to be switched to the TI-LFA FRR path but is not allowed to be switched to the Midpoint TI-LFA path.

7. The packet processing method according to claim 1, wherein the protection flag occupies a first bit of the packet; and when the first bit is set, it indicates that the packet is not allowed to be switched from the primary path to the first protection path; or
   when the first bit is not set, it indicates that the packet is allowed to be switched from the primary path to the first protection path.

8. The packet processing method according to claim 1, wherein the protection flag occupies a second bit and a third bit of the packet; and when both the second bit and the third bit are set, it indicates that the packet is not allowed to be switched from the primary path to the Midpoint TI-LFA path or the TI-LFA FRR path;
   when the second bit is set and the third bit is not set, it indicates that the packet is not allowed to be switched to the Midpoint TI-LFA path but is allowed to be switched to the TI-LFA FRR path;
   when the second bit is not set and the third bit is set, it indicates that the packet is allowed to be switched to the Midpoint TI-LFA path but is not allowed to be switched to the TI-LFA FRR path; or
   when neither the second bit nor the third bit is set, it indicates that the packet is allowed to be switched from the primary path to the Midpoint TI-LFA path or the TI-LFA FRR path.

9. The packet processing method according to claim 1, wherein the packet comprises a data packet, and the data packet is used to carry service data of the primary path; or
   the packet comprises a detection packet, and the detection packet is used to detect at least one of connectivity or a transmission performance parameter of the primary path.

10. The packet processing method according to claim 9, wherein, when the packet comprises a detection packet,
   the detection packet is a bidirectional forwarding detection (BFD) packet; or
   the detection packet is a packet internet groper (PING) detection packet; or
   the detection packet is an operations, administration, and maintenance (OAM) detection packet; or
   the detection packet is a two-way active measurement protocol (TWAMP) detection packet; or
   the detection packet is an Internet Protocol data flow-based channel associated OAM performance measurement (IFIT) packet.

11. A packet processing method comprising:
   generating, by a second network device, a packet, wherein the packet comprises a protection flag, the protection flag is used to indicate whether a first network device is allowed to switch the packet from a primary path to a first protection path, the first protection path is used to protect the primary path, and an ingress node on the first protection path is the first network device; and
   sending, by the second network device, the packet to the first network device,
   wherein the protection flag occupies a first bit of the packet; and when the first bit is set, it indicates that the packet is not allowed to be switched from the primary path to the first protection path; and
   when the first bit is not set, it indicates that the packet is allowed to be switched from the primary path to the first protection path; and
   the protection flag occupies a second bit and a third bit of the packet; and when both the second bit and the third bit are set, it indicates that the packet is not allowed to be switched from the primary path to a Midpoint topology-independent loop-free alternate TI-LFA path and a TI-LFA fast reroute FRR path.

12. The packet processing method according to claim 11, wherein after the sending, by the second network device, the packet to the first network device, the method further comprises:
   determining, by the second network device, that a packet loss occurs in traffic on the primary path; and
   switching, by the second network device, the primary path to a second protection path based on the determined fact that the packet loss occurs in the traffic on the primary path, wherein the second protection path is a backup path for protecting the primary path, and the second protection path has a same ingress node as the primary path.

13. The packet processing method according to claim 11, wherein the packet is a segment routing over internet protocol version 6 (SRv6) packet, the SRv6 packet comprises a segment routing header (SRH), and the protection flag is in the SRH.

14. The packet processing method according to claim 13, wherein that the protection flag is in the SRH further comprises:
the protection flag is in a Flags field of the SRH; or
the protection flag is in a type-length-value (TLV) of the SRH.

15. The packet processing method according to claim 11,
when the second bit is set and the third bit is not set, it indicates that the packet is not allowed to be switched to a Midpoint TI-LFA path but is allowed to be switched to a TI-LFA FRR path;
when the second bit is not set and the third bit is set, it indicates that the packet is allowed to be switched to a Midpoint TI-LFA path but is not allowed to be switched to a TI-LFA FRR path; or
when neither the second bit nor the third bit is set, it indicates that the packet is allowed to be switched from the primary path to a Midpoint TI-LFA path or a TI-LFA FRR path.

16. The packet processing method according to claim 11, wherein the packet comprises a data packet, and the data packet is used to carry service data of the primary path; or
the packet comprises a detection packet, and the detection packet is used to detect at least one of connectivity or a transmission performance parameter of the primary path.

17. The packet processing method according to claim 16, wherein, when the packet comprises a detection packet,
the detection packet is a bidirectional forwarding detection (BFD) packet; or
the detection packet is a packet internet groper (PING) detection packet; or
the detection packet is an operations, administration, and maintenance (OAM) detection packet; or
the detection packet is a two-way active measurement protocol (TWAMP) detection packet; or
the detection packet is an Internet Protocol data flow-based channel associated OAM performance measurement (IFIT) packet.

18. A packet processing apparatus, comprising:
a memory comprising instructions;
a processor coupled to the memory, wherein when the instructions is executed by the processor, cause the apparatus to:
receive a packet, wherein the packet comprises a protection flag, the protection flag is used to indicate whether the first network device is allowed to switch the packet from a primary path to a first protection path, the first protection path is used to protect the primary path, and an ingress node on the first protection path is the first network device;
determine that the primary path is faulty; and
when the protection flag indicates that the packet is not allowed to be switched from the primary path to the first protection path, discard the packet based on the determined fact that the primary path is faulty and the protection flag indicating that the packet is not allowed to be switched from the primary path to the first protection path, and
when the protection flag indicates that the packet is allowed to be switched from the primary path to the first protection path, sending the packet through the first protection path based on the determined fact that the primary path is faulty and the protection flag indicating that the packet is allowed to be switched from the primary path to the first protection path, and
when the protection flag indicates that the packet is allowed to be switched to a Midpoint TI-LFA path but is not allowed to be switched to a topology-independent loop-free alternate fast reroute (TI-LFA FRR) path, send the packet through the Midpoint TI-LFA path based on the determined fact that the primary path is faulty and the protection flag indicating that the packet is allowed to be switched to the Midpoint TI-LFA path but is not allowed to be switched to the TI-LFA FRR path.

19. The packet processing apparatus according to claim 18, wherein a trigger condition for switching from the primary path to a second protection path is that a packet loss is detected on traffic on the primary path, the second protection path is a backup path for protecting the primary path, and the second protection path has a same ingress node as the primary path.

20. The packet processing apparatus according to claim 18, wherein the instructions further cause the apparatus to:
when the protection flag indicates that the packet is allowed to be switched to a TI-LFA FRR path but is not allowed to be switched to a Midpoint TI-LFA path, send the packet through the TI-LFA FRR path based on the determined fact that the primary path is faulty and the protection flag indicating that the packet is allowed to be switched to the TI-LFA FRR path but is not allowed to be switched to the Midpoint TI-LFA path.

21. A packet processing apparatus, comprising:
a memory comprising instructions;
a processor coupled to the memory, wherein when the instructions is executed by the processor, cause the apparatus to:
generate a packet, wherein the packet comprises a protection flag, the protection flag is used to indicate whether a first network device is allowed to switch the packet from a primary path to a first protection path, the first protection path is used to protect the primary path, and an ingress node on the first protection path is the first network device; and
send the packet to the first network device,
wherein the protection flag occupies a first bit of the packet; and when the first bit is set, it indicates that the packet is not allowed to be switched from the primary path to the first protection path; and
when the first bit is not set, it indicates that the packet is allowed to be switched from the primary path to the first protection path; and
the protection flag occupies a second bit and a third bit of the packet; and when both the second bit and the third bit are set, it indicates that the packet is not allowed to be switched from the primary path to a Midpoint topology-independent loop-free alternate TI-LFA path and a TI-LFA fast reroute FRR path.

22. The packet processing apparatus according to claim 21, wherein the instructions further cause the apparatus to:
determine that a packet loss occurs in traffic on the primary path; and switch the primary path to a second protection path based on the determined fact that the packet loss occurs in the traffic on the primary path.

23. The packet processing apparatus according to claim 21, wherein the packet is a segment routing over internet protocol version 6 (SRv6) packet, the SRv6 packet comprises a segment routing header (SRH), and the protection flag is in the SRH.

24. The packet processing apparatus according to claim 23, wherein that the protection flag is in the SRH comprises:
the protection flag is in a Flags field of the SRH; or
the protection flag is in a type-length-value (TLV) of the SRH.

25. The packet processing apparatus according to claim 21, wherein
when the second bit is set and the third bit is not set, it indicates that the packet is not allowed to be switched to a Midpoint TI-LFA path but is allowed to be switched to a TI-LFA FRR path;
when the second bit is not set and the third bit is set, it indicates that the packet is allowed to be switched to a Midpoint TI-LFA path but is not allowed to be switched to a TI-LFA FRR path; or
when neither the second bit nor the third bit is set, it indicates that the packet is allowed to be switched from the primary path to a Midpoint TI-LFA path or a TI-LFA FRR path.

26. The packet processing apparatus according to claim 21, wherein the packet comprises a data packet, and the data packet is used to carry service data of the primary path; or
the packet comprises a detection packet, and the detection packet is used to detect at least one of connectivity or a transmission performance parameter of the primary path.

* * * * *